(12) United States Patent
Bertness

(10) Patent No.: US 12,330,513 B2
(45) Date of Patent: Jun. 17, 2025

(54) BATTERY MAINTENANCE DEVICE WITH HIGH VOLTAGE CONNECTOR

(71) Applicant: Midtronics, Inc., Willowbrook, IL (US)

(72) Inventor: Kevin I. Bertness, Batavia, IL (US)

(73) Assignee: Midtronics, Inc., Willowbrook, IL (US)

( * ) Notice: Subject to any disclaimer, the term of this patent is extended or adjusted under 35 U.S.C. 154(b) by 324 days.

(21) Appl. No.: 18/166,702

(22) Filed: Feb. 9, 2023

(65) Prior Publication Data

US 2023/0256829 A1    Aug. 17, 2023

Related U.S. Application Data

(60) Provisional application No. 63/309,783, filed on Feb. 14, 2022.

(51) Int. Cl.
| | |
|---|---|
| *B60L 3/00* | (2019.01) |
| *B60L 50/60* | (2019.01) |
| *B60L 58/10* | (2019.01) |
| *H01R 13/627* | (2006.01) |

(52) U.S. Cl.
CPC ............ *B60L 3/0046* (2013.01); *B60L 50/60* (2019.02); *B60L 58/10* (2019.02); *H01R 13/6271* (2013.01); *H01R 2201/26* (2013.01)

(58) Field of Classification Search
CPC ........ B60L 3/0046; B60L 50/60; B60L 58/10; H01R 13/6271; H01R 2201/26
See application file for complete search history.

(56) References Cited

U.S. PATENT DOCUMENTS

| 85,553 | A | 1/1869 | Adams ........................... 33/472 |
| 2,000,665 | A | 5/1935 | Neal ............................ 439/440 |
| 2,254,846 | A | 9/1941 | Heyer ........................... 324/437 |

(Continued)

FOREIGN PATENT DOCUMENTS

| CN | 2470964 Y | 1/2002 |
| CN | 201063352 Y | 5/2008 |

(Continued)

OTHER PUBLICATIONS

"Electrochemical Impedance Spectroscopy in Battery Development and Testing", *Batteries International*, Apr. 1997, pp. 59 and 62-63.

(Continued)

*Primary Examiner* — Peter D Nolan
*Assistant Examiner* — Wae L Louie
(74) *Attorney, Agent, or Firm* — Westman, Champlin & Koehler, P.A.

(57) ABSTRACT

A battery maintenance system for use in performing battery maintenance on a battery of an electric vehicle including a battery maintenance device and a high voltage connector configured to connect the battery maintenance device to the battery of the electric vehicle. When a fuse door is removed from a fuse block of the connector, a mechanical component in a first position blocks a keying post and prevents a first connector side from coupling with a second connector side of the connector When the fuse door is in place and covering an interior of the fuse block, the fuse door places the mechanical component into a second position to allow the keying post to mate with the second connector side and to activate an electric switch to connect voltages to the fuse block.

20 Claims, 26 Drawing Sheets

(56) References Cited

U.S. PATENT DOCUMENTS

| | | | |
|---|---|---|---|
| 2,417,940 A | 3/1947 | Lehman | 200/61.25 |
| 2,437,772 A | 3/1948 | Wall | 324/523 |
| 2,514,745 A | 7/1950 | Dalzell | 324/115 |
| 2,727,221 A | 12/1955 | Springg | 340/447 |
| 3,025,455 A | 3/1962 | Jonsson | 323/369 |
| 3,178,686 A | 4/1965 | Mills | 340/447 |
| 3,215,194 A | 11/1965 | Sununu et al. | 165/80.3 |
| 3,223,969 A | 12/1965 | Alexander | 340/447 |
| 3,267,452 A | 8/1966 | Wolf | 340/249 |
| 3,356,936 A | 12/1967 | Smith | 324/429 |
| 3,562,634 A | 2/1971 | Latner | 324/427 |
| 3,593,099 A | 7/1971 | Scholl | 320/127 |
| 3,607,673 A | 9/1971 | Seyl | 324/425 |
| 3,652,341 A | 3/1972 | Halsall et al. | 29/623.2 |
| 3,676,770 A | 7/1972 | Sharaf et al. | 324/430 |
| 3,699,433 A | 10/1972 | Smith, Jr. | 324/523 |
| 3,704,439 A | 11/1972 | Nelson | |
| 3,729,989 A | 5/1973 | Little | 73/862.192 |
| 3,745,441 A | 7/1973 | Soffer | 290/14 |
| 3,750,011 A | 7/1973 | Kreps | 324/430 |
| 3,753,094 A | 8/1973 | Furuishi et al. | 324/430 |
| 3,776,177 A | 12/1973 | Bryant et al. | 116/311 |
| 3,796,124 A | 3/1974 | Crosa | 411/521 |
| 2,689,939 A | 4/1974 | Godshalk | |
| 3,808,401 A | 4/1974 | Wright et al. | |
| 3,808,522 A | 4/1974 | Sharaf | 324/430 |
| 3,808,573 A | 4/1974 | Cappell | |
| 3,811,089 A | 5/1974 | Strezelewicz | 324/170 |
| 3,816,805 A | 6/1974 | Terry | 320/123 |
| 3,850,490 A | 11/1974 | Zehr | 439/822 |
| 3,857,082 A | 12/1974 | van Opijnen | 320/143 |
| 3,873,911 A | 3/1975 | Champlin | 324/430 |
| 3,876,931 A | 4/1975 | Godshalk | 324/429 |
| 3,879,654 A | 4/1975 | Kessinger | 324/434 |
| 3,886,426 A | 5/1975 | Daggett | 320/117 |
| 3,886,443 A | 5/1975 | Miyakawa et al. | 324/426 |
| 3,889,248 A | 6/1975 | Ritter | 340/636.11 |
| 3,906,329 A | 9/1975 | Bader | 320/134 |
| 3,909,708 A | 9/1975 | Champlin | 324/431 |
| 3,920,284 A | 11/1975 | Lane et al. | 303/122.06 |
| 3,936,744 A | 2/1976 | Perlmutter | 324/772 |
| 3,939,400 A | 2/1976 | Steele | 324/434 |
| 3,946,299 A | 3/1976 | Christianson et al. | 320/430 |
| 3,947,757 A | 3/1976 | Grube et al. | 324/416 |
| 3,969,667 A | 7/1976 | McWilliams | 324/427 |
| 3,979,664 A | 9/1976 | Harris | 324/397 |
| 3,984,762 A | 10/1976 | Dowgiallo, Jr. | 324/430 |
| 3,984,768 A | 10/1976 | Staples | 324/712 |
| 3,989,544 A | 11/1976 | Santo | 429/65 |
| 3,997,830 A | 12/1976 | Newell et al. | 320/102 |
| 4,008,619 A | 2/1977 | Alcaide et al. | 73/724 |
| 4,023,882 A | 5/1977 | Pettersson | 439/426 |
| 4,024,953 A | 5/1977 | Nailor, III | 206/344 |
| 4,045,718 A | 8/1977 | Gray | |
| 4,047,091 A | 9/1977 | Hutchines et al. | 363/59 |
| 4,053,824 A | 10/1977 | Dupuis et al. | 324/434 |
| 4,056,764 A | 11/1977 | Endo et al. | 320/101 |
| 4,057,313 A | 11/1977 | Polizzano | 439/219 |
| 4,070,624 A | 1/1978 | Taylor | 324/772 |
| 4,086,531 A | 4/1978 | Bernier | 324/772 |
| 4,106,025 A | 8/1978 | Katz | 343/715 |
| 4,112,351 A | 9/1978 | Back et al. | 324/380 |
| 4,114,083 A | 9/1978 | Benham et al. | 340/636.13 |
| 4,126,874 A | 11/1978 | Suzuki et al. | 396/301 |
| 4,160,916 A | 7/1979 | Papasideris | 307/10.6 |
| 4,176,315 A | 11/1979 | Sunnarborg | 324/133 |
| 4,178,546 A | 12/1979 | Hulls et al. | 324/772 |
| 4,193,025 A | 3/1980 | Frailing et al. | 324/427 |
| 4,207,610 A | 6/1980 | Gordon | 701/33.9 |
| 4,207,611 A | 6/1980 | Gordon | 701/33 |
| 4,217,645 A | 8/1980 | Barry et al. | 702/63 |
| 4,218,745 A | 8/1980 | Perkins | 324/66 |
| 4,280,457 A | 7/1981 | Bloxham | 123/198 R |
| 4,295,468 A | 10/1981 | Bartelt | |
| 4,297,639 A | 10/1981 | Branham | 324/429 |
| 4,307,342 A | 12/1981 | Peterson | 324/767 |
| 4,315,204 A | 2/1982 | Sievers et al. | 322/28 |
| 4,316,185 A | 2/1982 | Watrous et al. | 340/636.11 |
| 4,322,685 A | 3/1982 | Frailing et al. | 324/429 |
| 4,351,405 A | 6/1982 | Fields et al. | 180/65.2 |
| 4,352,067 A | 9/1982 | Ottone | 324/434 |
| 4,360,780 A | 11/1982 | Skutch, Jr. | 324/437 |
| 4,361,809 A | 11/1982 | Bil et al. | 324/426 |
| 4,363,407 A | 12/1982 | Buckler et al. | 209/3.3 |
| 4,369,407 A | 1/1983 | Korbell | 324/416 |
| 4,379,989 A | 4/1983 | Kurz et al. | 320/165 |
| 4,379,990 A | 4/1983 | Sievers et al. | 322/99 |
| 4,385,269 A | 5/1983 | Aspinwall et al. | 320/129 |
| 4,390,828 A | 6/1983 | Converse et al. | 320/153 |
| 4,392,101 A | 7/1983 | Saar et al. | 320/156 |
| 4,396,880 A | 8/1983 | Windebank | 320/156 |
| 4,408,157 A | 10/1983 | Beaubien | 324/712 |
| 4,412,169 A | 10/1983 | Dell'Orto | 320/123 |
| 4,423,378 A | 12/1983 | Marino et al. | 324/427 |
| 4,423,379 A | 12/1983 | Jacobs et al. | 324/429 |
| 4,424,491 A | 1/1984 | Bobbett et al. | 324/433 |
| 4,425,791 A | 1/1984 | Kling | 73/116.02 |
| 4,441,359 A | 4/1984 | Ezoe | 73/116.06 |
| 4,459,548 A | 7/1984 | Lentz et al. | 324/472 |
| 4,484,140 A | 11/1984 | Dieu | |
| 4,502,000 A | 2/1985 | Mashikian | |
| 4,514,694 A | 4/1985 | Finger | 324/429 |
| 4,520,353 A | 5/1985 | McAuliffe | 340/636.16 |
| 4,521,498 A | 6/1985 | Juergens | 429/59 |
| 4,544,312 A | 10/1985 | Stencel | |
| 4,560,230 A | 12/1985 | Inglis | |
| 4,564,798 A | 1/1986 | Young | 320/103 |
| 4,620,767 A | 11/1986 | Woolf | 439/217 |
| 4,626,765 A | 12/1986 | Tanaka | 320/127 |
| 4,633,418 A | 12/1986 | Bishop | 702/63 |
| 4,637,359 A | 1/1987 | Cook | 123/179 |
| 4,643,511 A | 2/1987 | Gawlik | 439/755 |
| 4,659,977 A | 4/1987 | Kissel et al. | 320/150 |
| 4,663,580 A | 5/1987 | Wortman | 320/153 |
| 4,665,370 A | 5/1987 | Holland | 324/429 |
| 4,667,143 A | 5/1987 | Cooper et al. | 320/153 |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | 320/165 |
| 4,686,442 A | 8/1987 | Radomski | 320/123 |
| 4,697,134 A | 9/1987 | Burkum et al. | 320/134 |
| 4,707,795 A | 11/1987 | Alber et al. | 702/63 |
| 4,709,202 A | 11/1987 | Koenck et al. | 320/112 |
| 4,710,861 A | 12/1987 | Kanner | 363/46 |
| 4,719,428 A | 1/1988 | Liebermann | 324/436 |
| 4,723,656 A | 2/1988 | Kiernan et al. | 206/705 |
| 4,743,855 A | 5/1988 | Randin et al. | 324/430 |
| 4,745,349 A | 5/1988 | Palanisamy et al. | 320/125 |
| 4,773,011 A | 9/1988 | VanHoose | 701/30 |
| 4,781,629 A | 11/1988 | Mize | 439/822 |
| D299,909 S | 2/1989 | Casey | D10/77 |
| 4,816,768 A | 3/1989 | Champlin | 324/428 |
| 4,820,966 A | 4/1989 | Fridman | 320/116 |
| 4,825,170 A | 4/1989 | Champlin | 324/436 |
| 4,826,457 A | 5/1989 | Varatta | 439/504 |
| 4,847,547 A | 7/1989 | Eng, Jr. et al. | 320/153 |
| 4,849,700 A | 7/1989 | Morioka et al. | 324/427 |
| 4,874,679 A | 10/1989 | Miyagawa | 429/91 |
| 4,876,495 A | 10/1989 | Palanisamy et al. | 320/106 |
| 4,881,038 A | 11/1989 | Champlin | 324/426 |
| 4,885,523 A | 12/1989 | Koench | 230/131 |
| 4,888,716 A | 12/1989 | Ueno | 702/63 |
| 4,901,007 A | 2/1990 | Sworm | 324/110 |
| 4,907,176 A | 3/1990 | Bahnick et al. | 364/551.01 |
| 4,912,416 A | 3/1990 | Champlin | 324/430 |
| 4,913,116 A | 4/1990 | Katogi et al. | 123/406.32 |
| 4,926,330 A | 5/1990 | Abe et al. | 701/33 |
| 4,929,931 A | 5/1990 | McCuen | 340/636.15 |
| 4,931,738 A | 6/1990 | MacIntyre et al. | 324/435 |
| 4,932,905 A | 6/1990 | Richards | 439/822 |
| 4,933,845 A | 6/1990 | Hayes | 710/104 |
| 4,934,957 A | 6/1990 | Bellusci | 439/504 |
| 4,937,528 A | 6/1990 | Palanisamy | 324/430 |

(56) References Cited

U.S. PATENT DOCUMENTS

| | | | |
|---|---|---|---|
| 4,947,124 A | 8/1990 | Hauser | 324/430 |
| 4,949,046 A | 8/1990 | Seyfang | 324/427 |
| 4,956,597 A | 9/1990 | Heavey et al. | 320/129 |
| 4,965,738 A | 10/1990 | Bauer et al. | 320/136 |
| 4,968,941 A | 11/1990 | Rogers | 324/428 |
| 4,968,942 A | 11/1990 | Palanisamy | 324/430 |
| 4,969,834 A | 11/1990 | Johnson | 439/141 |
| 4,983,086 A | 1/1991 | Hatrock | 411/259 |
| 5,004,979 A | 4/1991 | Marino et al. | 324/160 |
| 5,030,916 A | 7/1991 | Bokitch | 324/503 |
| 5,032,825 A | 7/1991 | Kuznicki | 340/636.15 |
| 5,034,893 A | 7/1991 | Fisher | 701/99 |
| 5,037,335 A | 8/1991 | Campbell | 439/217 |
| 5,037,778 A | 8/1991 | Stark et al. | 228/121 |
| 5,047,722 A | 9/1991 | Wurst et al. | 324/430 |
| 5,081,565 A | 1/1992 | Nabha et al. | 362/465 |
| 5,083,076 A | 1/1992 | Scott | 320/105 |
| 5,087,881 A | 2/1992 | Peacock | 324/378 |
| 5,095,223 A | 3/1992 | Thomas | 307/110 |
| 5,108,320 A | 4/1992 | Kimber | 439/883 |
| 5,109,213 A | 4/1992 | Williams | 340/447 |
| 5,126,675 A | 6/1992 | Yang | 324/435 |
| 5,130,658 A | 7/1992 | Bohmer | 324/435 |
| 5,140,269 A | 8/1992 | Champlin | 324/433 |
| 5,144,218 A | 9/1992 | Bosscha | 320/139 |
| 5,144,248 A | 9/1992 | Alexandres et al. | 324/428 |
| D330,338 S | 10/1992 | Wang | D10/77 |
| 5,159,272 A | 10/1992 | Rao et al. | 324/429 |
| 5,160,881 A | 11/1992 | Schramm et al. | 322/7 |
| 5,164,653 A | 11/1992 | Reem | |
| 5,167,529 A | 12/1992 | Verge | 427/1 |
| 5,168,208 A | 12/1992 | Schultz et al. | 322/25 |
| 5,170,124 A | 12/1992 | Blair et al. | 324/434 |
| 5,179,335 A | 1/1993 | Nor | 320/159 |
| 5,187,382 A | 2/1993 | Kondo | 307/10.1 |
| 5,194,799 A | 3/1993 | Tomantschger | 320/103 |
| 5,202,617 A | 4/1993 | Nor | |
| 5,204,611 A | 4/1993 | Nor et al. | 320/145 |
| 5,214,370 A | 5/1993 | Harm et al. | 320/152 |
| 5,214,385 A | 5/1993 | Gabriel et al. | 324/433 |
| 5,223,747 A | 6/1993 | Tschulena | 257/713 |
| 5,241,275 A | 8/1993 | Fang | 324/430 |
| 5,254,952 A | 10/1993 | Salley et al. | 324/429 |
| 5,266,880 A | 11/1993 | Newland | 320/125 |
| 5,278,759 A | 1/1994 | Berra et al. | 701/1 |
| 5,281,919 A | 1/1994 | Palanisamy | 324/427 |
| 5,281,920 A | 1/1994 | Wurst | 324/430 |
| 5,295,078 A | 3/1994 | Stich et al. | 700/297 |
| 5,296,823 A | 3/1994 | Dietrich | 333/161 |
| 5,298,797 A | 3/1994 | Redl | 327/387 |
| 5,300,874 A | 4/1994 | Shimamoto et al. | 320/106 |
| 5,302,902 A | 4/1994 | Groehl | 324/434 |
| 5,309,052 A | 5/1994 | Kim | 174/350 |
| 5,313,152 A | 5/1994 | Wozniak et al. | 320/118 |
| 5,315,287 A | 5/1994 | Sol | 340/455 |
| 5,321,231 A | 6/1994 | Schmalzriedt et al. | |
| 5,321,626 A | 6/1994 | Palladino | 702/63 |
| 5,321,627 A | 6/1994 | Reher | 702/63 |
| 5,323,337 A | 6/1994 | Wilson et al. | 702/73 |
| 5,325,041 A | 6/1994 | Briggs | 320/149 |
| 5,331,268 A | 7/1994 | Patino et al. | 320/158 |
| 5,332,927 A | 7/1994 | Paul et al. | 307/66 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/147 |
| 5,343,380 A | 8/1994 | Champlin | 363/46 |
| 5,345,384 A | 9/1994 | Przybyla et al. | 701/29.1 |
| 5,347,163 A | 9/1994 | Yoshimura | 307/66 |
| 5,349,535 A | 9/1994 | Gupta | 320/106 |
| 5,352,968 A | 10/1994 | Reni et al. | 320/136 |
| 5,357,519 A | 10/1994 | Martin et al. | 371/15.1 |
| 5,365,160 A | 11/1994 | Leppo et al. | 320/160 |
| 5,365,453 A | 11/1994 | Startup et al. | 702/36 |
| 5,369,364 A | 11/1994 | Renirie et al. | 324/430 |
| 5,381,096 A | 1/1995 | Hirzel | 324/427 |
| 5,384,540 A | 1/1995 | Dessel | 324/539 |
| 5,387,871 A | 2/1995 | Tsai | 324/429 |
| 5,394,093 A | 2/1995 | Cervas | 324/556 |
| 5,402,007 A | 3/1995 | Center et al. | 290/40 B |
| 5,410,754 A | 4/1995 | Klotzbach et al. | 370/466 |
| 5,412,308 A | 5/1995 | Brown | 323/267 |
| 5,412,323 A | 5/1995 | Kato et al. | 324/429 |
| 5,425,041 A | 6/1995 | Seko et al. | 372/45.01 |
| 5,426,371 A | 6/1995 | Salley et al. | 324/429 |
| 5,426,416 A | 6/1995 | Jefferies et al. | 340/664 |
| 5,430,645 A | 7/1995 | Keller | 364/424.01 |
| 5,432,025 A | 7/1995 | Cox | 429/65 |
| 5,432,426 A | 7/1995 | Yoshida | 320/160 |
| 5,432,429 A | 7/1995 | Armstrong, II et al. | |
| 5,434,495 A | 7/1995 | Toko | 320/135 |
| 5,435,185 A | 7/1995 | Eagan | 73/587 |
| 5,442,274 A | 8/1995 | Tamai | 320/146 |
| 5,445,026 A | 8/1995 | Eagan | 73/591 |
| 5,449,996 A | 9/1995 | Matsumoto et al. | 320/148 |
| 5,449,997 A | 9/1995 | Gilmore et al. | 320/148 |
| 5,451,881 A | 9/1995 | Finger | 324/433 |
| 5,453,027 A | 9/1995 | Buell et al. | 439/433 |
| 5,457,377 A | 10/1995 | Jonsson | 324/430 |
| 5,459,660 A | 10/1995 | Berra | 701/33 |
| 5,462,439 A | 10/1995 | Keith | 180/279 |
| 5,469,043 A | 11/1995 | Cherng et al. | 320/161 |
| 5,485,090 A | 1/1996 | Stephens | 324/433 |
| 5,486,123 A | 1/1996 | Miyazaki | 439/825 |
| 5,488,300 A | 1/1996 | Jamieson | 324/432 |
| 5,504,674 A | 4/1996 | Chen et al. | 705/4 |
| 5,508,599 A | 4/1996 | Koenck | 320/138 |
| 5,519,383 A | 5/1996 | De La Rosa | 340/636.15 |
| 5,528,148 A | 6/1996 | Rogers | 320/137 |
| 5,537,967 A | 7/1996 | Tashiro et al. | 123/192.1 |
| 5,541,489 A | 7/1996 | Dunstan | 320/134 |
| 5,546,317 A | 8/1996 | Andrieu | 702/63 |
| 5,548,273 A | 8/1996 | Nicol et al. | 340/439 |
| 5,550,485 A | 8/1996 | Falk | 324/772 |
| 5,555,498 A | 9/1996 | Berra | |
| 5,561,380 A | 10/1996 | Sway-Tin et al. | 324/509 |
| 5,562,501 A | 10/1996 | Kinoshita et al. | 439/852 |
| 5,563,496 A | 10/1996 | McClure | 320/128 |
| 5,572,136 A | 11/1996 | Champlin | 324/426 |
| 5,573,611 A | 11/1996 | Koch et al. | 152/152.1 |
| 5,574,355 A | 11/1996 | McShane et al. | 320/161 |
| 5,578,915 A | 11/1996 | Crouch, Jr. et al. | 324/428 |
| 5,583,416 A | 12/1996 | Klang | 320/160 |
| 5,585,416 A | 12/1996 | Audett et al. | 522/35 |
| 5,585,728 A | 12/1996 | Champlin | 324/427 |
| 5,589,292 A | 12/1996 | Rozon | |
| 5,589,757 A | 12/1996 | Klang | 320/160 |
| 5,592,093 A | 1/1997 | Klingbiel | 324/426 |
| 5,592,094 A | 1/1997 | Ichikawa | 324/427 |
| 5,596,260 A | 1/1997 | Moravec et al. | 320/135 |
| 5,596,261 A | 1/1997 | Suyama | 320/152 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/106 |
| 5,614,788 A | 3/1997 | Mullins et al. | 315/82 |
| 5,621,298 A | 4/1997 | Harvey | 320/134 |
| 5,631,536 A | 5/1997 | Tseng | 320/15 |
| 5,631,831 A | 5/1997 | Bird et al. | 701/34.4 |
| 5,633,985 A | 5/1997 | Severson et al. | 704/267 |
| 5,637,978 A | 6/1997 | Kellett et al. | 320/104 |
| 5,642,031 A | 6/1997 | Brotto | 320/156 |
| 5,644,212 A | 7/1997 | Takahashi | 320/134 |
| 5,650,937 A | 7/1997 | Bounaga | 702/65 |
| 5,652,501 A | 7/1997 | McClure et al. | 340/636.15 |
| 5,653,659 A | 8/1997 | Kunibe et al. | 477/111 |
| 5,654,623 A | 8/1997 | Shiga et al. | 320/106 |
| 5,656,920 A | 8/1997 | Cherng et al. | 324/431 |
| 5,661,368 A | 8/1997 | Deol et al. | 315/82 |
| 5,666,040 A | 9/1997 | Bourbeau | 320/118 |
| 5,675,234 A | 10/1997 | Greene | 340/636.11 |
| 5,677,077 A | 10/1997 | Faulk | 429/90 |
| 5,684,678 A | 11/1997 | Barrett | 363/17 |
| 5,685,734 A | 11/1997 | Kutz | 439/371 |
| 5,691,621 A | 11/1997 | Phuoc et al. | 320/134 |
| 5,699,050 A | 12/1997 | Kanazawa | 340/636.13 |

(56) References Cited

U.S. PATENT DOCUMENTS

| | | | |
|---|---|---|---|
| 5,701,089 A | 12/1997 | Perkins | 324/772 |
| 5,705,929 A | 1/1998 | Caravello et al. | 324/430 |
| 5,707,015 A | 1/1998 | Guthrie | 241/120 |
| 5,710,503 A | 1/1998 | Sideris et al. | 320/116 |
| 5,711,648 A | 1/1998 | Hammerslag | 414/800 |
| 5,712,795 A | 1/1998 | Layman et al. | 700/297 |
| 5,717,336 A | 2/1998 | Basell et al. | 324/430 |
| 5,717,937 A | 2/1998 | Fritz | 713/300 |
| 5,721,688 A | 2/1998 | Bramwell | 324/426 |
| 5,732,074 A | 3/1998 | Spaur et al. | 370/313 |
| 5,739,667 A | 4/1998 | Matsuda et al. | 320/128 |
| 5,744,962 A | 4/1998 | Alber et al. | 324/426 |
| 5,745,044 A | 4/1998 | Hyatt, Jr. et al. | 340/5.23 |
| 5,747,189 A | 5/1998 | Perkins | 429/91 |
| 5,747,909 A | 5/1998 | Syverson et al. | 310/156.56 |
| 5,747,967 A | 5/1998 | Muljadi et al. | 320/148 |
| 5,754,417 A | 5/1998 | Nicollini | 363/60 |
| 5,757,192 A | 5/1998 | McShane et al. | 324/427 |
| 5,760,587 A | 6/1998 | Harvey | 324/434 |
| 5,772,468 A | 6/1998 | Kowalski et al. | 439/506 |
| 5,773,962 A | 6/1998 | Nor | 320/134 |
| 5,773,978 A | 6/1998 | Becker | 324/430 |
| 5,778,326 A | 7/1998 | Moroto et al. | 701/22 |
| 5,780,974 A | 7/1998 | Pabla et al. | 315/82 |
| 5,780,980 A | 7/1998 | Naito | 318/139 |
| 5,789,899 A | 8/1998 | van Phuoc et al. | 320/112 |
| 5,793,359 A | 8/1998 | Ushikubo | 345/169 |
| 5,796,239 A | 8/1998 | van Phuoc et al. | 320/107 |
| 5,808,469 A | 9/1998 | Kopera | 324/434 |
| 5,811,979 A | 9/1998 | Rhein | 324/718 |
| 5,818,201 A | 10/1998 | Stockstad et al. | 320/119 |
| 5,818,234 A | 10/1998 | McKinnon | 324/433 |
| 5,820,407 A | 10/1998 | Morse et al. | 439/504 |
| 5,821,756 A | 10/1998 | McShane et al. | 324/430 |
| 5,821,757 A | 10/1998 | Alvarez et al. | 324/434 |
| 5,825,174 A | 10/1998 | Parker | 324/106 |
| 5,826,467 A | 10/1998 | Huang | |
| 5,831,435 A | 11/1998 | Troy | 324/426 |
| 5,832,396 A | 11/1998 | Moroto et al. | 701/22 |
| 5,850,113 A | 12/1998 | Weimer et al. | 307/125 |
| 5,862,515 A | 1/1999 | Kobayashi et al. | 702/63 |
| 5,865,638 A | 2/1999 | Trafton | 439/288 |
| 5,869,951 A | 2/1999 | Takahashi | 320/104 |
| 5,870,018 A | 2/1999 | Person | 307/10.2 |
| 5,871,858 A | 2/1999 | Thomsen et al. | 429/7 |
| 5,872,443 A | 2/1999 | Williamson | 320/160 |
| 5,872,453 A | 2/1999 | Shimoyama et al. | 324/431 |
| 5,883,306 A | 3/1999 | Hwang | 73/146.8 |
| 5,884,202 A | 3/1999 | Jomand | 701/31.4 |
| 5,894,222 A | 4/1999 | Hibino | |
| 5,895,440 A | 4/1999 | Proctor et al. | 702/63 |
| 5,903,154 A | 5/1999 | Zhang et al. | 324/437 |
| 5,903,716 A | 5/1999 | Kimber et al. | 395/114 |
| 5,912,534 A | 6/1999 | Benedict | 315/82 |
| 5,914,605 A | 6/1999 | Bertness | 324/430 |
| 5,916,287 A | 6/1999 | Arjomand et al. | 701/33.2 |
| 5,927,938 A | 7/1999 | Hammerslag | 414/809 |
| 5,929,609 A | 7/1999 | Joy et al. | 322/25 |
| 5,935,180 A | 8/1999 | Fieramosca et al. | 701/29.6 |
| 5,939,855 A | 8/1999 | Proctor et al. | 320/104 |
| 5,939,861 A | 8/1999 | Joko et al. | 320/122 |
| 5,945,829 A | 8/1999 | Bertness | 324/430 |
| 5,946,605 A | 8/1999 | Takahisa et al. | 455/68 |
| 5,950,144 A | 9/1999 | Hall et al. | 702/108 |
| 5,951,229 A | 9/1999 | Hammerslag | 414/398 |
| 5,953,322 A | 9/1999 | Kimball | 370/328 |
| 5,955,951 A | 9/1999 | Wischerop et al. | 340/572.8 |
| 5,961,561 A | 10/1999 | Wakefield, II | 701/29 |
| 5,961,604 A | 10/1999 | Anderson et al. | 709/229 |
| 5,963,012 A | 10/1999 | Garcia et al. | 320/106 |
| 5,969,625 A | 10/1999 | Russo | 340/636.19 |
| 5,973,598 A | 10/1999 | Beigel | 340/572.1 |
| 5,978,805 A | 11/1999 | Carson | 707/10 |
| 5,982,138 A | 11/1999 | Krieger | 320/105 |
| 5,990,664 A | 11/1999 | Rahman | 320/136 |
| 6,002,238 A | 12/1999 | Champlin | 320/134 |
| 6,005,489 A | 12/1999 | Siegle et al. | 340/825.69 |
| 6,005,759 A | 12/1999 | Hart et al. | 361/66 |
| 6,008,652 A | 12/1999 | Theofanopoulos et al. | 324/434 |
| 6,009,369 A | 12/1999 | Boisvert et al. | 701/99 |
| 6,009,742 A | 1/2000 | Balko | |
| 6,016,047 A | 1/2000 | Notten et al. | 320/137 |
| 6,031,354 A | 2/2000 | Wiley et al. | 320/116 |
| 6,031,368 A | 2/2000 | Klippel et al. | 324/133 |
| 6,037,745 A | 3/2000 | Koike et al. | 320/104 |
| 6,037,751 A | 3/2000 | Klang | 320/160 |
| 6,037,777 A | 3/2000 | Champlin | 324/430 |
| 6,037,778 A | 3/2000 | Makhija | 324/433 |
| 6,037,749 A | 4/2000 | Parsonage | 320/132 |
| 6,046,514 A | 4/2000 | Rouillard et al. | 307/77 |
| 6,051,976 A | 4/2000 | Bertness | 324/426 |
| 6,055,468 A | 4/2000 | Kaman et al. | 701/29 |
| 6,061,638 A | 5/2000 | Joyce | 702/63 |
| 6,064,372 A | 5/2000 | Kahkoska | 345/173 |
| 6,072,299 A | 6/2000 | Kurle et al. | 320/112 |
| 6,072,300 A | 6/2000 | Tsuji | 320/116 |
| 6,075,339 A | 6/2000 | Reipur et al. | 320/110 |
| 6,076,018 A | 6/2000 | Sturman et al. | |
| 6,081,098 A | 6/2000 | Bertness et al. | 320/134 |
| 6,081,109 A | 6/2000 | Seymour et al. | 324/127 |
| 6,081,154 A | 6/2000 | Ezell et al. | 327/540 |
| 6,087,815 A | 7/2000 | Pfeifer et al. | 323/282 |
| 6,091,238 A | 7/2000 | McDermott | 324/207.2 |
| 6,091,245 A | 7/2000 | Bertness | 324/426 |
| 6,094,030 A | 7/2000 | Gimthorpe et al. | |
| 6,094,033 A | 7/2000 | Ding et al. | 320/132 |
| 6,097,193 A | 8/2000 | Bramwell | 324/429 |
| 6,100,670 A | 8/2000 | Levesque | 320/150 |
| 6,100,815 A | 8/2000 | Pailthorp | 324/754.07 |
| 6,104,167 A | 8/2000 | Bertness et al. | 320/132 |
| 6,113,262 A | 9/2000 | Purola et al. | 374/45 |
| 6,114,834 A | 9/2000 | Parise | 320/109 |
| 6,118,252 A | 9/2000 | Richter | |
| 6,121,880 A | 9/2000 | Scott et al. | 340/572.5 |
| 6,130,519 A | 10/2000 | Whiting et al. | |
| 6,136,914 A | 10/2000 | Hergenrother et al. | 524/495 |
| 6,137,261 A | 10/2000 | Kurle et al. | |
| 6,137,269 A | 10/2000 | Champlin | 320/150 |
| 6,140,797 A | 10/2000 | Dunn | 320/105 |
| 6,141,608 A | 10/2000 | Rother | 701/29.6 |
| 6,144,185 A | 11/2000 | Dougherty et al. | 320/132 |
| 6,147,598 A | 11/2000 | Murphy et al. | 340/426.19 |
| 6,149,653 A | 11/2000 | Deslauriers | 606/232 |
| 6,150,793 A | 11/2000 | Lesesky et al. | 320/104 |
| 6,158,000 A | 12/2000 | Collins | 713/1 |
| 6,161,640 A | 12/2000 | Yamaguchi | 180/65.8 |
| 6,163,156 A | 12/2000 | Bertness | 324/426 |
| 6,164,063 A | 12/2000 | Mendler | 60/274 |
| 6,167,349 A | 12/2000 | Alvarez | 702/63 |
| 6,172,483 B1 | 1/2001 | Champlin | 320/134 |
| 6,172,505 B1 | 1/2001 | Bertness | 324/430 |
| 6,177,737 B1 | 1/2001 | Palfey et al. | 307/64 |
| 6,177,878 B1 | 1/2001 | Tamura | |
| 6,181,545 B1 | 1/2001 | Amatucci et al. | 361/502 |
| 6,184,655 B1 | 2/2001 | Malackowski | 320/116 |
| 6,184,656 B1 | 2/2001 | Karunasiri et al. | 320/119 |
| 6,191,557 B1 | 2/2001 | Gray et al. | 320/132 |
| 6,202,739 B1 | 3/2001 | Pal et al. | 165/104.33 |
| 6,211,651 B1 | 4/2001 | Nemoto | 320/133 |
| 6,211,653 B1 | 4/2001 | Stasko | 320/132 |
| 6,215,275 B1 | 4/2001 | Bean | 320/106 |
| 6,218,805 B1 | 4/2001 | Melcher | 320/105 |
| 6,218,936 B1 | 4/2001 | Imao | 340/447 |
| 6,222,342 B1 | 4/2001 | Eggert et al. | 320/105 |
| 6,222,369 B1 | 4/2001 | Champlin | 324/430 |
| D442,503 S | 5/2001 | Lundbeck et al. | D10/77 |
| 6,225,808 B1 | 5/2001 | Varghese et al. | 324/426 |
| 6,225,898 B1 | 5/2001 | Kamiya et al. | 340/505 |
| 6,236,186 B1 | 5/2001 | Helton et al. | 320/106 |
| 6,236,332 B1 | 5/2001 | Conkright et al. | 340/3.1 |
| 6,236,949 B1 | 5/2001 | Hart | 702/64 |
| 6,238,253 B1 | 5/2001 | Qualls | 439/759 |
| 6,242,887 B1 | 6/2001 | Burke | 320/104 |
| 6,242,921 B1 | 6/2001 | Thibedeau et al. | 324/429 |

(56) References Cited

U.S. PATENT DOCUMENTS

| | | | |
|---|---|---|---|
| 6,249,124 B1 | 6/2001 | Bertness | 324/426 |
| 6,250,973 B1 | 6/2001 | Lowery et al. | 439/763 |
| 6,252,942 B1 | 6/2001 | Zoiss | 379/19 |
| 6,254,438 B1 | 7/2001 | Gaunt | 439/755 |
| 6,255,826 B1 | 7/2001 | Ohsawa | 320/116 |
| 6,259,170 B1 | 7/2001 | Limoge et al. | 307/10.8 |
| 6,259,254 B1 | 7/2001 | Klang | 324/427 |
| 6,262,563 B1 | 7/2001 | Champlin | 320/134 |
| 6,262,692 B1 | 7/2001 | Babb | 343/895 |
| 6,263,268 B1 | 7/2001 | Nathanson | 701/29 |
| 6,263,322 B1 | 7/2001 | Kirkevold et al. | 705/400 |
| 6,271,643 B1 | 8/2001 | Becker et al. | 320/112 |
| 6,271,748 B1 | 8/2001 | Derbyshire et al. | 340/442 |
| 6,272,387 B1 | 8/2001 | Yoon | 700/83 |
| 6,275,008 B1 | 8/2001 | Arai et al. | 320/132 |
| 6,285,191 B1 | 9/2001 | Gollomp et al. | 324/427 |
| 6,294,896 B1 | 9/2001 | Champlin | 320/134 |
| 6,294,897 B1 | 9/2001 | Champlin | 320/153 |
| 6,304,087 B1 | 10/2001 | Bertness | 324/426 |
| 6,307,349 B1 | 10/2001 | Koenck et al. | 320/112 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 320/132 |
| 6,316,914 B1 | 11/2001 | Bertness | 320/134 |
| 6,320,385 B1 | 11/2001 | Ng et al. | 320/104 |
| 6,323,650 B1 | 11/2001 | Bertness et al. | 324/426 |
| 6,324,042 B1 | 11/2001 | Andrews | 361/93.2 |
| 6,329,793 B1 | 12/2001 | Bertness et al. | 320/132 |
| 6,331,762 B1 | 12/2001 | Bertness | 320/134 |
| 6,332,113 B1 | 12/2001 | Bertness | 702/63 |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,356,042 B1 | 3/2002 | Kahlon et al. | 318/138 |
| 6,356,083 B1 | 3/2002 | Ying | 324/426 |
| 6,359,441 B1 | 3/2002 | Bertness | 324/426 |
| 6,359,442 B1 | 3/2002 | Henningson et al. | 324/426 |
| 6,363,303 B1 | 3/2002 | Bertness | 701/29 |
| RE37,677 E | 4/2002 | Irie | 315/83 |
| 6,377,031 B1 | 4/2002 | Karuppana et al. | 323/220 |
| 6,384,608 B1 | 5/2002 | Namaky | 324/430 |
| 6,388,448 B1 | 5/2002 | Cervas | 324/426 |
| 6,389,337 B1 | 5/2002 | Kolls | 701/31.6 |
| 6,392,414 B2 | 5/2002 | Bertness | 324/429 |
| 6,396,278 B1 | 5/2002 | Makhija | 324/402 |
| 6,407,554 B1 | 6/2002 | Godau et al. | 324/503 |
| 6,411,098 B1 | 6/2002 | Laletin | 324/436 |
| 6,417,669 B1 | 7/2002 | Champlin | 324/426 |
| 6,420,852 B1 | 7/2002 | Sato | 320/134 |
| 6,424,157 B1 | 7/2002 | Gollomp et al. | 324/430 |
| 6,424,158 B2 | 7/2002 | Klang | 324/433 |
| 6,426,606 B1 | 7/2002 | Purkey | |
| 6,433,512 B1 | 8/2002 | Birkler et al. | 320/132 |
| 6,437,957 B1 | 8/2002 | Karuppana et al. | 361/78 |
| 6,441,585 B1 | 8/2002 | Bertness | 320/132 |
| 6,445,158 B1 | 9/2002 | Bertness et al. | 320/104 |
| 6,448,778 B1 | 9/2002 | Rankin | 324/503 |
| 6,449,726 B1 | 9/2002 | Smith | 713/340 |
| 6,456,036 B1 | 9/2002 | Thandiwe | 320/106 |
| 6,456,045 B1 | 9/2002 | Troy et al. | 320/139 |
| 6,465,908 B1 | 10/2002 | Karuppana et al. | 307/31 |
| 6,466,025 B1 | 10/2002 | Klang | 324/429 |
| 6,466,026 B1 | 10/2002 | Champlin | 324/430 |
| 6,469,511 B1 | 10/2002 | Vonderhaar et al. | 324/425 |
| 6,473,659 B1 | 10/2002 | Shah et al. | 700/79 |
| 6,477,478 B1 | 11/2002 | Jones et al. | 702/102 |
| 6,495,990 B2 | 12/2002 | Champlin | 320/132 |
| 6,497,209 B1 | 12/2002 | Karuppana et al. | 123/179.3 |
| 6,500,025 B1 | 12/2002 | Moenkhaus et al. | 439/502 |
| 6,501,243 B1 | 12/2002 | Kaneko | 318/139 |
| 6,505,507 B1 | 1/2003 | Imao | 73/146.5 |
| 6,507,196 B2 | 1/2003 | Thomsen et al. | 324/436 |
| 6,526,361 B1 | 2/2003 | Jones et al. | 702/63 |
| 6,529,723 B1 | 3/2003 | Bentley | 455/405 |
| 6,531,847 B1 | 3/2003 | Tsukamoto et al. | |
| 6,531,848 B1 | 3/2003 | Chitsazan et al. | 320/153 |
| 6,532,425 B1 | 3/2003 | Boost et al. | 702/63 |
| 6,533,316 B2 | 3/2003 | Breed et al. | 280/735 |
| 6,534,992 B2 | 3/2003 | Meissner et al. | 324/426 |
| 6,534,993 B2 | 3/2003 | Bertness | 324/433 |
| 6,536,536 B1 | 3/2003 | Gass et al. | 173/2 |
| 6,544,078 B2 | 4/2003 | Palmisano et al. | 439/762 |
| 6,545,599 B2 | 4/2003 | Derbyshire et al. | 340/442 |
| 6,556,019 B2 | 4/2003 | Bertness | 324/426 |
| 6,566,883 B1 | 5/2003 | Vonderhaar et al. | 324/426 |
| 6,570,385 B1 | 5/2003 | Roberts et al. | 324/378 |
| 6,573,685 B2 | 6/2003 | Nakanishi et al. | |
| 6,577,107 B2 | 6/2003 | Kechmire | 320/139 |
| 6,586,941 B2 | 7/2003 | Bertness et al. | 324/426 |
| 6,597,150 B1 | 7/2003 | Bertness et al. | 320/104 |
| 6,599,243 B2 | 7/2003 | Woltermann et al. | 600/300 |
| 6,600,815 B1 | 7/2003 | Walding | 379/93.07 |
| 6,611,740 B2 | 8/2003 | Lowrey et al. | 701/29 |
| 6,614,349 B1 | 9/2003 | Proctor et al. | 340/572.1 |
| 6,618,644 B2 | 9/2003 | Bean | 700/231 |
| 6,621,272 B2 | 9/2003 | Champlin | 324/426 |
| 6,623,314 B1 | 9/2003 | Cox et al. | 439/759 |
| 6,624,635 B1 | 9/2003 | Lui | 324/426 |
| 6,628,011 B2 | 9/2003 | Droppo et al. | 307/43 |
| 6,629,054 B2 | 9/2003 | Makhija et al. | 702/113 |
| 6,633,165 B2 | 10/2003 | Bertness | 324/426 |
| 6,635,974 B1 | 10/2003 | Karuppana et al. | 307/140 |
| 6,636,790 B1 | 10/2003 | Lightner et al. | 701/31.5 |
| 6,667,624 B1 | 12/2003 | Raichle et al. | 324/522 |
| 6,679,212 B2 | 1/2004 | Kelling | 123/179.28 |
| 6,686,542 B2 | 2/2004 | Zhang | 174/74 |
| 6,696,819 B2 | 2/2004 | Bertness | 320/134 |
| 6,707,303 B2 | 3/2004 | Bertness et al. | 324/426 |
| 6,732,031 B1 | 5/2004 | Lightner et al. | 701/31.4 |
| 6,736,941 B2 | 5/2004 | Oku et al. | 203/68 |
| 6,737,831 B2 | 5/2004 | Champlin | 320/132 |
| 6,738,697 B2 | 5/2004 | Breed | 701/29 |
| 6,740,990 B2 | 5/2004 | Tozuka et al. | 307/9.1 |
| 6,744,149 B1 | 6/2004 | Karuppana et al. | 307/31 |
| 6,745,153 B2 | 6/2004 | White et al. | 702/184 |
| 6,759,849 B2 | 7/2004 | Bertness | 324/426 |
| 6,771,073 B2 | 8/2004 | Henningson et al. | 324/426 |
| 6,777,945 B2 | 8/2004 | Roberts et al. | 324/426 |
| 6,781,344 B1 | 8/2004 | Hedegor et al. | 320/106 |
| 6,781,382 B2 | 8/2004 | Johnson | 324/426 |
| 6,784,635 B2 | 8/2004 | Larson | 320/104 |
| 6,784,637 B2 | 8/2004 | Raichle et al. | 320/107 |
| 6,788,025 B2 | 9/2004 | Bertness et al. | 320/104 |
| 6,795,782 B2 | 9/2004 | Bertness et al. | 702/63 |
| 6,796,841 B1 | 9/2004 | Cheng et al. | 439/620.3 |
| 6,805,090 B2 | 10/2004 | Bertness et al. | 123/198 |
| 6,806,716 B2 | 10/2004 | Bertness et al. | 324/426 |
| 6,825,669 B2 | 11/2004 | Raichle et al. | 324/426 |
| 6,832,141 B2 | 12/2004 | Skeen et al. | 701/31.4 |
| 6,842,707 B2 | 1/2005 | Raichle et al. | 702/62 |
| 6,845,279 B1 | 1/2005 | Gilmore et al. | 700/115 |
| 6,850,037 B2 | 2/2005 | Bertness | 320/132 |
| 6,856,162 B1 | 2/2005 | Greatorex et al. | 324/764.01 |
| 6,856,972 B1 | 2/2005 | Yun et al. | 705/36 R |
| 6,871,151 B2 | 3/2005 | Bertness | 702/63 |
| 6,885,195 B2 | 4/2005 | Bertness | 324/426 |
| 6,888,468 B2 | 5/2005 | Bertness | 340/636.15 |
| 6,891,378 B2 | 5/2005 | Bertness et al. | 324/426 |
| 6,895,809 B2 | 5/2005 | Raichle | 73/119 |
| 6,904,796 B2 | 6/2005 | Pacsai et al. | 73/146.8 |
| 6,906,522 B2 | 6/2005 | Bertness et al. | 324/426 |
| 6,906,523 B2 | 6/2005 | Bertness et al. | 324/426 |
| 6,906,624 B2 | 6/2005 | McClelland et al. | 340/442 |
| 6,909,287 B2 | 6/2005 | Bertness | 324/427 |
| 6,909,356 B2 | 6/2005 | Brown et al. | 340/3.2 |
| 6,911,825 B2 | 6/2005 | Namaky | 324/426 |
| 6,913,483 B2 | 7/2005 | Restaino et al. | 439/504 |
| 6,914,413 B2 | 7/2005 | Bertness et al. | 320/104 |
| 6,919,725 B2 | 7/2005 | Bertness et al. | 324/433 |
| 6,930,485 B2 | 8/2005 | Bertness et al. | 324/426 |
| 6,933,727 B2 | 8/2005 | Bertness et al. | 324/426 |
| 6,941,234 B2 | 9/2005 | Bertness et al. | 702/63 |
| 6,957,133 B1 | 10/2005 | Hunt et al. | 701/32.4 |
| 6,961,445 B1 | 11/2005 | Jensen et al. | |

(56) References Cited

U.S. PATENT DOCUMENTS

| | | |
|---|---|---|
| 6,967,484 B2 | 11/2005 | Bertness ............... 324/426 |
| 6,972,662 B1 | 12/2005 | Ohkawa et al. ......... 340/10.1 |
| 6,983,212 B2 | 1/2006 | Burns .................... 702/63 |
| 6,988,053 B2 | 1/2006 | Namaky ............... 320/104 |
| 6,993,421 B2 | 1/2006 | Pillar et al. ............ 701/29.4 |
| 6,998,847 B2 | 2/2006 | Bertness et al. ........ 324/426 |
| 7,003,410 B2 | 2/2006 | Bertness et al. ........ 702/63 |
| 7,003,411 B2 | 2/2006 | Bertness ................. 702/63 |
| 7,012,433 B2 | 3/2006 | Smith et al. ............ 324/426 |
| 7,015,674 B2 | 3/2006 | VonderHaar ........... 320/103 |
| 7,029,338 B1 | 4/2006 | Orange et al. .......... 439/755 |
| 7,034,541 B2 | 4/2006 | Bertness et al. ........ 324/426 |
| 7,039,533 B2 | 5/2006 | Bertness et al. ........ 702/63 |
| 7,042,346 B2 | 5/2006 | Paulsen ................. 340/438 |
| 7,049,822 B2 | 5/2006 | Kung ..................... 324/426 |
| 7,058,525 B2 | 6/2006 | Bertness et al. ........ 702/63 |
| 7,069,979 B2 | 7/2006 | Tobias ................. 165/104.33 |
| 7,081,755 B2 | 7/2006 | Klang et al. ........... 324/426 |
| 7,089,127 B2 | 8/2006 | Thibedeau et al. ..... 702/63 |
| 7,098,666 B2 | 8/2006 | Patino .................. 324/433 |
| 7,102,556 B2 | 9/2006 | White .................. 341/141 |
| 7,106,070 B2 | 9/2006 | Bertness et al. ........ 324/538 |
| 7,116,109 B2 | 10/2006 | Klang ................... 324/426 |
| 7,119,686 B2 | 10/2006 | Bertness et al. ........ 340/572.1 |
| 7,120,488 B2 | 10/2006 | Nova et al. ............ 600/2 |
| 7,126,341 B2 | 10/2006 | Bertness et al. ........ 324/426 |
| 7,129,706 B2 | 10/2006 | Kalley .................. 324/426 |
| 7,154,276 B2 | 12/2006 | Bertness ............... 324/503 |
| 7,170,393 B2 | 1/2007 | Martin ................. 340/10.1 |
| 7,173,182 B2 | 2/2007 | Katsuyama ........... 174/36 |
| 7,177,925 B2 | 2/2007 | Carcido et al. ........ 709/223 |
| 7,182,147 B2 | 2/2007 | Cutler et al. ........... 173/1 |
| 7,184,866 B2 | 2/2007 | Squires ................. 340/426.15 |
| 7,184,905 B2 | 2/2007 | Stefan .................. 702/63 |
| 7,198,510 B2 | 4/2007 | Bertness ............... 439/500 |
| 7,200,424 B2 | 4/2007 | Tischer et al. ......... 455/567 |
| 7,202,636 B2 | 4/2007 | Reynolds et al. ...... 320/166 |
| 7,208,914 B2 | 4/2007 | Klang ................... 320/132 |
| 7,209,850 B2 | 4/2007 | Brott et al. ............ 324/426 |
| 7,209,860 B2 | 4/2007 | Trsar et al. ............ 702/183 |
| 7,212,887 B2 | 5/2007 | Shah et al. ............ 700/276 |
| 7,212,911 B2 | 5/2007 | Raichle et al. ........ 701/114 |
| 7,219,023 B2 | 5/2007 | Banke et al. .......... 702/58 |
| 7,233,128 B2 | 6/2007 | Brost et al. ........... 320/132 |
| 7,235,977 B2 | 6/2007 | Koran et al. .......... 324/426 |
| 7,246,015 B2 | 7/2007 | Bertness et al. ....... 702/63 |
| 7,251,551 B2 | 7/2007 | Mitsueda ............. 700/2 |
| 7,272,519 B2 | 9/2007 | Lesesky et al. ....... 702/63 |
| 7,287,001 B1 | 10/2007 | Falls et al. ........... 705/22 |
| 7,295,936 B2 | 11/2007 | Bertness et al. ...... 702/63 |
| 7,301,303 B1 | 11/2007 | Hulden ............... 320/103 |
| 7,319,304 B2 | 1/2008 | Veloo et al. .......... 320/134 |
| 7,339,477 B2 | 3/2008 | Puzio et al. .......... 340/572.1 |
| 7,363,175 B2 | 4/2008 | Bertness et al. ...... 702/63 |
| 7,376,497 B2 | 5/2008 | Chen .................. 701/31.6 |
| 7,398,176 B2 | 7/2008 | Bertness ............. 702/140 |
| 7,408,358 B2 | 8/2008 | Knopf ................ 324/426 |
| 7,425,833 B2 | 9/2008 | Bertness et al. ...... 324/426 |
| 7,446,536 B2 | 11/2008 | Bertness ............. 324/426 |
| 7,453,238 B2 | 11/2008 | Melichar ............. 320/132 |
| 7,479,763 B2 | 1/2009 | Bertness ............. 320/134 |
| 7,498,767 B2 | 3/2009 | Brown et al. ........ 320/107 |
| 7,501,795 B2 | 3/2009 | Bertness et al. ...... 320/134 |
| 7,504,830 B2 | 3/2009 | Keuss |
| 7,505,856 B2 | 3/2009 | Restaino et al. ..... 702/63 |
| 7,538,571 B2 | 5/2009 | Raichle et al. ....... 324/772 |
| 7,545,146 B2 | 6/2009 | Klang et al. ......... 324/426 |
| 7,557,586 B1 | 7/2009 | Vonderhaar et al. .. 324/437 |
| 7,571,035 B2 | 8/2009 | Raichle |
| 7,590,476 B2 | 9/2009 | Shumate ............. 701/31.6 |
| 7,592,776 B2 | 9/2009 | Tsukamoto et al. ... 320/136 |
| 7,595,643 B2 | 9/2009 | Klang ................. 324/426 |
| 7,596,437 B1 | 9/2009 | Hunt et al. |
| 7,598,699 B2 | 10/2009 | Restaino et al. ..... 320/105 |
| 7,598,743 B2 | 10/2009 | Bertness ............. 324/426 |
| 7,598,744 B2 | 10/2009 | Bertness et al. ...... 324/426 |
| 7,619,417 B2 | 11/2009 | Klang ................. 324/427 |
| 7,642,786 B2 | 1/2010 | Philbrook ............ 324/426 |
| 7,642,787 B2 | 1/2010 | Bertness et al. ...... 324/426 |
| 7,656,162 B2 | 2/2010 | Vonderhaar et al. .. 324/426 |
| 7,657,386 B2 | 2/2010 | Thibedeau et al. ... 702/63 |
| 7,667,437 B2 | 2/2010 | Johnson et al. ...... 320/150 |
| 7,679,325 B2 | 3/2010 | Seo .................... 320/116 |
| 7,684,908 B1 | 3/2010 | Ogilvie et al. ....... 701/29.6 |
| 7,688,074 B2 | 3/2010 | Cox et al. ........... 324/426 |
| 7,690,573 B2 | 4/2010 | Raichle et al. ....... 235/462 |
| 7,696,759 B2 | 4/2010 | Raichle et al. ....... 324/538 |
| 7,698,179 B2 | 4/2010 | Leung et al. ........ 705/28 |
| 7,705,602 B2 | 4/2010 | Bertness ............. 324/426 |
| 7,706,991 B2 | 4/2010 | Bertness et al. ...... 702/63 |
| 7,706,992 B2 | 4/2010 | Ricci et al. |
| 7,710,119 B2 | 5/2010 | Bertness ............. 324/426 |
| 7,723,993 B2 | 5/2010 | Klang ................. 324/431 |
| 7,728,556 B2 | 6/2010 | Yano et al. .......... 320/134 |
| 7,728,597 B2 | 6/2010 | Bertness ............. 324/426 |
| 7,729,880 B1 | 6/2010 | Mashburn ........... 702/151 |
| 7,743,788 B2 | 6/2010 | Schmitt .............. 137/554 |
| 7,751,953 B2 | 7/2010 | Namaky ............. 701/33.2 |
| 7,772,850 B2 | 8/2010 | Bertness ............. 324/426 |
| 7,774,130 B2 | 8/2010 | Pepper ............... 340/439 |
| 7,774,151 B2 | 8/2010 | Bertness ............. 702/63 |
| 7,777,612 B2 | 8/2010 | Sampson et al. ..... 340/426.1 |
| 7,791,348 B2 | 9/2010 | Brown et al. ........ 324/426 |
| 7,797,995 B2 | 9/2010 | Schaefer |
| 7,808,375 B2 | 10/2010 | Bertness et al. ...... 340/455 |
| 7,848,857 B2 | 12/2010 | Nasr et al. ........... 701/22 |
| 7,883,002 B2 | 2/2011 | Jin et al. ............. 235/376 |
| 7,902,990 B2 | 3/2011 | Delmonico et al. ... 340/636.1 |
| 7,914,350 B1 | 3/2011 | Bozich ............... 439/506 |
| 7,924,015 B2 | 4/2011 | Bertness ............. 324/427 |
| 7,940,052 B2 | 5/2011 | Vonderhaar |
| 7,940,053 B2 | 5/2011 | Brown et al. ........ 324/426 |
| 7,959,476 B2 | 6/2011 | Smith et al. |
| 7,977,914 B2 | 7/2011 | Bertness |
| D643,759 S | 8/2011 | Bertness |
| 7,990,155 B2 | 8/2011 | Henningson ........ 324/429 |
| 7,999,505 B2 | 8/2011 | Bertness ............. 320/104 |
| 8,024,083 B2 | 9/2011 | Chenn ............... 701/2 |
| 8,047,868 B2 | 11/2011 | Korcynski ........... 439/522 |
| 8,164,343 B2 | 4/2012 | Bertness ............. 324/503 |
| 8,198,900 B2 | 6/2012 | Bertness et al. |
| 8,203,345 B2 | 6/2012 | Bertness |
| 8,222,868 B2 | 7/2012 | Buckner ............. 320/136 |
| 8,226,008 B2 | 7/2012 | Raichle et al. ....... 235/462.13 |
| 8,237,448 B2 | 8/2012 | Bertness |
| 8,306,690 B2 | 11/2012 | Bertness ............. 701/34.4 |
| 8,310,271 B2 | 11/2012 | Raichle et al. ....... 324/765.01 |
| 8,344,685 B2 | 1/2013 | Bertness et al. |
| 8,436,619 B2 | 5/2013 | Bertness et al. |
| 8,442,877 B2 | 5/2013 | Bertness et al. |
| 8,449,560 B2 | 5/2013 | Roth ................. 227/175.1 |
| 8,493,022 B2 | 7/2013 | Bertness |
| D687,727 S | 8/2013 | Kehoe et al. |
| 8,509,212 B2 | 8/2013 | Sanjeev |
| 8,513,949 B2 | 8/2013 | Bertness |
| 8,594,957 B2 | 11/2013 | Gauthier ............ 324/548 |
| 8,674,654 B2 | 3/2014 | Bertness |
| 8,674,711 B2 | 3/2014 | Bertness |
| 8,704,483 B2 | 4/2014 | Bertness et al. |
| 8,738,309 B2 | 5/2014 | Bertness |
| 8,754,653 B2 | 6/2014 | Volderhaar et al. |
| 8,810,200 B2 | 8/2014 | Kondo |
| 8,825,272 B1 | 9/2014 | Chinnadurai |
| 8,827,729 B2 | 9/2014 | Gunreben ........... 439/188 |
| 8,872,516 B2 | 10/2014 | Bertness |
| 8,872,517 B2 | 10/2014 | Philbrook et al. |
| 8,901,888 B1 | 12/2014 | Beckman |
| 8,958,998 B2 | 2/2015 | Bertness |
| 8,963,550 B2 | 2/2015 | Bertness et al. |
| 9,018,958 B2 | 4/2015 | Bertness |
| 9,037,394 B2 | 5/2015 | Fernandes .......... 701/400 |
| 9,052,366 B2 | 6/2015 | Bertness |
| 9,056,556 B1 | 6/2015 | Hyde et al. |
| 9,166,261 B2 | 10/2015 | Ibi |

(56) References Cited

U.S. PATENT DOCUMENTS

| | | |
|---|---|---|
| 9,201,120 B2 | 12/2015 | Stukenburg |
| 9,229,062 B2 | 1/2016 | Stukenberg |
| 9,244,100 B2 | 1/2016 | Coleman et al. |
| 9,255,955 B2 | 2/2016 | Bertness .................. 324/503 |
| 9,274,157 B2 | 3/2016 | Bertness |
| 9,312,575 B2 | 4/2016 | Stukenberg |
| 9,335,362 B2 | 5/2016 | Bertness |
| 9,419,311 B2 | 8/2016 | Bertness |
| 9,425,487 B2 | 8/2016 | Bertness |
| 9,496,720 B2 | 11/2016 | McShane |
| 9,588,185 B2 | 3/2017 | Champlin |
| 9,639,899 B1 | 5/2017 | Gersitz |
| 9,923,289 B2 | 3/2018 | Bertness |
| 9,966,676 B2 | 5/2018 | Salo, III et al. |
| 10,046,649 B2 | 8/2018 | Bertness |
| 10,222,397 B2 | 3/2019 | Salo et al. |
| 10,317,468 B2 | 6/2019 | Bertness |
| 10,429,449 B2 | 10/2019 | Arnoldus |
| 10,473,555 B2 | 11/2019 | Bertness |
| 10,525,841 B2 | 1/2020 | Zhou et al. |
| 10,608,353 B2 | 3/2020 | Lipkin et al. |
| 10,843,574 B2 | 11/2020 | Palmisano et al. |
| 11,054,480 B2 | 7/2021 | Bertness |
| 11,325,479 B2 | 5/2022 | Bertness |
| 11,474,153 B2 | 10/2022 | Salo, III et al. |
| 11,486,930 B2 | 11/2022 | Salo, III et al. |
| 11,513,160 B2 | 11/2022 | Salo, III et al. |
| 11,545,839 B2 | 1/2023 | Sampson et al. |
| 11,548,404 B2 | 1/2023 | Bertness |
| 11,566,972 B2 | 1/2023 | Sampson et al. |
| 11,650,259 B2 | 5/2023 | Bertness |
| 11,668,779 B2 * | 6/2023 | Bertness .................. H02J 7/005 |
| | | 324/426 |
| 11,740,294 B2 * | 8/2023 | Bertness .................. B60L 58/21 |
| | | 324/426 |
| 11,745,593 B1 * | 9/2023 | Awad Alla ............ B60L 58/20 |
| | | 307/127 |
| 11,926,224 B2 | 3/2024 | Bertness |
| 11,973,202 B2 * | 4/2024 | Bertness .................. B60L 53/60 |
| 12,196,813 B2 * | 1/2025 | Bertness .................. B60L 53/80 |
| 2001/0012738 A1 | 8/2001 | Duperret .................. 439/835 |
| 2001/0033169 A1 | 10/2001 | Singh ........................ 324/426 |
| 2001/0035737 A1 | 11/2001 | Nakanishi et al. .......... 320/122 |
| 2001/0048215 A1 | 12/2001 | Breed et al. ............ 280/728.1 |
| 2001/0048226 A1 | 12/2001 | Nada ........................... 290/40 |
| 2002/0003423 A1 | 1/2002 | Bertness et al. .......... 324/426 |
| 2002/0004694 A1 | 1/2002 | McLeod ...................... 701/29 |
| 2002/0007237 A1 | 1/2002 | Phung et al. ............... 701/33 |
| 2002/0010558 A1 | 1/2002 | Bertness et al. ............ 702/63 |
| 2002/0018927 A1 | 2/2002 | Thomsen et al. |
| 2002/0021135 A1 | 2/2002 | Li et al. .................... 324/677 |
| 2002/0027346 A1 | 3/2002 | Breed et al. ............... 280/735 |
| 2002/0030495 A1 | 3/2002 | Kechmire ................. 324/427 |
| 2002/0036504 A1 | 3/2002 | Troy et al. ................ 324/430 |
| 2002/0041175 A1 | 4/2002 | Lauper et al. ............. 320/106 |
| 2002/0044050 A1 | 4/2002 | Derbyshire et al. ....... 340/442 |
| 2002/0047711 A1 | 4/2002 | Bertness et al. .......... 324/426 |
| 2002/0050163 A1 | 5/2002 | Makhija et al. ............. 73/116 |
| 2002/0065619 A1 | 5/2002 | Bertness .................... 702/63 |
| 2002/0074398 A1 | 6/2002 | Lancos et al. ............. 235/382 |
| 2002/0116140 A1 | 8/2002 | Rider ......................... 702/63 |
| 2002/0118111 A1 | 8/2002 | Brown et al. ........... 340/573.1 |
| 2002/0121877 A1 | 9/2002 | Smith et al. |
| 2002/0121901 A1 | 9/2002 | Hoffman .................. 324/426 |
| 2002/0128985 A1 | 9/2002 | Greenwald ............... 705/400 |
| 2002/0130665 A1 | 9/2002 | Bertness et al. .......... 324/426 |
| 2002/0152791 A1 | 10/2002 | Cardinale |
| 2002/0153864 A1 | 10/2002 | Bertness .................. 320/132 |
| 2002/0171428 A1 | 11/2002 | Bertness .................... 702/63 |
| 2002/0193955 A1 | 12/2002 | Bertness .................... 702/63 |
| 2003/0006779 A1 | 1/2003 | H. Youval ................ 324/503 |
| 2003/0009270 A1 | 1/2003 | Breed ......................... 701/29 |
| 2003/0017753 A1 | 1/2003 | Palmisano et al. ........ 439/762 |
| 2003/0025481 A1 | 2/2003 | Bertness .................. 324/427 |
| 2003/0030442 A1 | 2/2003 | Sugimoto ................ 324/429 |
| 2003/0036909 A1 | 2/2003 | Kato ......................... 704/275 |
| 2003/0038637 A1 | 2/2003 | Bertness et al. |
| 2003/0040873 A1 | 2/2003 | Lesesky et al. ............. 702/57 |
| 2003/0060953 A1 | 3/2003 | Chen ......................... 701/33 |
| 2003/0078743 A1 | 4/2003 | Bertness et al. ............ 702/63 |
| 2003/0088375 A1 | 5/2003 | Bertness et al. ............ 702/63 |
| 2003/0090272 A1 | 5/2003 | Bertness .................. 324/426 |
| 2003/0114206 A1 | 6/2003 | Timothy ................. 455/575.7 |
| 2003/0124417 A1 | 7/2003 | Bertness et al. ............ 429/90 |
| 2003/0128011 A1 | 7/2003 | Bertness et al. |
| 2003/0128036 A1 | 7/2003 | Henningson et al. ....... 324/426 |
| 2003/0137277 A1 | 7/2003 | Mori et al. ................ 320/132 |
| 2003/0155930 A1 | 8/2003 | Thomsen |
| 2003/0164073 A1 | 9/2003 | Chen |
| 2003/0169018 A1 | 9/2003 | Berels et al. ............. 320/132 |
| 2003/0169019 A1 | 9/2003 | Oosaki ..................... 320/132 |
| 2003/0171111 A1 | 9/2003 | Clark ..................... 455/414.1 |
| 2003/0173971 A1 | 9/2003 | Bertness .................. 324/441 |
| 2003/0177417 A1 | 9/2003 | Malhotra et al. ........... 714/42 |
| 2003/0184262 A1 | 10/2003 | Makhija ................... 320/156 |
| 2003/0184264 A1 | 10/2003 | Bertness |
| 2003/0184306 A1 | 10/2003 | Bertness et al. .......... 324/426 |
| 2003/0187556 A1 | 10/2003 | Suzuki ....................... 701/29 |
| 2003/0194672 A1 | 10/2003 | Roberts et al. ............ 431/196 |
| 2003/0197512 A1 | 10/2003 | Miller et al. ............. 324/426 |
| 2003/0212311 A1 | 11/2003 | Nova et al. ............... 600/300 |
| 2003/0214395 A1 | 11/2003 | Flowerday et al. ......... 340/445 |
| 2003/0224241 A1 | 12/2003 | Takada et al. .............. 429/52 |
| 2003/0236656 A1 | 12/2003 | Dougherty ................. 703/14 |
| 2004/0000590 A1 | 1/2004 | Raichle et al. ......... 235/462.01 |
| 2004/0000891 A1 | 1/2004 | Raichle et al. ............ 320/107 |
| 2004/0000893 A1 | 1/2004 | Raichle et al. ............ 320/135 |
| 2004/0000913 A1 | 1/2004 | Raichle et al. ............ 324/426 |
| 2004/0000915 A1 | 1/2004 | Raichle et al. ............ 324/522 |
| 2004/0002824 A1 | 1/2004 | Raichle et al. ............. 702/63 |
| 2004/0002825 A1 | 1/2004 | Raichle et al. ............. 702/63 |
| 2004/0002836 A1 | 1/2004 | Raichle et al. ............ 702/188 |
| 2004/0032264 A1 | 2/2004 | Schoch ..................... 324/426 |
| 2004/0036443 A1 | 2/2004 | Bertness .................. 320/109 |
| 2004/0044452 A1 | 3/2004 | Bauer et al. ............... 703/33 |
| 2004/0044454 A1 | 3/2004 | Ross et al. ................. 701/33 |
| 2004/0046564 A1 | 3/2004 | Klang ...................... 324/426 |
| 2004/0049361 A1 | 3/2004 | Hamdan et al. ........... 702/115 |
| 2004/0051532 A1 | 3/2004 | Smith et al. .............. 324/426 |
| 2004/0051533 A1 | 3/2004 | Namaky ................... 324/426 |
| 2004/0051534 A1 | 3/2004 | Kobayashi et al. ........ 324/429 |
| 2004/0054503 A1 | 3/2004 | Namaky ................... 702/182 |
| 2004/0064225 A1 | 4/2004 | Jammu et al. .............. 701/29 |
| 2004/0065489 A1 | 4/2004 | Aberle .................... 180/65.1 |
| 2004/0088087 A1 | 5/2004 | Fukushima et al. ......... 701/32 |
| 2004/0090208 A1 | 5/2004 | Almerich |
| 2004/0104728 A1 | 6/2004 | Bertness et al. .......... 324/429 |
| 2004/0108855 A1 | 6/2004 | Raichle .................... 324/378 |
| 2004/0108856 A1 | 6/2004 | Johnson ................... 324/426 |
| 2004/0113494 A1 | 6/2004 | Karuppana et al. |
| 2004/0113588 A1 | 6/2004 | Mikuriya et al. .......... 320/128 |
| 2004/0145342 A1 | 7/2004 | Lyon ........................ 320/108 |
| 2004/0145371 A1 | 7/2004 | Bertness .................. 324/426 |
| 2004/0150494 A1 | 8/2004 | Yoshida .................... 333/243 |
| 2004/0157113 A1 | 8/2004 | Klang ........................ 429/50 |
| 2004/0164706 A1 | 8/2004 | Osborne ................... 320/116 |
| 2004/0172177 A1 | 9/2004 | Nagai et al. ................ 701/29 |
| 2004/0178185 A1 | 9/2004 | Yoshikawa et al. ......... 219/270 |
| 2004/0189309 A1 | 9/2004 | Bertness et al. .......... 324/426 |
| 2004/0199343 A1 | 10/2004 | Cardinal et al. ............ 702/63 |
| 2004/0207367 A1 | 10/2004 | Taniguchi et al. .......... 320/149 |
| 2004/0212350 A1 | 10/2004 | Patino et al. |
| 2004/0221641 A1 | 11/2004 | Moritsugu ................ 73/23.31 |
| 2004/0227523 A1 | 11/2004 | Namaky ................... 324/537 |
| 2004/0239332 A1 | 12/2004 | Mackel et al. ............ 324/426 |
| 2004/0251876 A1 | 12/2004 | Bertness et al. .......... 320/136 |
| 2004/0251907 A1 | 12/2004 | Kalley |
| 2004/0257084 A1 | 12/2004 | Restaino ................... 324/400 |
| 2005/0007068 A1 | 1/2005 | Johnson et al. ........... 320/110 |
| 2005/0009122 A1 | 1/2005 | Whelan et al. ........... 435/7.32 |
| 2005/0017726 A1 | 1/2005 | Koran et al. .............. 324/433 |
| 2005/0017952 A1 | 1/2005 | His ........................... 345/169 |
| 2005/0021197 A1 | 1/2005 | Zimmerman ............ 701/31.4 |
| 2005/0021294 A1 | 1/2005 | Trsar et al. ............... 702/183 |

(56) References Cited

U.S. PATENT DOCUMENTS

| | | | |
|---|---|---|---|
| 2005/0021475 A1 | 1/2005 | Bertness | 705/63 |
| 2005/0025299 A1 | 2/2005 | Tischer et al. | 379/199 |
| 2005/0035752 A1 | 2/2005 | Bertness | |
| 2005/0043868 A1 | 2/2005 | Mitcham | 701/29 |
| 2005/0057256 A1 | 3/2005 | Bertness | 324/426 |
| 2005/0060070 A1 | 3/2005 | Kapolka et al. | 701/29 |
| 2005/0073314 A1 | 4/2005 | Bertness et al. | 324/433 |
| 2005/0076381 A1 | 4/2005 | Gross | 725/107 |
| 2005/0077904 A1 | 4/2005 | Bertness | 324/426 |
| 2005/0096809 A1 | 5/2005 | Skeen et al. | 701/29 |
| 2005/0099185 A1 | 5/2005 | Klang | |
| 2005/0102073 A1 | 5/2005 | Ingram | 701/29 |
| 2005/0119809 A1 | 6/2005 | Chen | 701/33.5 |
| 2005/0128083 A1 | 6/2005 | Puzio et al. | 340/572.1 |
| 2005/0128902 A1 | 6/2005 | Tsai | 369/44.32 |
| 2005/0133245 A1 | 6/2005 | Katsuyama | 174/74 R |
| 2005/0134282 A1 | 6/2005 | Averbuch | 324/426 |
| 2005/0143882 A1 | 6/2005 | Umezawa | 701/29 |
| 2005/0159847 A1 | 7/2005 | Shah et al. | 700/276 |
| 2005/0162172 A1 | 7/2005 | Bertness | 324/426 |
| 2005/0168226 A1 | 8/2005 | Quint et al. | 324/426 |
| 2005/0173142 A1 | 8/2005 | Cutler et al. | 173/181 |
| 2005/0182536 A1 | 8/2005 | Doyle et al. | 701/29 |
| 2005/0184732 A1 | 8/2005 | Restaino | 324/426 |
| 2005/0192045 A1 | 9/2005 | Lowles | |
| 2005/0206346 A1 | 9/2005 | Smith et al. | |
| 2005/0212521 A1 | 9/2005 | Bertness et al. | 324/426 |
| 2005/0213874 A1 | 9/2005 | Kline | 385/15 |
| 2005/0214144 A1 | 9/2005 | Yoshida | |
| 2005/0218902 A1 | 10/2005 | Restaino et al. | 324/433 |
| 2005/0231205 A1 | 10/2005 | Bertness et al. | 324/426 |
| 2005/0254106 A9 | 11/2005 | Silverbrook et al. | 358/539 |
| 2005/0256617 A1 | 11/2005 | Cawthorne et al. | 701/22 |
| 2005/0258241 A1 | 11/2005 | McNutt et al. | 235/385 |
| 2005/0264296 A1 | 12/2005 | Philbrook | 324/433 |
| 2005/0269880 A1 | 12/2005 | Konishi | 307/10.7 |
| 2005/0273218 A1 | 12/2005 | Breed | 701/2 |
| 2006/0012330 A1 | 1/2006 | Okumura et al. | 320/103 |
| 2006/0017447 A1 | 1/2006 | Bertness | 324/538 |
| 2006/0026017 A1 | 2/2006 | Walkder | 701/31.4 |
| 2006/0030980 A1 | 2/2006 | St. Denis | 701/29 |
| 2006/0038572 A1 | 2/2006 | Philbrook | |
| 2006/0043976 A1 | 3/2006 | Gervais | 324/508 |
| 2006/0061469 A1 | 3/2006 | Jaeger | 340/539.13 |
| 2006/0076923 A1 | 4/2006 | Eaves | 320/104 |
| 2006/0079203 A1 | 4/2006 | Nicolini | 455/411 |
| 2006/0089767 A1 | 4/2006 | Sowa | 701/29 |
| 2006/0090554 A1 | 5/2006 | Krampitz | |
| 2006/0090555 A1 | 5/2006 | Krampitz | |
| 2006/0091597 A1 | 5/2006 | Opsahl | |
| 2006/0092584 A1 | 5/2006 | Raichle | |
| 2006/0095230 A1 | 5/2006 | Grier et al. | 702/183 |
| 2006/0102397 A1 | 5/2006 | Buck | 429/432 |
| 2006/0125482 A1 | 6/2006 | Klang | |
| 2006/0136119 A1 | 6/2006 | Raichle | |
| 2006/0139167 A1 | 6/2006 | Davie | |
| 2006/0152224 A1 | 7/2006 | Kim et al. | 324/430 |
| 2006/0155439 A1 | 7/2006 | Slawinski | 701/33.4 |
| 2006/0161313 A1 | 7/2006 | Rogers et al. | 701/1 |
| 2006/0161390 A1 | 7/2006 | Namaky et al. | 702/183 |
| 2006/0217914 A1 | 9/2006 | Bertness | 702/113 |
| 2006/0244456 A1 | 11/2006 | Henningson | |
| 2006/0244457 A1 | 11/2006 | Henningson et al. | 324/426 |
| 2006/0282227 A1 | 12/2006 | Bertness | |
| 2006/0282323 A1 | 12/2006 | Walker et al. | 705/14 |
| 2007/0005201 A1 | 1/2007 | Chenn | 701/31.5 |
| 2007/0024460 A1 | 2/2007 | Clark | 340/663 |
| 2007/0026916 A1 | 2/2007 | Juds et al. | 463/1 |
| 2007/0046261 A1 | 3/2007 | Porebski | 320/132 |
| 2007/0082652 A1 | 4/2007 | Hartigan | |
| 2007/0088472 A1 | 4/2007 | Ganzhorn et al. | 701/33 |
| 2007/0108942 A1 | 5/2007 | Johnson et al. | 320/112 |
| 2007/0159177 A1 | 7/2007 | Bertness et al. | 324/426 |
| 2007/0182576 A1 | 8/2007 | Proska et al. | 340/636.1 |
| 2007/0194791 A1 | 8/2007 | Huang | 324/430 |
| 2007/0194793 A1 | 8/2007 | Bertness | 324/503 |
| 2007/0205752 A1 | 9/2007 | Leigh | 324/500 |
| 2007/0205983 A1 | 9/2007 | Naimo | 345/160 |
| 2007/0210801 A1 | 9/2007 | Krampitz | 324/426 |
| 2007/0244660 A1 | 10/2007 | Bertness | |
| 2007/0259256 A1 | 11/2007 | Le Canut et al. | 429/90 |
| 2007/0279066 A1 | 12/2007 | Chism | 324/437 |
| 2008/0023547 A1 | 1/2008 | Raichle | 235/462.13 |
| 2008/0036421 A1 | 2/2008 | Seo et al. | 320/132 |
| 2008/0053716 A1 | 3/2008 | Scheucher | 180/2.1 |
| 2008/0059014 A1 | 3/2008 | Nasr et al. | 701/22 |
| 2008/0064559 A1 | 3/2008 | Cawthorne | 477/5 |
| 2008/0086246 A1 | 4/2008 | Bolt et al. | 701/29 |
| 2008/0087479 A1 | 4/2008 | Kang | |
| 2008/0094068 A1 | 4/2008 | Scott | 324/426 |
| 2008/0103656 A1 | 5/2008 | Lipscomb | 701/33.4 |
| 2008/0106267 A1 | 5/2008 | Bertness | 320/112 |
| 2008/0169818 A1 | 7/2008 | Lesesky et al. | 324/426 |
| 2008/0179122 A1 | 7/2008 | Sugawara | 180/65.245 |
| 2008/0194984 A1 | 8/2008 | Keefe | 600/559 |
| 2008/0238357 A1 | 10/2008 | Bourilkov et al. | |
| 2008/0256815 A1 | 10/2008 | Schafer | |
| 2008/0303528 A1 | 12/2008 | Kim | 324/430 |
| 2008/0303529 A1 | 12/2008 | Nakamura et al. | 324/433 |
| 2008/0315830 A1 | 12/2008 | Bertness | 320/104 |
| 2009/0006476 A1 | 1/2009 | Andreasen et al. | 707/104.1 |
| 2009/0011327 A1 | 1/2009 | Okumura et al. | 429/99 |
| 2009/0013521 A1 | 1/2009 | Okumura et al. | 29/730 |
| 2009/0024266 A1 | 1/2009 | Bertness | 701/22 |
| 2009/0024419 A1 | 1/2009 | McClellan | 705/4 |
| 2009/0085571 A1 | 4/2009 | Bertness | 324/426 |
| 2009/0146610 A1 | 6/2009 | Trigiani | |
| 2009/0146800 A1 | 6/2009 | Grimlund et al. | 340/505 |
| 2009/0160395 A1 | 6/2009 | Chen | 320/101 |
| 2009/0184165 A1 | 7/2009 | Bertness et al. | |
| 2009/0198372 A1 | 8/2009 | Hammerslag | 700/226 |
| 2009/0203247 A1 | 8/2009 | Fifelski | 439/345 |
| 2009/0237029 A1 | 9/2009 | Andelfinger | 320/108 |
| 2009/0237086 A1 | 9/2009 | Andelfinger | 324/431 |
| 2009/0247020 A1 | 10/2009 | Gathman et al. | 439/759 |
| 2009/0251151 A1 | 10/2009 | Miyashita | |
| 2009/0259432 A1 | 10/2009 | Liberty | 702/150 |
| 2009/0265121 A1 | 10/2009 | Rocci | 702/57 |
| 2009/0273451 A1 | 11/2009 | Soppera et al. | |
| 2009/0276115 A1 | 11/2009 | Chen | 701/32 |
| 2009/0311919 A1 | 12/2009 | Smith | 439/759 |
| 2010/0023198 A1 | 1/2010 | Hamilton | 701/29 |
| 2010/0039065 A1 | 2/2010 | Kinkade | 320/104 |
| 2010/0052193 A1 | 3/2010 | Sylvester | 261/26 |
| 2010/0066283 A1 | 3/2010 | Kitanaka | 318/400.02 |
| 2010/0088050 A1 | 4/2010 | Keuss | 702/63 |
| 2010/0094496 A1 | 4/2010 | Hershkovitz et al. | |
| 2010/0117603 A1 | 5/2010 | Makhija | 320/162 |
| 2010/0145780 A1 | 6/2010 | Nishikawa et al. | 705/14.11 |
| 2010/0214055 A1 | 8/2010 | Fuji | 340/3.1 |
| 2010/0265131 A1 | 10/2010 | Fabius | |
| 2010/0314950 A1 | 12/2010 | Rutkowski et al. | 307/125 |
| 2011/0004427 A1 | 1/2011 | Gorbold et al. | 702/63 |
| 2011/0015815 A1 | 1/2011 | Bertness | 701/22 |
| 2011/0106280 A1 | 5/2011 | Zeier | 700/90 |
| 2011/0127960 A1 | 6/2011 | Plett | |
| 2011/0161025 A1 | 6/2011 | Tomura | 702/63 |
| 2011/0215767 A1 | 9/2011 | Johnson et al. | 320/136 |
| 2011/0218747 A1 | 9/2011 | Bertness | 702/63 |
| 2011/0239445 A1 | 10/2011 | Ibi | |
| 2011/0258112 A1 | 10/2011 | Eder et al. | |
| 2011/0265025 A1 | 10/2011 | Bertness | |
| 2011/0267067 A1 | 11/2011 | Bertness et al. | |
| 2011/0273181 A1 | 11/2011 | Park et al. | 324/429 |
| 2011/0294367 A1 | 12/2011 | Moon | 439/878 |
| 2011/0300416 A1 | 12/2011 | Bertness | |
| 2012/0041697 A1 | 2/2012 | Stukenberg | 702/63 |
| 2012/0046807 A1 | 2/2012 | Ruther | 701/2 |
| 2012/0046824 A1 | 2/2012 | Ruther et al. | 701/31.5 |
| 2012/0062237 A1 | 3/2012 | Robinson | 324/433 |
| 2012/0074904 A1 | 3/2012 | Rutkowski et al. | 320/112 |
| 2012/0086399 A1 | 4/2012 | Choi | |
| 2012/0091962 A1 | 4/2012 | DeFrank et al. | |
| 2012/0116391 A1 | 5/2012 | Houser | 606/41 |

(56) References Cited

U.S. PATENT DOCUMENTS

| | | |
|---|---|---|
| 2012/0182132 A1 | 7/2012 | McShane |
| 2012/0249069 A1 | 10/2012 | Ohtomo ............... 320/109 |
| 2012/0256494 A1 | 10/2012 | Kesler ............... 307/104 |
| 2012/0256568 A1 | 10/2012 | Lee ............... 318/139 |
| 2012/0274331 A1 | 11/2012 | Liu ............... 324/426 |
| 2012/0293372 A1 | 11/2012 | Amendolare ............... 342/451 |
| 2013/0049678 A1 | 2/2013 | Li |
| 2013/0099747 A1 | 4/2013 | Baba ............... 310/118 |
| 2013/0106362 A1 | 5/2013 | Mackintosh et al. |
| 2013/0106596 A1 | 5/2013 | Mouchet |
| 2013/0115821 A1 | 5/2013 | Golko ............... 439/638 |
| 2013/0134926 A1 | 5/2013 | Yoshida |
| 2013/0158782 A1 | 6/2013 | Bertness et al. ............... 701/34.4 |
| 2013/0172019 A1 | 7/2013 | Youssef ............... 455/456.6 |
| 2013/0200855 A1 | 8/2013 | Christensen et al. |
| 2013/0218781 A1 | 8/2013 | Simon |
| 2013/0288706 A1 | 10/2013 | Yu ............... 455/456.1 |
| 2013/0297247 A1 | 11/2013 | Jardine |
| 2013/0311124 A1 | 11/2013 | Bremen ............... 702/104 |
| 2013/0314041 A1 | 11/2013 | Proebstle ............... 320/109 |
| 2013/0325405 A1 | 12/2013 | Miller |
| 2014/0002021 A1 | 1/2014 | Bertness |
| 2014/0002094 A1 | 1/2014 | Champlin ............... 324/426 |
| 2014/0029308 A1 | 1/2014 | Cojocaru ............... 363/13 |
| 2014/0081527 A1 | 3/2014 | Miller |
| 2014/0091762 A1 | 4/2014 | Kondo |
| 2014/0099830 A1 | 4/2014 | Byrne ............... 439/638 |
| 2014/0117997 A1 | 5/2014 | Bertness ............... 324/426 |
| 2014/0132223 A1 | 5/2014 | Kerfoot, Jr. |
| 2014/0145670 A1 | 5/2014 | van Zwan et al. |
| 2014/0162497 A1* | 6/2014 | Lim ............... H01R 13/629 |
| | | 439/620.26 |
| 2014/0194084 A1 | 7/2014 | Noonan ............... 455/404.1 |
| 2014/0225622 A1 | 8/2014 | Kudo ............... 324/433 |
| 2014/0239964 A1 | 8/2014 | Gach ............... 324/433 |
| 2014/0260577 A1 | 9/2014 | Chinnadurai |
| 2014/0266061 A1 | 9/2014 | Wachal |
| 2014/0278159 A1 | 9/2014 | Chinnadurai |
| 2014/0333313 A1 | 11/2014 | Surampudi |
| 2014/0354237 A1 | 12/2014 | Cotton |
| 2014/0368156 A1 | 12/2014 | Aloe |
| 2014/0374475 A1 | 12/2014 | Kallfelz et al. |
| 2015/0093922 A1 | 4/2015 | Bosscher ............... 439/39 |
| 2015/0115720 A1 | 4/2015 | Hysell ............... 307/65 |
| 2015/0166518 A1 | 6/2015 | Boral et al. |
| 2015/0168499 A1 | 6/2015 | Palmisano |
| 2015/0221135 A1 | 8/2015 | Hill ............... 345/633 |
| 2015/0239365 A1 | 8/2015 | Hyde et al. |
| 2015/0353192 A1 | 12/2015 | Morrison |
| 2016/0011271 A1 | 1/2016 | Bertness |
| 2016/0013523 A1 | 1/2016 | Anzicek |
| 2016/0091571 A1 | 3/2016 | Salo, III |
| 2016/0154044 A1 | 6/2016 | Bertness |
| 2016/0171799 A1 | 6/2016 | Bertness |
| 2016/0216335 A1 | 7/2016 | Bertness |
| 2016/0226280 A1 | 8/2016 | Noor et al. |
| 2016/0232736 A1 | 8/2016 | Holtappels |
| 2016/0238667 A1 | 8/2016 | Palmisano et al. |
| 2016/0253852 A1 | 9/2016 | Bertness et al. |
| 2016/0266212 A1 | 9/2016 | Carlo |
| 2016/0285284 A1 | 9/2016 | Matlapudi et al. |
| 2016/0321897 A1 | 11/2016 | Lee |
| 2016/0336623 A1 | 11/2016 | Nayar |
| 2017/0093056 A1 | 3/2017 | Salo, III et al. |
| 2017/0146602 A1 | 5/2017 | Samp |
| 2017/0158058 A1 | 6/2017 | Lee et al. |
| 2017/0373410 A1 | 12/2017 | Lipkin et al. |
| 2018/0009328 A1 | 1/2018 | Hinterberger et al. |
| 2018/0113171 A1 | 4/2018 | Bertness |
| 2018/0301913 A1 | 10/2018 | Irish et al. |
| 2018/0306867 A1 | 10/2018 | Bertness |
| 2019/0105998 A1 | 4/2019 | Bertness |
| 2019/0152332 A1 | 5/2019 | Bertness |
| 2019/0154763 A1 | 5/2019 | Bertness |
| 2019/0204392 A1 | 7/2019 | Bertness |
| 2020/0076129 A1* | 3/2020 | Kitahara ............... H01H 27/00 |
| 2020/0086757 A1 | 3/2020 | Vain et al. |
| 2020/0161630 A1 | 5/2020 | Zeng |
| 2020/0174078 A1 | 6/2020 | Salo, III et al. |
| 2020/0274370 A1 | 8/2020 | Krieg |
| 2021/0048374 A1 | 2/2021 | Sampson et al. |
| 2021/0049480 A1 | 2/2021 | Kale et al. |
| 2021/0135462 A1 | 5/2021 | Sampson et al. |
| 2021/0141021 A1 | 5/2021 | Salo, III et al. |
| 2021/0141043 A1 | 5/2021 | Bertness |
| 2021/0203016 A1* | 7/2021 | Bertness ............... B60L 3/12 |
| 2021/0231737 A1 | 7/2021 | Salo, III et al. |
| 2021/0325471 A1 | 10/2021 | Bertness |
| 2022/0050142 A1 | 2/2022 | Bertness |
| 2022/0258619 A1 | 8/2022 | Bertness |
| 2022/0384858 A1 | 12/2022 | Bertness |
| 2023/0063349 A1 | 3/2023 | Bertness et al. |
| 2023/0155400 A1* | 5/2023 | Wang ............... B60L 3/00 |
| | | 320/134 |
| 2023/0256829 A1* | 8/2023 | Bertness ............... H01R 13/688 |
| | | 701/22 |
| 2023/0322088 A1* | 10/2023 | Ho ............... H01H 39/006 |
| | | 307/10.1 |
| 2023/0333171 A1 | 10/2023 | Bertness |
| 2023/0339359 A1* | 10/2023 | Numata ............... H01M 10/42 |
| 2023/0358818 A1 | 11/2023 | Kolamkar et al. |
| 2023/0387707 A1 | 11/2023 | Bertness |
| 2023/0391179 A1 | 12/2023 | Sampson et al. |
| 2024/0429653 A1* | 12/2024 | Dos Santos ............... H01R 13/62955 |

FOREIGN PATENT DOCUMENTS

| | | |
|---|---|---|
| CN | 103091633 | 5/2013 |
| CN | 206658084 | 11/2017 |
| CN | 109683054 | 1/2019 |
| DE | 29 26 716 B1 | 1/1981 |
| DE | 40 07 883 | 9/1991 |
| DE | 196 38 324 | 9/1996 |
| DE | 601 12 502 T2 | 6/2006 |
| DE | 10 2009 013 857 | 10/2009 |
| DE | 10 2008 036 595 A1 | 2/2010 |
| DE | 10 2018 001885 | 9/2018 |
| EP | 0 022 450 A1 | 1/1981 |
| EP | 0 391 694 A2 | 4/1990 |
| EP | 0 476 405 A1 | 9/1991 |
| EP | 0 637 754 A1 | 2/1995 |
| EP | 0 772 056 A1 | 5/1997 |
| EP | 0 982 159 A2 | 3/2000 |
| EP | 1 810 869 A1 | 11/2004 |
| EP | 1 786 057 | 5/2007 |
| EP | 1 807 710 B1 | 7/2007 |
| EP | 1 807 710 | 1/2010 |
| EP | 2 302 724 | 3/2011 |
| FR | 2 749 397 | 12/1997 |
| GB | 154 016 | 11/1920 |
| GB | 2 029 586 | 3/1980 |
| GB | 2 088 159 A | 6/1982 |
| GB | 2 246 916 A | 10/1990 |
| GB | 2 266 150 | 10/1993 |
| GB | 2 275 783 A | 7/1994 |
| GB | 2 353 367 | 2/2001 |
| GB | 2 387 235 A | 10/2003 |
| JP | 59-17892 | 1/1984 |
| JP | 59-17893 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04095788 | 3/1992 |
| JP | 04131779 | 5/1992 |
| JP | 04372536 | 12/1992 |
| JP | 05211724 A | 8/1993 |
| JP | 5216550 | 8/1993 |
| JP | 7-128414 | 5/1995 |
| JP | 09061505 | 3/1997 |

(56) References Cited

FOREIGN PATENT DOCUMENTS

| | | |
|---|---|---|
| JP | 10056744 | 2/1998 |
| JP | 10232273 | 9/1998 |
| JP | 11103503 A | 4/1999 |
| JP | 11-150809 | 6/1999 |
| JP | 11-271409 | 10/1999 |
| JP | 2001-023037 | 1/2001 |
| JP | 2001057711 A | 2/2001 |
| JP | 2003-346909 | 12/2003 |
| JP | 2005-238969 | 9/2005 |
| JP | 2006/242674 | 9/2006 |
| JP | 2006331976 A | 12/2006 |
| JP | 2009-244166 | 10/2009 |
| JP | 2009-261174 | 11/2009 |
| JP | 2010-172122 | 5/2010 |
| JP | 2010-172142 | 8/2010 |
| JP | 2011-216328 | 10/2011 |
| JP | 2013-110069 | 6/2013 |
| RU | 2089015 C1 | 8/1997 |
| WO | WO 93/22666 | 11/1993 |
| WO | WO 94/05069 | 3/1994 |
| WO | WO 96/01456 | 1/1996 |
| WO | WO 96/06747 | 3/1996 |
| WO | WO 96/28846 | 9/1996 |
| WO | WO 97/01103 | 1/1997 |
| WO | WO 97/44652 | 11/1997 |
| WO | WO 98/04910 | 2/1998 |
| WO | WO 98/21132 | 5/1998 |
| WO | WO 98/58270 | 12/1998 |
| WO | WO 99/23738 | 5/1999 |
| WO | WO 99/56121 | 11/1999 |
| WO | WO 00/16083 | 3/2000 |
| WO | WO 00/62049 | 10/2000 |
| WO | WO 00/67359 | 11/2000 |
| WO | WO 01/59443 | 2/2001 |
| WO | WO 01/16614 | 3/2001 |
| WO | WO 01/16615 | 3/2001 |
| WO | WO 01/51947 | 7/2001 |
| WO | WO 03/047064 A3 | 6/2003 |
| WO | WO 03/076960 A1 | 9/2003 |
| WO | WO 2004/047215 A1 | 6/2004 |
| WO | WO 2007/059935 | 5/2007 |
| WO | WO 2007/075403 | 7/2007 |
| WO | WO 2009/004001 | 1/2009 |
| WO | WO 2010/007681 | 1/2010 |
| WO | WO 2010/035605 | 4/2010 |
| WO | WO 2010/042517 | 4/2010 |
| WO | WO 2011/153419 | 12/2011 |
| WO | WO 2012/078921 | 6/2012 |
| WO | WO 2013/070850 | 5/2013 |

OTHER PUBLICATIONS

"Battery Impedance", by E. Willihnganz et al., *Electrical Engineering*, Sep. 1959, pp. 922-925.

"Determining the End of Battery Life", by S. DeBardelaben, *IEEE*, 1986, pp. 365-368.

"A Look at the Impedance of a Cell", by S. Debardelaben, *IEEE*, 1988, pp. 394-397.

"The Impedance of Electrical Storage Cells", by N.A. Hampson et al., *Journal of Applied Electrochemistry*, 1980, pp. 3-11.

"A Package for Impedance/Admittance Data Analysis", by B. Boukamp, *Solid State Ionics*, 1986, pp. 136-140.

"Precision of Impedance Spectroscopy Estimates of Bulk, Reaction Rate, and Diffusion Parameters", by J. Macdonald et al., *J. Electroanal, Chem.*, 1991, pp. 1-11.

Internal Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128,131.

IEEE Recommended Practice for Maintenance, Testings, and Replacement of Large Lead Storage Batteries for Generating Stations and Substations, *The Institute of Electrical and Electronics Engineers, Inc.*, ANSI/IEEE Std. 450-1987, Mar. 9, 1987, pp. 7-15.

"Field and Laboratory Studies to Assess the State of Health of Valve-Regulated Lead Acid Batteries: Part I Conductance/Capacity Correlation Studies", by D. Feder et al., *IEEE*, Aug. 1992, pp. 218-233.

"JIS Japanese Industrial StandardiLead Acid Batteries for Automobiles", *Japanese Standards Association UDC*, 621.355.2:629.113. 006, Nov. 1995.

"Performance of Dry Cells", by C. Hambuechen, Preprint of *Am. Electrochem. Soc.*, Apr. 18-20, 1912, paper No. 19, pp. 1-5.

"A Bridge for Measuring Storage Battery Resistance", by E. Wilihncanz, *The Electrochemical Society*, preprint 79-20, Apr. 1941, pp. 253-258.

National Semiconductor Corporation, "High Q Notch Filter", Mar. 1969, Linear Brief 5, Mar. 1969.

Burr-Brown Corporation, "Design A 60 Hz Notch Filter with the UAF42", Jan. 1994, AB-071, 1994.

National Semiconductor Corporation, "LMF90-$4^{th}$-Order Elliptic Notch Filter", Dec. 1994, RRD-B30M115, Dec. 1994.

"Alligator Clips with Wire Penetrators" *J. S. Popper, Inc.* product information, downloaded from http://www.jspopper.com/, prior to Oct. 1, 2002.

"#12: LM78S40 Simple Switcher DC to DC Converter", *ITM e-Catalog*, downloaded from http://www.pcbcafe,com, prior to Oct. 1, 2002.

"Simple DC-DC Converts Allows Use of Single Battery", *Electronix Express*, downloaded from http://www.elexp.com/t_dc-dc.htm, prior to Oct. 1, 2002.

"DC-DC Converter Basics", *Power Designers*, downloaded from http://www.powerdesigners.com/InforWeb.design_center/articles/DC-DC/converter.shtm, prior to Oct. 1, 2002.

"Notification of Transmittal of The International Search Report or the Declaration", PCT/US02/29461, filed Sep. 17, 2002 and mailed Jan. 3, 2003.

"Notification of Transmittal of The International Search Report or the Declaration", PCT/US03/07546, filed Mar. 13, 2003 and mailed Jul. 4, 2001.

"Notification of Transmittal of The International Search Report or the Declaration", PCT/US03/06577, filed Mar. 5, 2003 and mailed Jul. 24, 2003.

"Notification of Transmittal of The International Search Report or the Declaration", PCT/US03/07837, filed Mar. 14, 2003 and mailed Jul. 4, 2003.

"Improved Impedance Spectroscopy Technique for Status Determination of Production Li/$SO_2$ Batteries" Terrill Atwater et al., pp. 10-113, (1992).

"Notification of Transmittal of The International Search Report or the Declaration", PCT/US03/41561; Search Report completed Apr. 13, 2004, mailed May 6, 2004.

"Notification of Transmittal of The International Search Report or the Declaration", PCT/US03/27696, filed Sep. 4, 2003 and mailed Apr. 15, 2004.

"Programming Training Course, 62-000 Series Smart Engine Analyzer", Testproducts Division, Kalamazoo, Michigan, pp. 1-207, (1984).

"Operators Manual, Modular Computer Analyzer Model MCA 3000", Sun Electric Corporation, Crystal Lake, Illinois, pp. 1-1-14-13, (1991).

Supplementary European Search Report Communication for Appl. No. 99917402.2; Sep. 7, 2004.

"Dynamic modelling of lead/acid batteries using impedance spectroscopy for parameter identification", Journal of Power Sources, pp. 69-84, (1997).

Notification of Transmittal of the International Search Report for PCT/US03/30707, filed Sep. 30, 2003 and mailed Nov. 24, 2004.

"A review of impedance measurements for determination of the state-of-charge or state-of-health of secondary batteries", Journal of Power Sources, pp. 59-69, (1998).

"Search Report Under Section 17" for Great Britain Application No. GB0421447. 4, date of search Jan. 27, 2005, date of document Jan. 28, 2005.

"Results of Discrete Frequency Immittance Spectroscopy (DFIS) Measurements of Lead Acid Batteries", by K.S. Champlin et al.,

(56) References Cited

OTHER PUBLICATIONS

*Proceedings of 23rd International Teleco Conference (INTELEC)*, published Oct. 2001, IEE, pp. 433-440.
"Examination Report" from the UK Patent Office for App. No. 0417678.0; Jan. 24, 2005.
Wikipedia Online Encyclopedia, Inductance, 2005, http://en.wikipedia.org/wiki/inductance, pp. 1-5, mutual Inductance, pp. 3, 4.
"Professional BCS System Analyzer Battery-Charger-Starting", pp. 2-8, (2001).
Young Illustrated Encyclopedia Dictionary of Electronics, 1981, Parker Publishing Company, Inc., pp. 318-319.
"DSP Applications in Hybrid Electric Vehicle Powertrain", Miller et al., Proceedings of the American Control Conference, San Diego, CA, Jun. 1999; 2 ppg.
"Notification of Transmittal of the International Search Report and the Written Opinion of the International Searching Authority, or the Declaration" for PCT/US2008/008702 filed Jul. 2008; 15 pages.
"A Microprocessor-Based Control System for a Near-Term Electric Vehicle", Bimal K. Bose; IEEE Transactions on Industry Applications, vol. IA-17, No. 6, Nov./Dec. 1981; 0093-9994/81/1100-0626$00.75 © 1981 IEEE, 6 pages.
Notification of Transmittal of the International Search Report and the Written Opinion of the International *Searching* Authority, or the Declaration for PCT/US2011/038279 filed May 27, 2011, date of mailing Sep. 16, 2011, 12 pages.
U.S. Appl. No. 60/387,912, filed Jun. 13, 2002 which is related to U.S. Pat. No. 7,089,127.
"Conductance Testing Compared to Traditional Methods of Evaluating the Capacity of Valve-Regulated Lead-Acid Batteries and Predicting State-of-Health", by D. Feder et al., May 1992, pp. 1-8; (13 total pgs.).
"Field and Laboratory Studies to Assess the State of Health of Valve-Regulated Lead Acid Batteries: Part I-Conductance/Capacity Correlation Studies", by D. Feder at al., Oct. 1992, pp. 1-15; (19 total pgs.).
"Field Application of Conductance Measurements Use to Ascertain Cell/Battery and Inter-Cell Connection State-of-Health in Electric Power Utility Applications", by M. Hlavac et al., Apr. 1993, pp. 1-14; (19 total pgs.).
"Conductance Testing of Standby Batteries in Signaling and Communications Applications for the Purpose of Evaluating Battery State-of-Health", by S. McShane, Apr. 1993, pp. 1-9; (14 total pgs.).
"Condutance Monitoring of Recombination Lead Acid Batteries", by B. Jones, May 1993, pp. 1-6; (11 total pgs.).
"Evaluating the State-of-Health of Lead Acid Flooded and Valve-Regulated Batteries: A Comparison of Conductance Testing vs. Traditional Methods", by M. Hlavac et al., Jun. 1993, pp. 1-15; (20 total pgs.).
"Updated State of Conductance/Capacity Correlation Studies to Determine the State-of-Health of Automotive SLI and Standby Lead Acid Batteries", by D. Feder et al., Sep. 1993, pp. 1-17; (22 total pgs.).
"Field and Laboratory Studies to Access the State-of-Health of Valve-Regulated Lead-Acid Battery Technologies Using Conductance Testing Part II-Further Conductance/Capacity Correlation Studies", by M. Hlavac et al., Sep. 1993, pp. 1-9; (14 total pgs.).
"Field Experience of Testing VRLA Batteries by Measuring Conductance", by M.W. Kniveton, May 1994, pp. 1-4; (9 total pgs.).
"Reducing the Cost of Maintaining VRLA Batteries in Telecom Applications", by M.W. Kniveton, Sep. 1994, pp. 1-5; (10 total pgs.).
"Analysis and Interpretation of Conductance Measurements used to Access the State-of-Health of Valve Regulated Lead Acid Batteries Part III: Analytical Techniques", by M. Hlavac, Nov. 1994, 9 pgs; (13 total pgs.).
"Testing 24 Volt Aircraft Batteries Using Midtronics Conductance Technology", by M. Hlavac et al., Jan. 1995, 9 pgs; (13 total pgs.).

"VRLA Battery Monitoring Using Conductance Technology Part IV: On-Line State-of-Health Monitoring and Thermal Runaway Detection/Prevention", by M. Hlavac et al., Oct. 1995, 9 pgs; (13 total pgs.).
"VRLA Battery Conductance Monitoring Part V: Strategies for VRLA Battery Testing and Monitoring in Telecom Operating Environments", by M. Hlavac et al., Oct. 1996, 9 pgs; (13 total pgs.).
"Midpoint Conductance Technology Used In Telecommunication Stationary Standby Battery Applications Part VI: Considerations for Deployment of Midpoint Conductance in Telecommunications Power Applications", by M. Troy et al., Oct. 1997, 9 pgs; (13 total pgs.).
"Impedance/Conductance Measurements as an Aid to Determining Replacement Strategies", M. Kniveton, Sep. 1998, pp. 297-301; (9 total pgs.).
"A Fundamentally New Approach to Battery Performance Analysis Using DFRA™/DTIS™ Technology", by K. Champlin et al., Sep. 2000, 8 pgs; (12 total pgs.).
"Battery State of Health Monitoring, Combining Conductance Technology With Other Measurement Parameters for Real-Time Battery Performance Analysis", by D. Cox et al., Mar. 2000, 6 pgs; (10 total pgs.).
Search Report and Written Opinion from PCT Application No. PCT/US2011/026608, dated Aug. 29, 2011, 9 pgs.
Examination Report under section 18(3) for corresponding Great Britain Application No. GB1000773.0, dated Feb. 6, 2012, 2 pages.
Communication from GB1216105.5, dated Sep. 21, 2012.
Notification of Transmittal of the International Search Report and Written Opinion from PCT/US2011/039043, dated Jul. 26, 2012.
Notification of Transmittal of the International Search Report and Written Opinion from PCT/US2011/053886, dated Jul. 27, 2012.
"Field Evaluation of Honda's EV Plus Battery Packs", by A. Paryani, *IEEE AES Systems Magazine*, Nov. 2000, pp. 21-24.
Search Report from PCT/US2011/047354, dated Nov. 11, 2011.
Written Opinion from PCT/US2011/047354, dated Nov. 11, 2011.
First Office Action (Notification of Reasons for Rejections) dated Dec. 3, 2013 in related Japanese patent application No. 2013-513370, 9 pgs. Including English Translation.
Official Action dated Jan. 22, 2014 in Korean patent application No. 10-2012-7033020, 2 pgs including English Translation.
Official Action dated Feb. 20, 2014 in Korean patent application No. 10-2013-7004814, 6 pgs including English Translation.
First Office Action for Chinese Patent Application No. 201180011597.4, dated May 6, 2014, 20 pages.
Office Action from Korean Application No. 10/2012-7033020, dated Jul. 29, 2014.
Office Action for Chinese Patent Application No. 201180038844.X, dated Jul. 1, 2014.
Office Action for Chinese Patent Application No. 201180030045.8, dated Jul. 21, 2014.
Office Action for German Patent Application No. 1120111020643 dated Aug. 28, 2014.
Office Action from Japanese Patent Application No. 2013-513370, dated Aug. 5, 2014.
Office Action from Japanese Patent Application No. 2013-531839, dated Jul. 8, 2014.
Office Action for German Patent Application No. 103 32 625.1, dated Nov. 7, 2014, 14 pages.
Office Action from Chinese Patent Application No. 201180038844.X, dated Dec. 8, 2014.
Office Action from CN Application No. 201180011597.4, dated Jan. 6, 2015.
Office Action for Chinese Patent Application No. 201180030045.8, dated Mar. 24, 2015.
Office Action for Japanese Patent Application No. 2013-531839, dated Mar. 31, 2015.
Notification of Transmittal of the International Search Report and Written Opinion from PCT/US2014/069661, dated Mar. 26, 2015.
Office Action for Chinese Patent Application No. 201180038844.X, dated Jun. 8, 2015.
Office Action from Chinese Patent Application No. 201180011597.4 dated Jun. 3, 2015.
European Search Report from European Application No. EP 15151426.2, dated Jun. 1, 2015.

(56) References Cited

OTHER PUBLICATIONS

Notification of Transmittal of the International Search Report and the Written Opinion from PCT/US2016/014867, dated Jun. 3, 2016.
Office Action from Japanese Patent Application No. 2015-014002, dated Jul. 19, 2016.
Notification of Transmittal of the International Search Report and the Written Opinion of the International Searching Authority from PCT/US2016/029696, dated Aug. 24, 2016.
Office Action from German Patent Application No. 10393251.8, dated Nov. 4, 2016, including English translation.
Office Action from European Patent Application No. 15 151 426.2-1801, dated Aug. 28, 2017, 2 pages.
Office Action from German Patent Application No. 112011101892.4, dated Sep. 7, 2017.
Office Action from Japanese Patent Application No. 2017-026740, dated Jan. 9, 2018.
Office Action from Chinese Patent Application No. 201480066251.8, dated May 29, 2018.
Brochure: "Sensors Intelligent Battery Sensors, Measuring Battery Capacity and Ageing", by Hella, 6 pgs.
Office Action from Japanese Patent Application No. 2017-026740, dated May 8, 2018.
U.S. Appl. No. 12/697,485, filed Feb. 1, 2010, 36 pgs.
Office Action from Chinese Patent Application No. 201480066251.8, dated Dec. 13, 2018.
Notification of Transmittal of the International Search Report and the Written Opinion of the International Searching Authority, or the Declaration for PCT/US2019/014487, dated Apr. 11, 2019.
Notification of Transmittal of the International Search Report and the Written Opinion of the International Searching Authority, or the Declaration for PCT/US2019/014494, dated Apr. 24, 2019.
Office Action from German Patent Application No. 11 2011 101 892.4, dated Oct. 1, 2020, and translation using Google Translate.
Wikipedia Online Encyclopedia, https: // de.wikipedia.org/w/index.php?title= four-wire measurement &oldid=67143514-4 (Retrieved Sep. 15, 2020) along with Google Translation.
Notification of Transmittal of the International Search Report and the Written Opinion of the International Searching Authority, or the Declaration for PCT/US2020/059015, dated Jan. 22, 2021.
U.S. Appl. No. 17/504,897, filed Oct. 19, 2021.
Notification of Transmittal of the International Search Report and the Written Opinion of the International Searching Authority, or the Declaration for PCT/US2021/040313 dated Oct. 25, 2021; 14 pages.
U.S. Appl. No. 17/893,412, filed Aug. 23, 2022.
U.S. Appl. No. 18/166,702, filed Feb. 9, 2023.
U.S. Appl. No. 18/314,266, filed May 9, 2023.
U.S. Appl. No. 18/324,382, filed May 26, 2023.
U.S. Appl. No. 18/328,827, filed Jun. 5, 2023.
U.S. Appl. No. 18/616,458, filed Mar. 26, 2024.
U.S. Appl. No. 18/609,344, filed Mar. 19, 2024.
U.S. Appl. No. 18/740,030, filed Jun. 11, 2024.

* cited by examiner

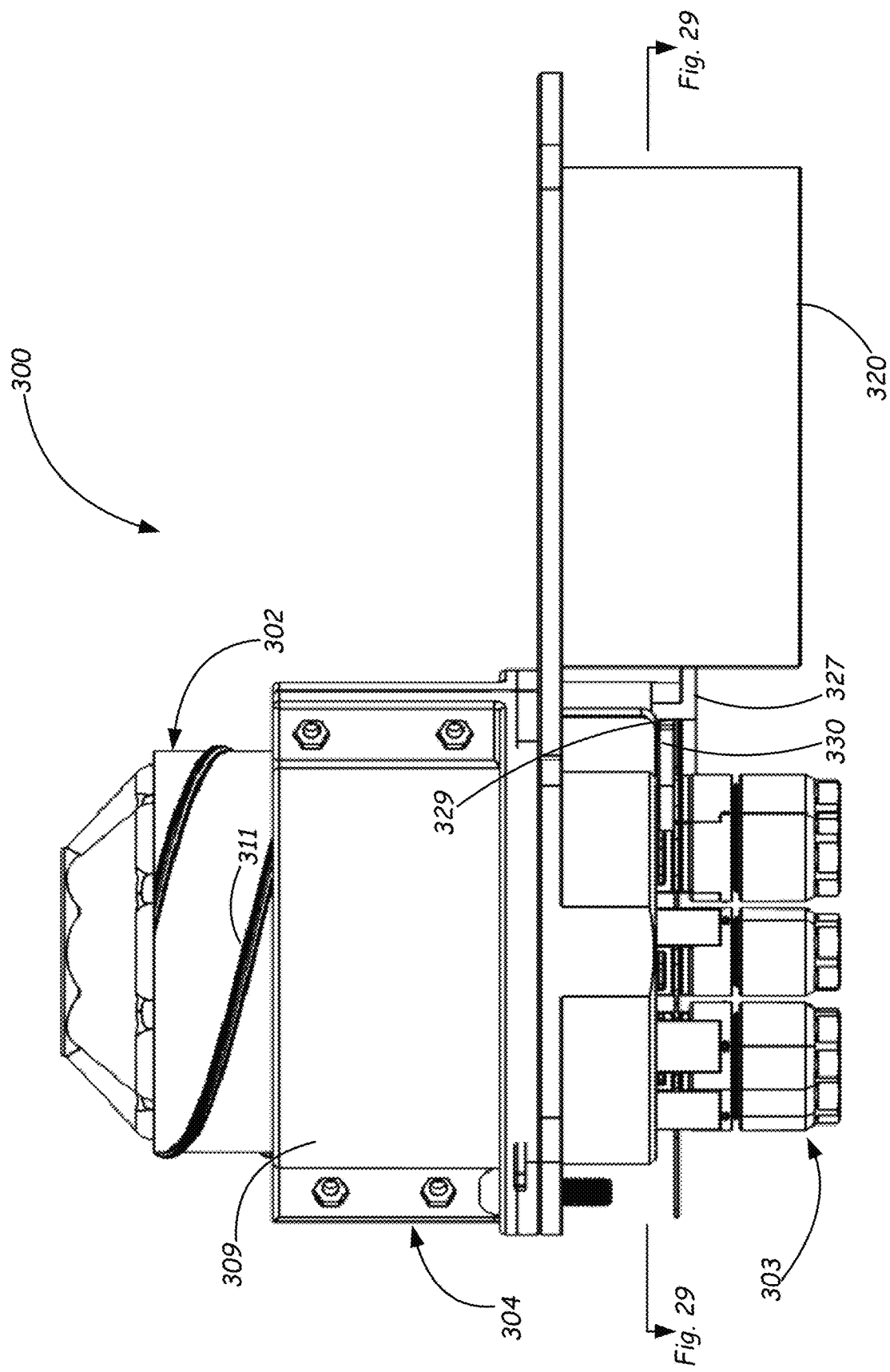

BATTERY MAINTENANCE DEVICE WITH HIGH VOLTAGE CONNECTOR

CROSS-REFERENCE TO RELATED APPLICATION

The present application is based on and claims the benefit of U.S. provisional patent application Ser. No. 63/309,783, filed Feb. 14, 2022, the content of which is hereby incorporated by reference in its entirety.

BACKGROUND

The disclosure described herein relates to electric vehicles of the type that use battery packs for storing electricity and power the vehicle. This includes both hybrid and purely electric vehicles. More specifically, the present invention relates to the maintenance of such battery packs used in electric vehicles.

Traditionally, automotive vehicles have used internal combustion engines as their power source. However, vehicles which are electrically powered are finding widespread use. Such vehicles can provide increased fuel efficiency and can be operated using alternative energy sources.

Some types of electric vehicles (xEV) are completely powered using electric motors and electricity. Other types of electric vehicles include an internal combustion engine. The internal combustion engine may be used to generate electricity and supplement the power delivered by the electric motor. These types of vehicles are known as "hybrid" electric vehicles.

Operation of an electric vehicle requires a power source capable of providing large amounts of electricity. Typically, electric vehicles store electricity in large battery packs which consist of a plurality of batteries. These batteries may be formed by a number of individual cells, or may themselves be individual cells, depending on the configuration of the battery and battery pack. The packs are large, replacement may be expensive, and they may be difficult to access and maintain.

SUMMARY

A battery maintenance system for use in performing battery maintenance on a battery of an electric vehicle includes a battery maintenance device and a high voltage connector configured to connect the battery maintenance device to the battery of the electric vehicle. The high voltage connector includes a first connector side coupleable to the battery of the electric vehicle and includes a plurality of first type of connectors and a keying post. The keying post has a distal end that terminates a distance from ends of the first type of connectors. A second connector side is coupleable to the battery maintenance device and includes a plurality of second type of connectors configured to electrically mate with the plurality of first type connectors of the first connector side. A fuse block includes at least one fuse and a removable fuse door having an interlock. A mechanical component is configured into a first position and a second position and an electrical switch is configured to disconnect and connect voltages from the fuse block. When the fuse door is removed from the fuse block, the mechanical component is in a first position that blocks the keying post and prevents the first connector side from coupling with the second connector side. When the fuse door is in place and covering an interior of the fuse block, the interlock of the fuse door places the mechanical component into a second position to allow the keying post to mate with the second connector side and to activate the electric switch to connect voltages to the fuse block.

BRIEF DESCRIPTION OF THE DRAWINGS

FIG. 26 illustrates a side view of FIGS. 23 and 24.

DETAILED DESCRIPTION OF ILLUSTRATIVE EMBODIMENTS

Figure 1:
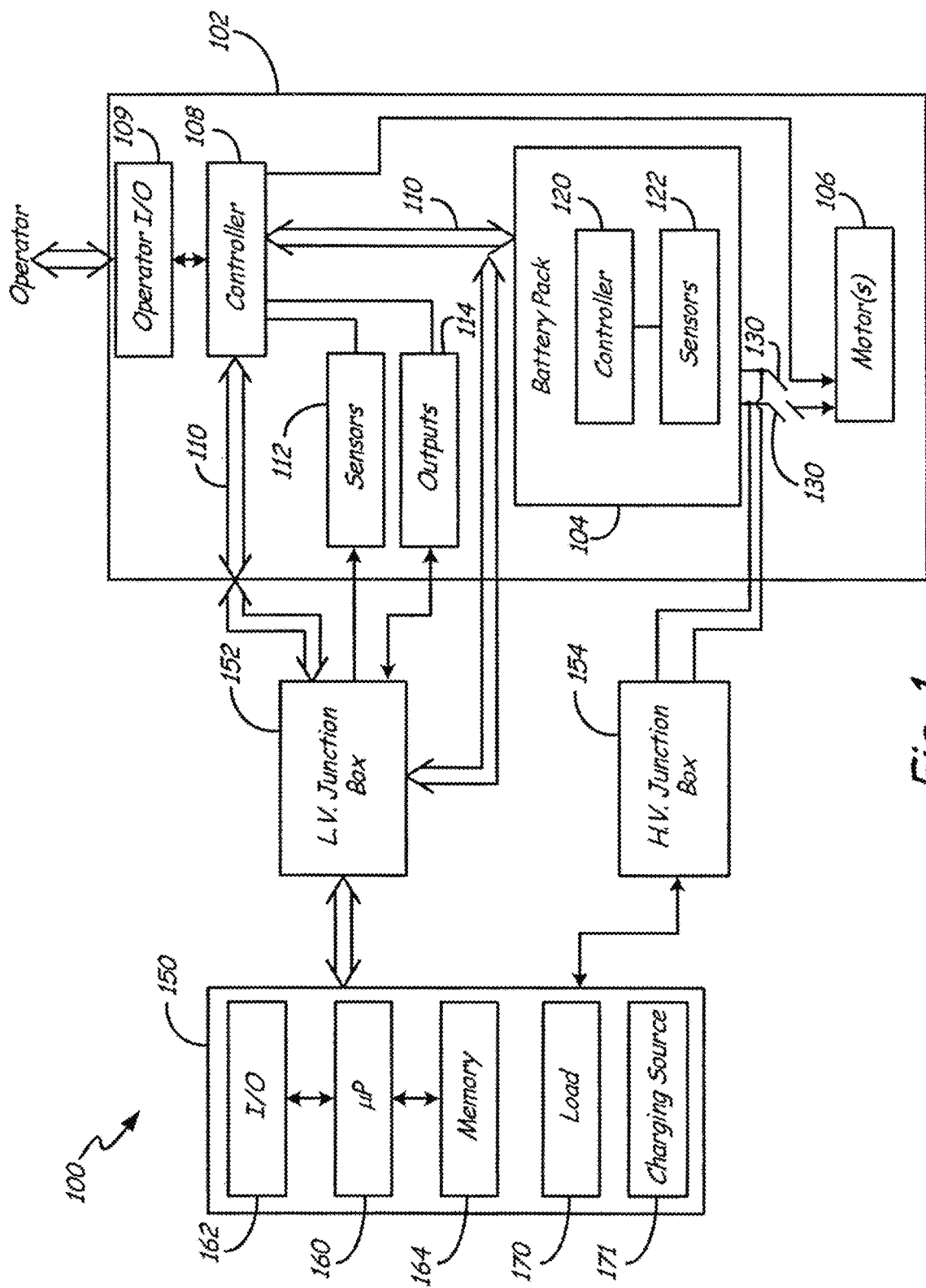
FIG. 1 is a simplified block diagram of a battery maintenance device coupled to an electric vehicle according to an embodiment.

FIG. 1 is a simplified block diagram showing battery pack maintenance device 100 coupled to an electric vehicle 102 including a high voltage connector in accordance with the invention. The vehicle 102 is illustrated in a simple block diagram and includes a battery pack 104 used to power the vehicle 102 including providing power to motor(s) 106 of the vehicle. The vehicle 102 includes a vehicle controller 108 coupled to a databus 110 of the vehicle. The controller 108 receives information regarding operation of the vehicle through sensors 112 and controls operation of the vehicle through outputs 114. Further, the battery pack 104 is illustrated as including its own optional controller 120 which monitors operation of the battery pack 104 using battery pack sensors 122.

During operation, the electric vehicle 102 is controlled by the controller 108, for example, based upon input from a driver through operator I/O 109. Operator I/O 109 can comprise, for example, a foot accelerator input, a brake input, an input indicating an position of a steering wheel, information related to a desired gearing ratio for a drive train, outputs related to operation of the vehicle such as speed, charging information, amount of energy which remains in the battery pack 104, diagnostic information, etc. The controller 108 can control operation of the electric motors 106 to propel the vehicle, as well as monitor and control other systems of the vehicle 102. The controller 120 of battery pack 104 can be used to monitor the operation of the battery pack 104. For example, the sensors 122 may include temperature sensors configured to disconnect the batteries of the battery pack if a threshold temperature is exceeded. Other example sensors include current or voltage sensors, which can be used to monitor charge of the battery pack 104. FIG. 1 also illustrates contactor relays 130 of the vehicle 102 which are used to selectively decouple the battery pack 104 from systems of the vehicle 102. For example, the controller 108 can provide a signal to cause the contactors 130 to close thereby connecting the battery pack 104 to electrical systems of the vehicle 102. It should be realized that contactor relays may also be used to selectively couple or decouple battery pack 104 from high voltage junction box 154.

Battery pack maintenance device 100 includes a main unit 150 which couples to the vehicle through a low voltage junction box 152 and a high voltage junction box 154. These junction boxes 152, 154 are representative and other techniques may be used for coupling the maintenance device 100 to the vehicle 102, such as high voltage connectors. Maintenance device 100 includes a microprocessor 160, I/O circuitry 162 and memory 164 which contains, for example, programming instructions for use by microprocessor 160. The I/O circuitry 162 can be used to provide user input, output, remote input, output as well as input and output with vehicle 102. The maintenance device 100 includes a controllable load 170 for use in discharging the battery pack 104. An optional charging source 171 is also provided and can be used in situations in which it is desirable to charge the battery pack 104, for example, to perform maintenance on the battery pack 104. The high voltage junction box 154 is used to provide an electrical connection between terminals of the battery pack 104 and the maintenance device main unit 150. As discussed herein, this high voltage connection is preferably fused. Using this connection, batteries within the battery pack 104 can be discharged using the load 170 or charged using the charging source 171. Similarly, low voltage junction box 152 is used by battery pack maintenance device 100 to couple to low voltage systems of the electric vehicle 102. Such systems include the databus 110 of the vehicle, sensors 112, outputs 114, etc. Through this connection, as discussed above, the maintenance device 100 can gather information regarding the condition of systems within the vehicle 102 including the battery pack 104, and can control operation of systems within the vehicle 102. Similarly, through this connection, the outputs from sensors 112 can be changed or altered whereby altered sensor outputs can be provided to controller 108. This can be used, for example, to cause controller 108 to receive information indicating that the vehicle 102 or battery pack 104 is in a condition which is different from what the sensors 112 are actually sensing. For example, this connection can be used to cause the contactors 130 to close to thereby provide an electrical connection to the battery pack 104. Further, the low voltage junction box 152 can be used to couple to the controller 120 and/or sensors 122 of the battery pack 104.

The junction boxes 152, 154 couple to vehicle 102 through the use of a connector. The particular connector which is used can be selected based upon the specific type of vehicle 102 and the type of connections which are available to an operator. For example, OBD II connection can be used to couple to the databus 110 of the vehicle. Other plugs or adapters may be used to couple to sensors 112 or outputs 114. A particular style connector may be available for coupling the high voltage junction box 154 to the battery pack 104. If there are no contactors which are available or if they cannot be accessed or are unresponsive, in one configuration clips or other types of clamp on or selectively connectable contactors can be used to perform the coupling.

Figure 2:
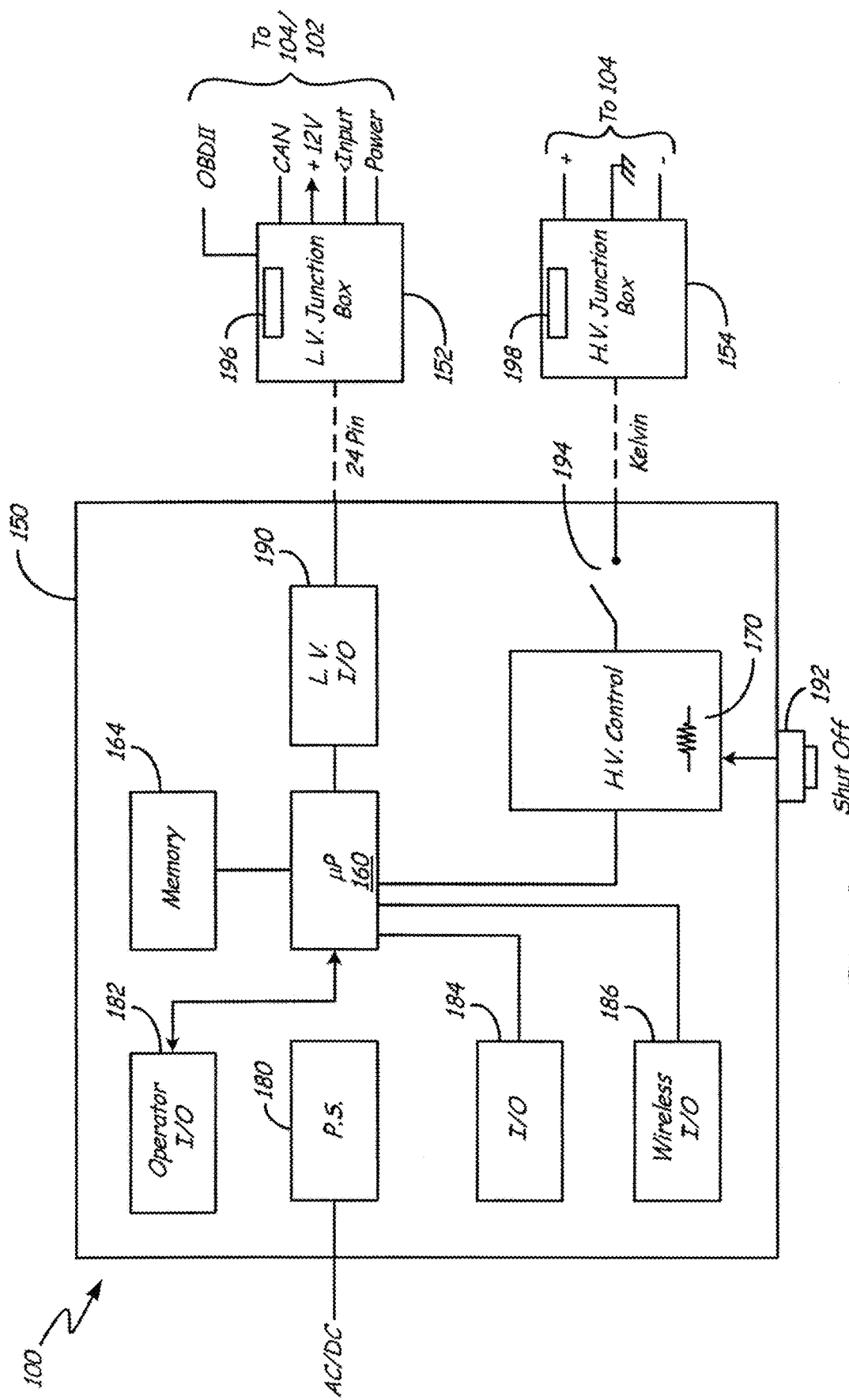
FIG. 2 is a more detailed block diagram of the battery maintenance device of FIG. 1.

FIG. 2 is a simplified block diagram of a battery pack maintenance device 100 in accordance with one example embodiment. The device includes microprocessor 160 which operates in accordance with instructions stored in a memory 164. A power supply is used to provide power to the device. The power supply 180 can be coupled to an AC power source, such as a wall outlet or other high power source, for use in charging the battery pack 104 of the vehicle 102. Additionally, the power supply 180 can be coupled to a DC power source, such as a 12 Volt battery, if the device 100 is only used for discharging of the vehicle battery pack 104. For example, in addition to the battery pack 104, many electric vehicles also include a standard 12 Volt automotive battery. This 12 Volt automotive battery can be used to power maintenance device 100. The microprocessor communicates with an operator using an operator input/output 182. Other input/output circuitry 184 is provided for use in physically connecting to a data communication link such as an RS232, USB connection, Ethernet, etc. An optional wireless I/O circuit 186 is also provided for use in communicating in accordance with wireless technologies such as WiFi techniques, Bluetooth®, Zigbee®, etc. Low voltage input/output circuitry 190 is provided for use in communicating with the databus of the vehicle 108, the databus of the battery pack 104, or receiving other inputs or providing outputs to the vehicle 102. Examples include the CAN communication protocol, OBDII, etc. Additionally, contact closures or other voltage inputs or outputs can be applied to the vehicle using the low voltage I/O circuitry 190. FIG. 2 also illustrates an operator shut off switch 192 which can be activated to immediately disconnect the high voltage control 170 from the battery 104 using disconnect switch 194. Other circuit configurations can be used to implement this shut off capability. This configuration allows an operator to perform an emergency shut off or otherwise immediately disconnect the device 100 from the battery if desired.

The low voltage junction box 152 also provides an optional power output. This power can be used, for example, to power components of the vehicle 102 if the vehicle 102 has lost power. This can be useful, for example, to provide power to the controller 108 of the vehicle 102 such that information may be gathered from the vehicle and various components of the vehicle can be controlled such as the contactors 130.

In one configuration, the connection between the high voltage control circuitry 170 and the high voltage junction box 154 is through Kelvin type connectors. This can be used to eliminate the voltage drop which occurs when large currents are drawn through wiring thereby providing more accurate voltage measurements. The actual connection between the junction box 154 and the battery pack 104 need not be through a Kelvin connection if the distance between the junction box 154 and the battery pack 104 is sufficiently short for the voltage drop across the connection leads to be negligible. Isolation circuitry such as fuses may be provided in the junction box 154 to prevent the application of a high voltage or current to the maintenance device 100 and thereby protect circuitry in the device. Similarly, the low voltage junction box 152 and/or the low voltage I/O 190 may include isolation circuitry such as optical isolators, inductors to provide inductive coupling, or other techniques. The low voltage junction box 152 may also include an optional user output and/or input 196. For example, this may be a display which can be observed by an operator. An example display includes an LED display, or individual LEDs, which provides an indication to the operator regarding the functioning of the low voltage junction box, the vehicle, or the battery pack. This can be used to visually inform an operator regarding the various functions being performed by the low voltage junction box, voltages detected by the low voltage junction box. A visual output and/or input 198 can be provided on the high voltage junction box 154.

The appropriate high voltage junction box 154 and low voltage junction box 152 can be selected based upon the particular vehicle 102 or battery pack 104 being inspected. Similarly, the junction boxes 152, 154 can be selected based upon the types of connections which are available in a particular situation. For example, if the vehicle is damaged, it may be impossible to couple to the battery pack 104 through available connectors. Instead, a junction box 154 can be employed which includes connection probes which can be coupled directly to the battery pack 104. Further still, if such a connection is not available or is damaged, connectors can be provided for coupling to individual cells or batteries within the battery pack 104.

The use of the low voltage and high voltage junction boxes 152, 154 are advantageous for a number of reasons. The junction boxes can be used to provide a standardized connection to the circuitry of the maintenance device 100. From a junction box 152, 154, specialized connectors can be provided for use with different types of vehicles and/or battery packs. Similarly, different types of junction boxes 152, 154 can be utilized for different vehicles and/or battery packs. The junction boxes 152, 154 allow a single cable connection to extend between the device 100 and a remote location. This provides better cable management, ease of use, and increased accuracy.

In addition to use as a load for discharging the battery, the high voltage control circuitry may also optionally be used for charging the battery.

Battery packs used with electric vehicles are able to store large amounts of energy. xEV voltages in electric vehicles are increasing and are approaching 1000 VDC. This is due to the ability to charge EVs faster at the higher voltage and to reduce weight in the vehicle by decreasing wire gage. However, these high voltages cause increased complications in insulation systems and fusing protections.

For service readiness, there are no standardized connections and fuses currently available for voltages that get above 400-600 VDC in xEV. Substitute connections may be used from other fields, but most substitute connections use two poles plus a safety ground. This is particularly problematic for connections that require more than two connections, such as Kelvin connections. Further, the existing two pole lower voltage connectors can be unreasonably expensive. One potential solution to this problem can be found in the solar industry in which reliable single pole connectors called MC4 connectors exist for up to 1500 VDC, and are relatively inexpensive. However, fusing remains another challenge. Preferably, a panel mount fuse holder should be "touch-safe," and rated at 1000 VDC at the currents required. A series of off-the-shelf, relatively inexpensive cartridge fuses that are rated appropriately can be used. For example, an EV cartridge fuse rated at 1000 VDC and 60-600A designed to protect high-voltage, high-current on-board applications in electric and hybrid vehicles as well as off-board charging. However, these fuses are not "touch safe."

There are two potential sources of high voltage that can be present at the fuses. One exists from an uncontrolled source of voltage coming from the electric vehicle or battery pack, such as battery pack 104, which is routed to the fuses depending on the state of the contactors in the battery pack over which an operator may have little or no control. The other source of high voltage is internal voltage produced by battery pack maintenance device, such as battery pack maintenance device 100, which can be controlled by the fuses, but unfortunately, as described above, there are no fuse holders that are "touch safe" and rated at 1000 VDC and the current required. Described below are embodiments that provide simple, low cost and reliable ways to address the above concerns.

Figure 3:
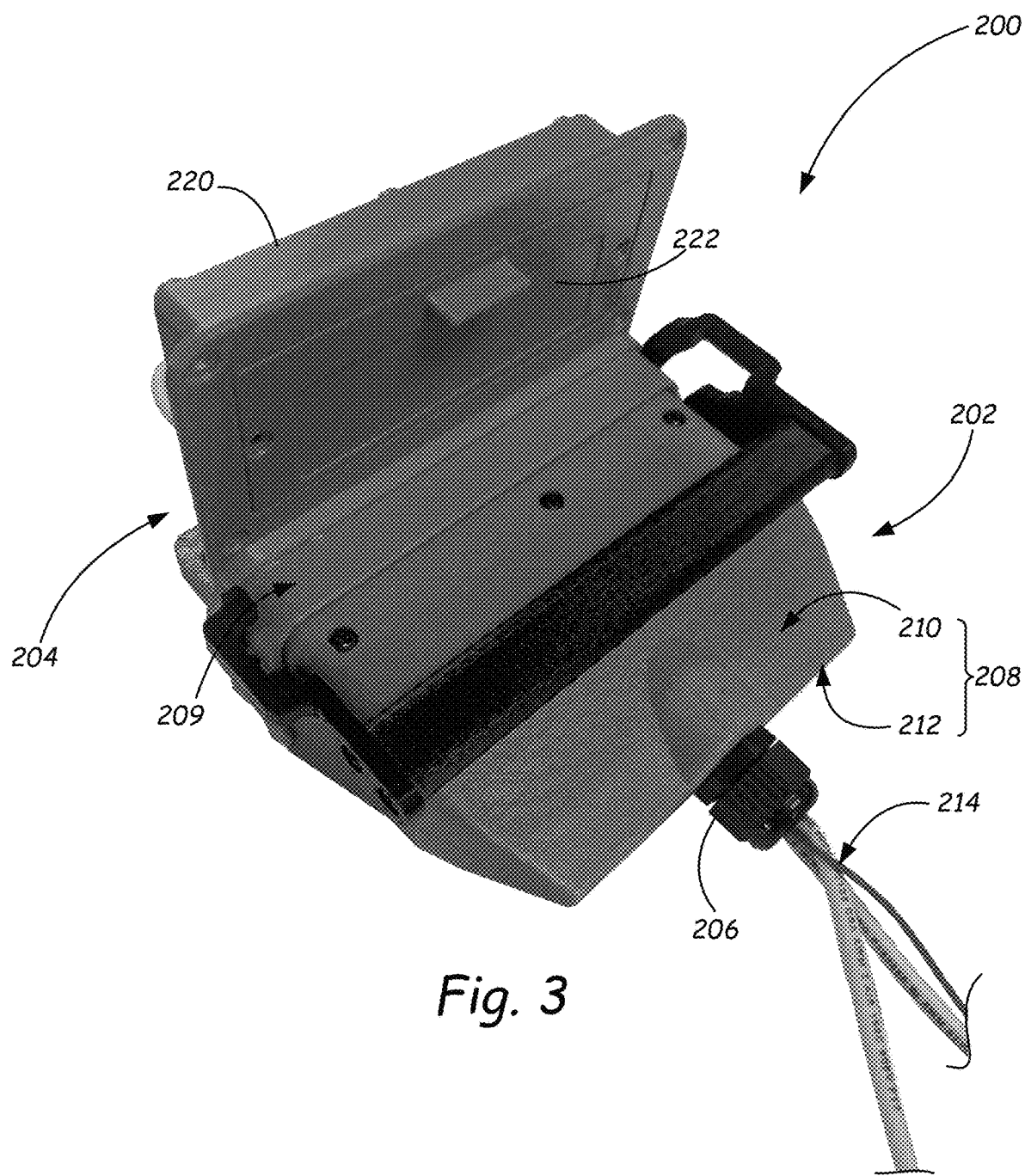
FIG. 3 illustrates a perspective view of a high voltage connector with a cable terminal loaded into a carrier housing according to an embodiment.
Figure 4:
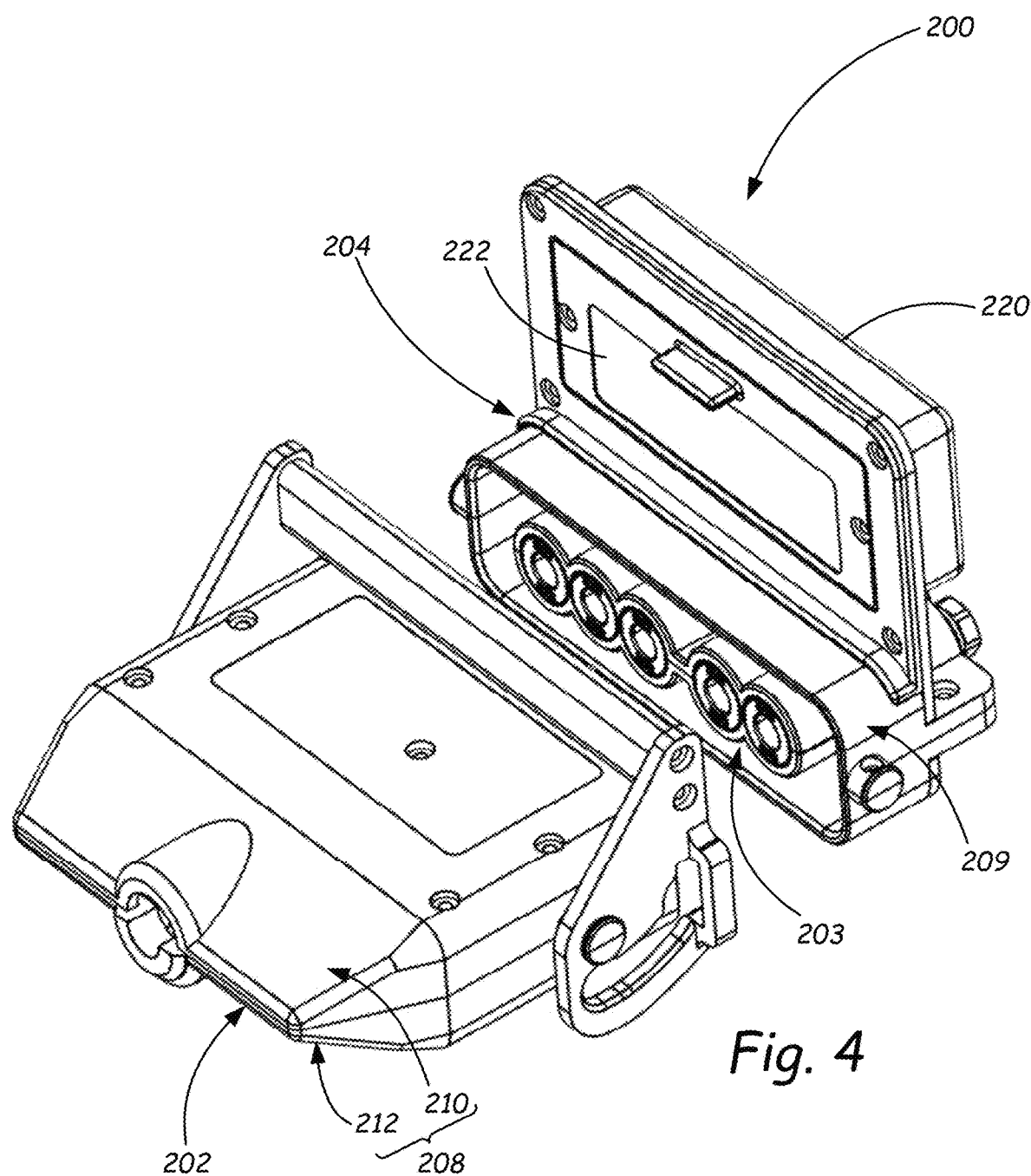
FIG. 4 illustrates a first perspective view of a high voltage connector with a first connector side separated from or decoupled from a second connector side and without the cable terminal loaded into the carrier housing according to an embodiment.
Figure 5:
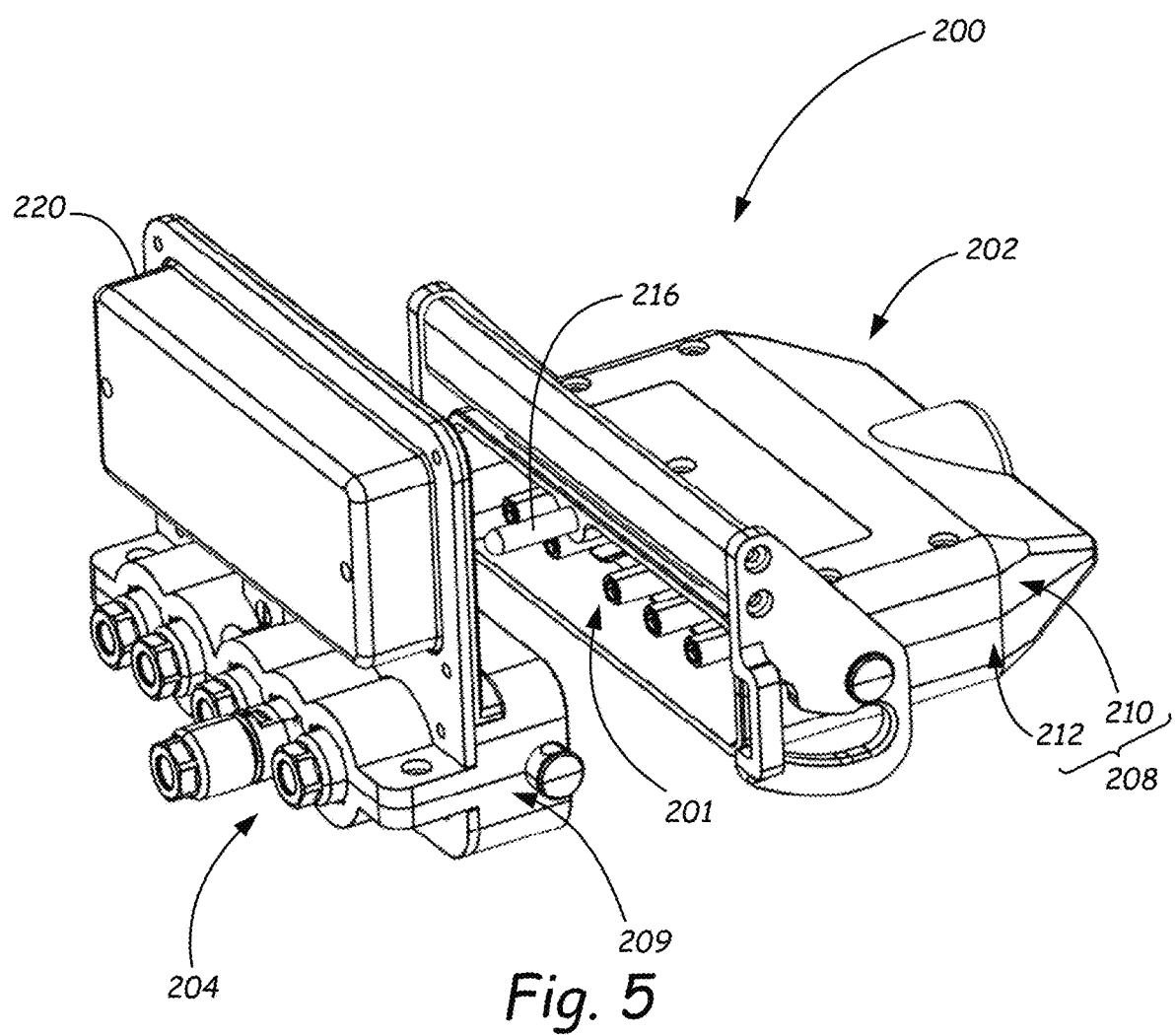
FIG. 5 illustrates a second perspective view of the high voltage connector of FIG. 4.

FIG. 3 illustrates a perspective view of an embodiment of a high voltage connector 200 configured for use as a high voltage junction box, such as high voltage junction box 154. High voltage connector 200 addresses the two potential sources of high voltage that can be present when using connectors and fusing that accommodates voltages that exceed 400-600 VDC. In FIG. 3, first connector side 202 and second connector side 204 are coupled together and cable terminal 206 is loaded into carrier housing 208 of first connector side 202. FIGS. 4 and 5 illustrate perspective views of high voltage connector 200 with first connector side 202 separated from or decoupled from second connector side 204 and without the cable terminal loaded into carrier housing 208.

High voltage connector 200 includes first connector side or cable side 202 and second connector side or equipment or bulkhead side 204. Connector 200 houses a plurality of connector poles that accommodate voltages that exceed 400-600 VDC with a first type or first sex of connector poles 201 located in and housed in a carrier housing 208 of first connector side 202 and a second type or second sex of connector poles 203 located in and housed in a carrier housing 209 of second connector side 204. For example, the plurality of connector poles may be off-the-shelf solar connectors, such as MC4s.

In one configuration and as illustrated, connector 200 includes five (5) first type of connector poles and five (5) second type of connectors poles. Each first type of connector pole is electrically coupleable to one of the second type of connector pole to provide five complete connectors. Each of the five connectors are spaced apart and their centers are located along the same plane. Under one embodiment, a first connector couples to a positive side of a battery pack, such as battery pack 104, a second connector couples to a negative side of a battery pack, such as battery pack 104, a third connector couples to a positive side of high voltage control circuitry with a Kelvin connection, such as high voltage control circuitry 170 of battery pack maintenance device 100, a fourth connector couples to a negative side of high voltage control circuitry with a Kelvin connection, such as high voltage control circuitry 170 of battery pack maintenance device 100, and a fifth connector is coupled to ground. In the illustrated embodiment and for example, first type or first sex of connector poles 201 are female type connector poles and second type or second sex of connector poles 203 are male type connector poles.

Figure 6:
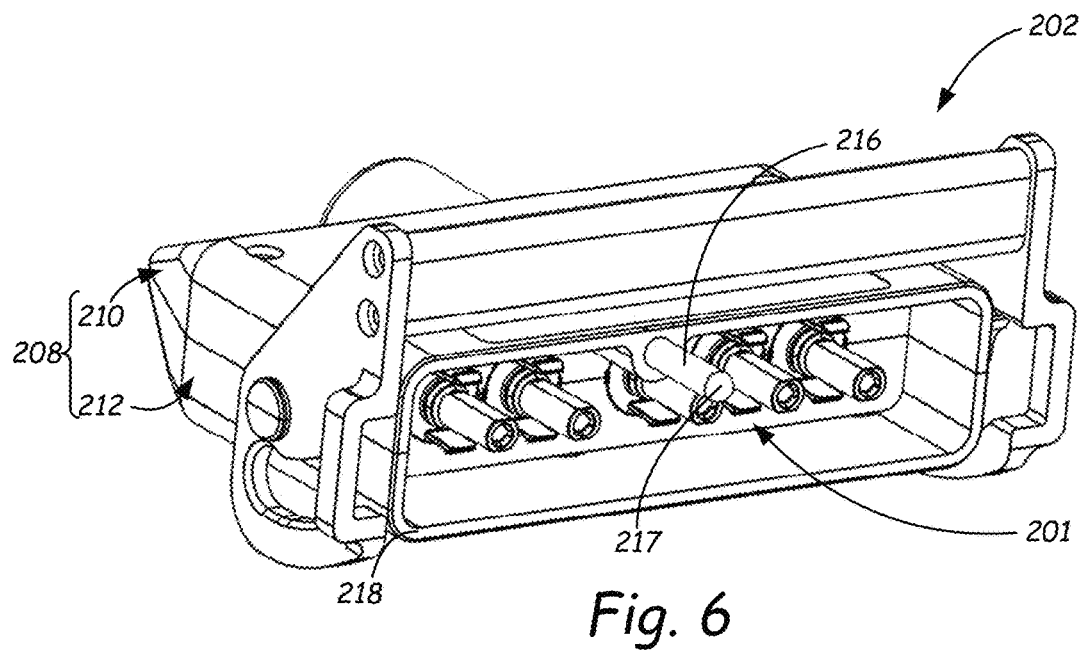
FIG. 6 illustrates a perspective view of the first connector side illustrated in FIGS. 4 and 5.
Figure 7:
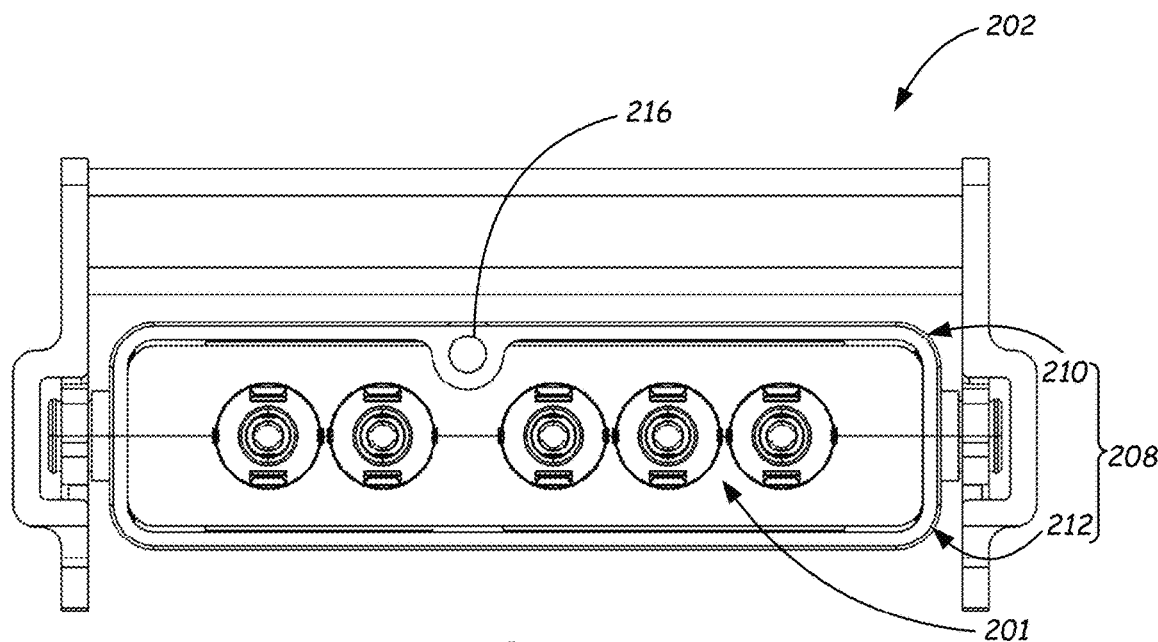
FIG. 7 illustrates an internal end view of the first connector side illustrated in FIG. 6.
Figure 8:
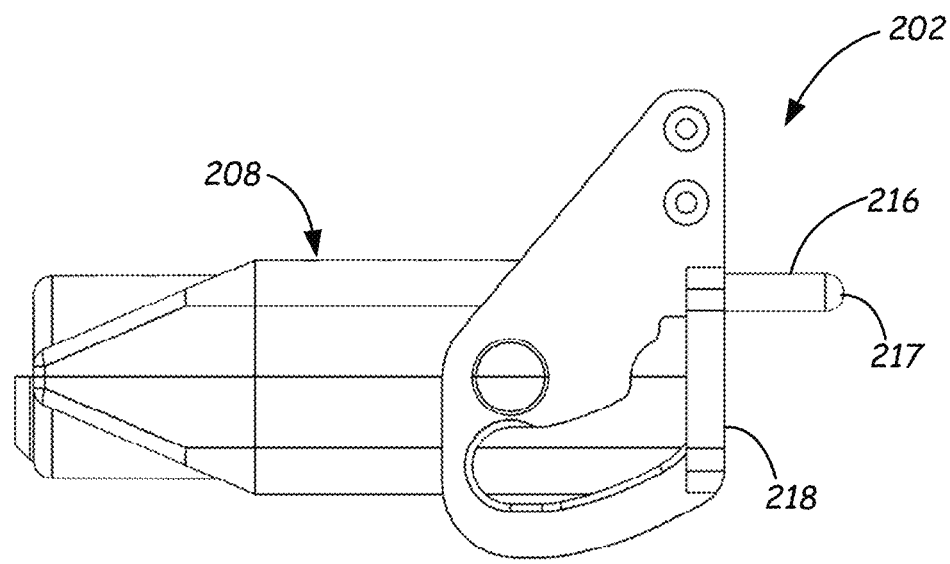
FIG. 8 illustrates a first side view of the first connector side illustrated in FIG. 6.
Figure 9:
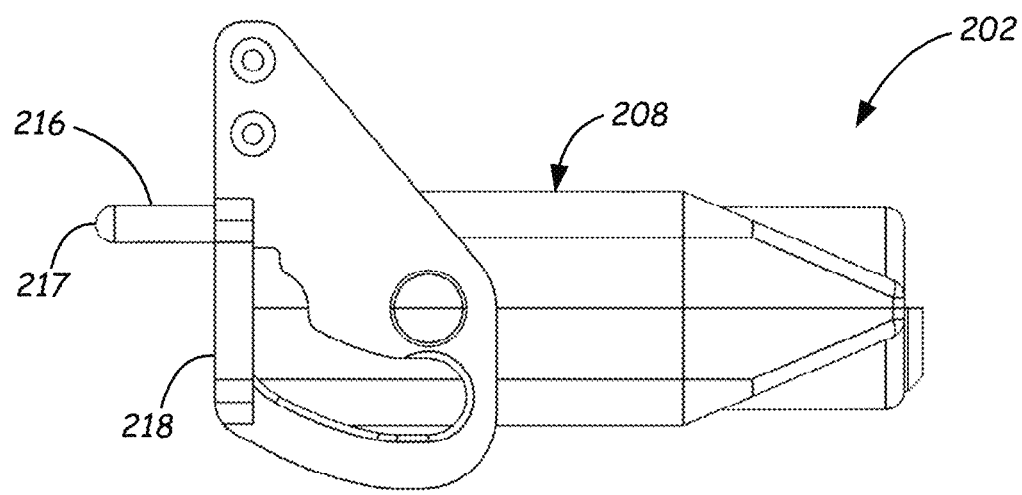
FIG. 9 illustrates an opposing second side view of first connector side illustrated in FIG. 6.

FIG. 6 illustrates a perspective view, FIG. 7 illustrates an internal end view, FIG. 8 illustrates a first side view and FIG. 9 illustrates an opposing second side view of first connector side 202. Besides first connector side 202 including first type or first sex of connector poles 201 housed in carrier housing 208, first connector side 202 includes a cable terminal 206 (FIG. 3) loaded into a carrier housing 208 that includes shell halves 210 and 212. Cable terminal 206 may include multiple cable terminals from a plurality of cables 214 that may be molded into combination pieces, for example. The plurality of cables 214 electrically couple to a battery pack of an electrical vehicle, such as battery pack 104 of electric vehicle 102, at a first end and electrically coupled to first type or first sex of connector poles 201 at a second end. In one configuration, the "wear" terminals are placed on the first connector or cable side 202, as that is easily replaced after a high level of use. First connector side 202 further includes a keying post 216 configured to provide an interlocking function that will be described in detail below. Keying post 216 protrudes from first connector side 202 and terminates at a distal end 217. In particular, keying post 216 protrudes outwardly from the first type or first sex connector poles 201 and from internal end 218 of carrier housing 208 and terminates at distal end 217.

Figure 10:
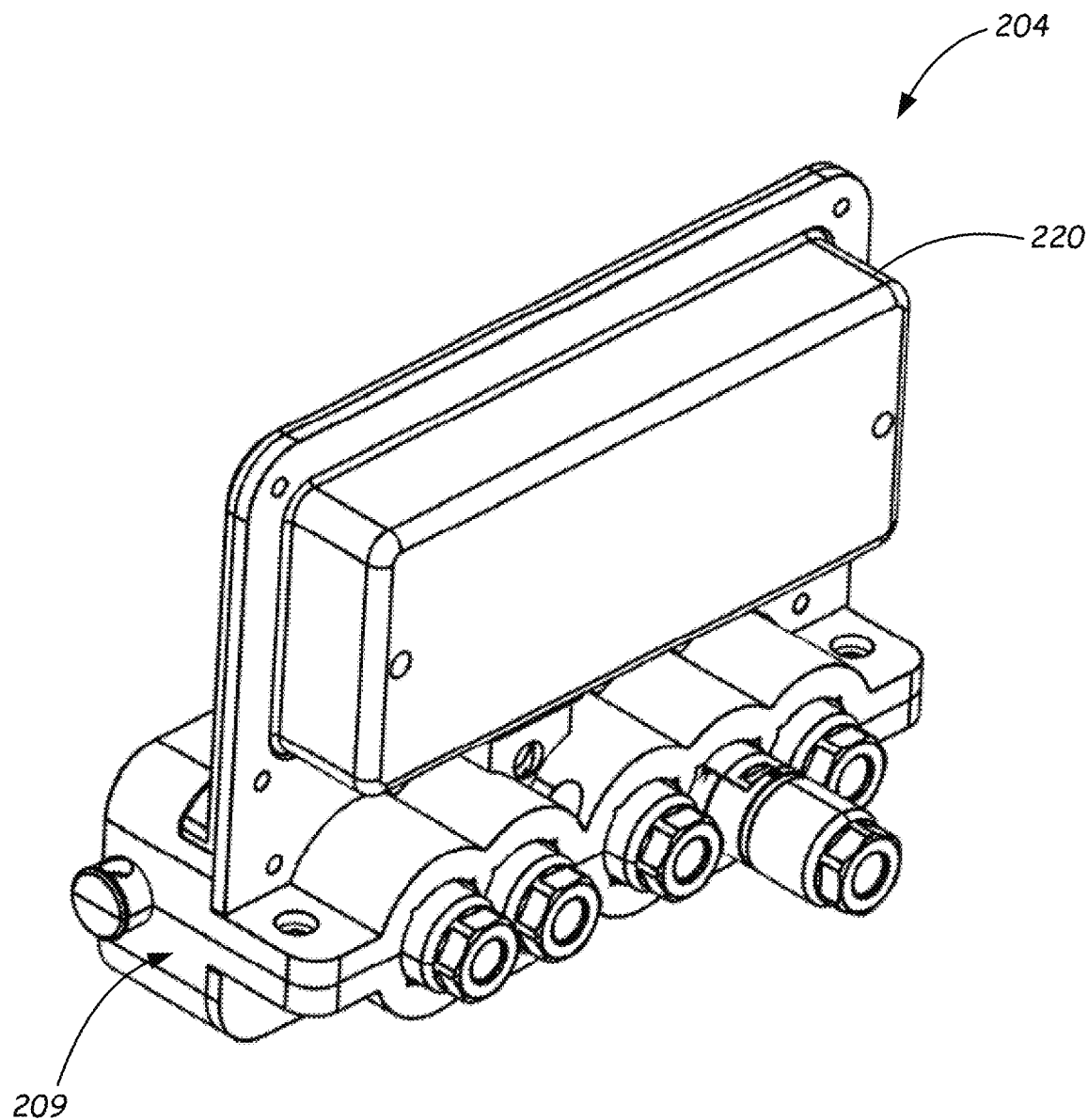
FIG. 10 illustrates a first perspective view of the second connector side illustrated in FIGS. 4 and 5.
Figure 11:
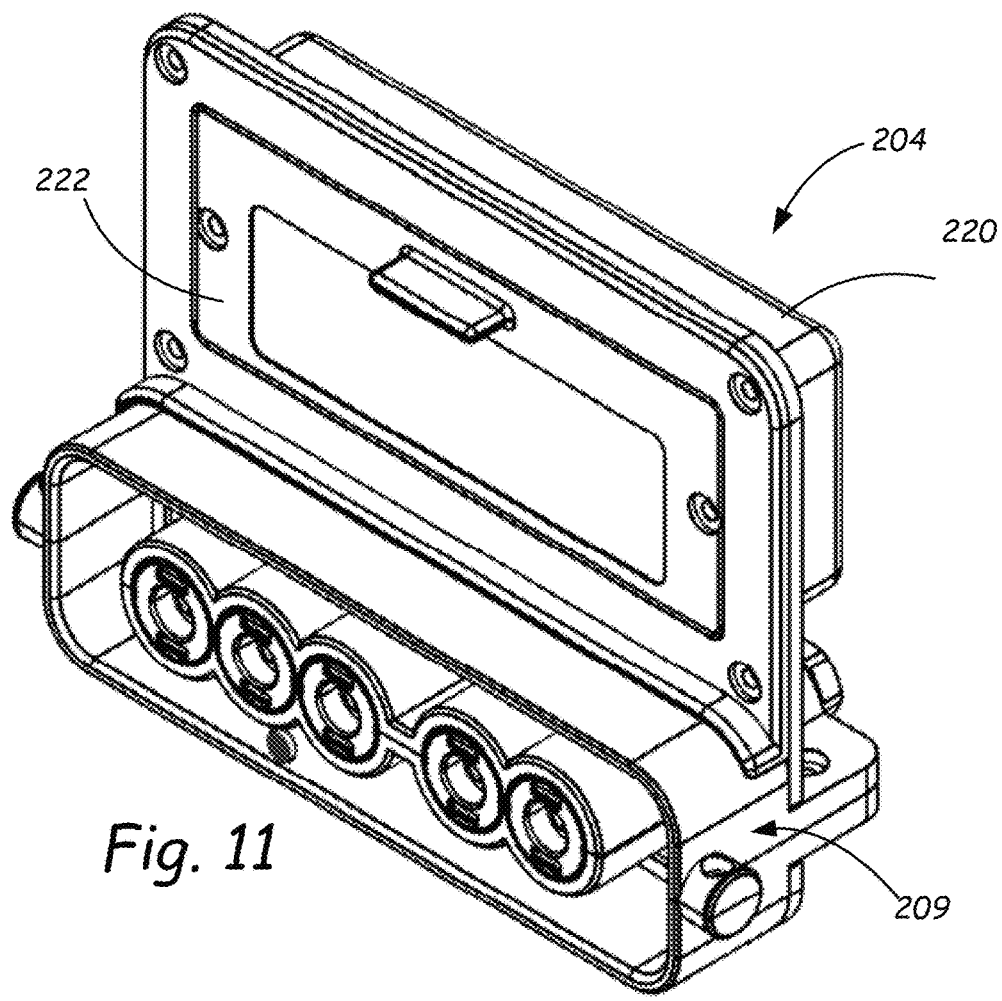
FIG. 11 illustrates a second perspective view of the second connector side illustrated in FIG. 10.
Figure 12:
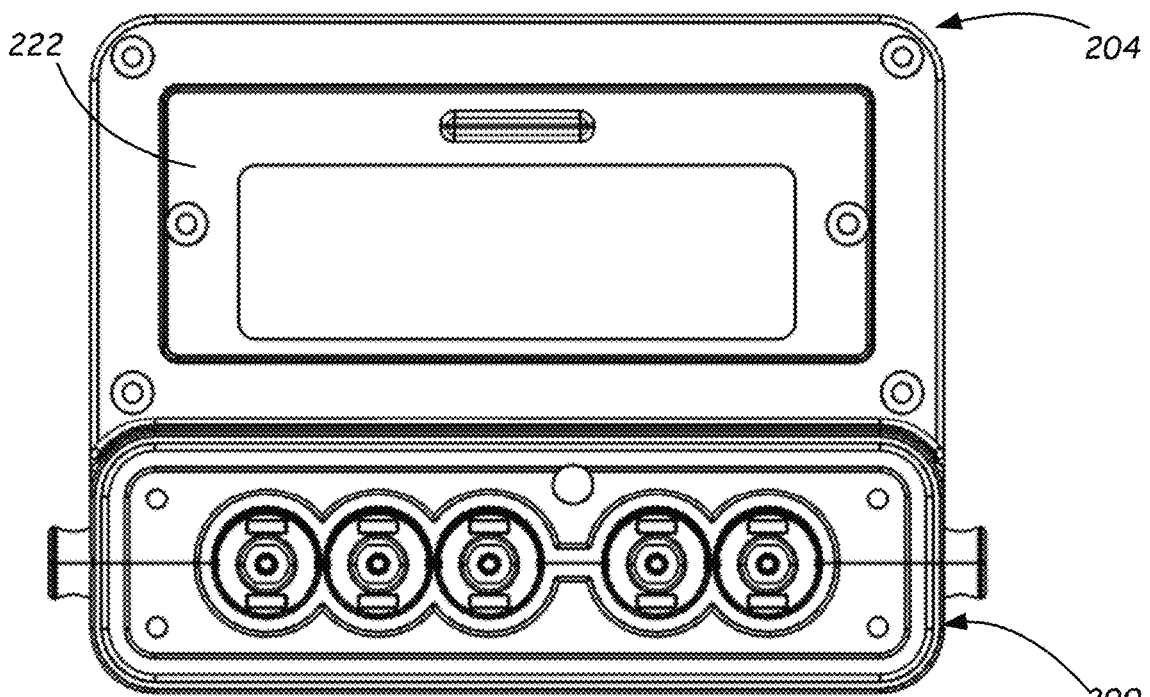
FIG. 12 illustrates an internal end view of the second connector side illustrated in FIG. 10.
Figure 13:
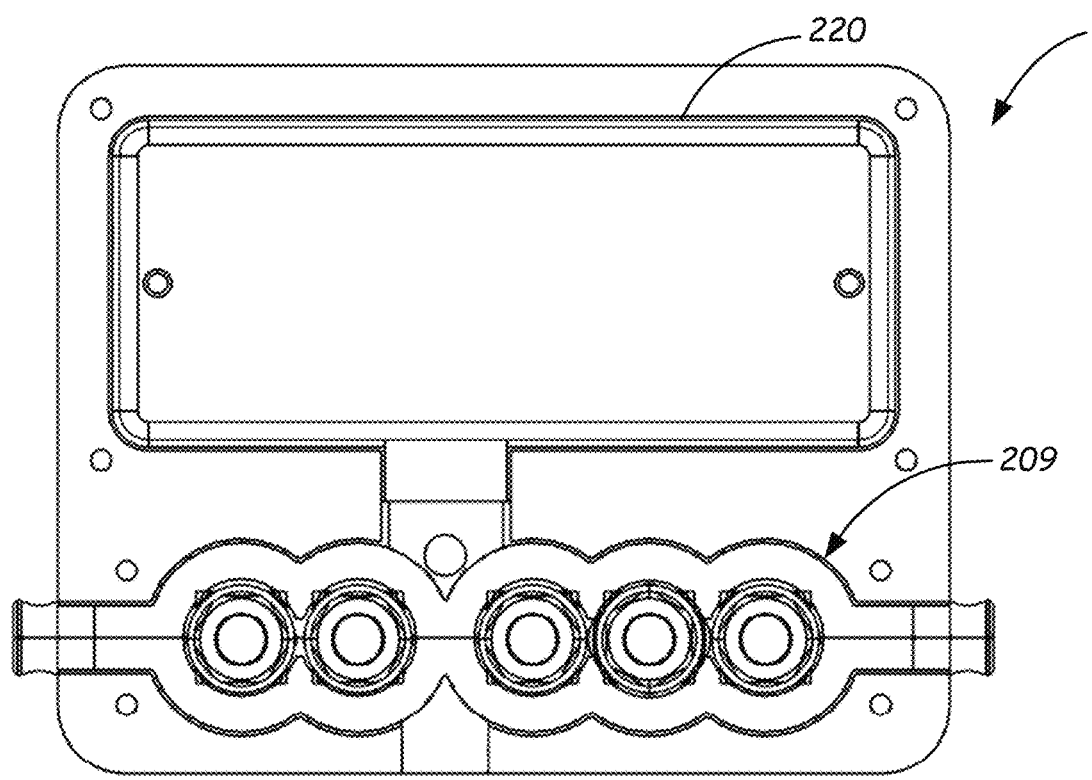
FIG. 13 illustrates an external end view of the second connector side illustrated in FIG. 10.
Figure 15A:
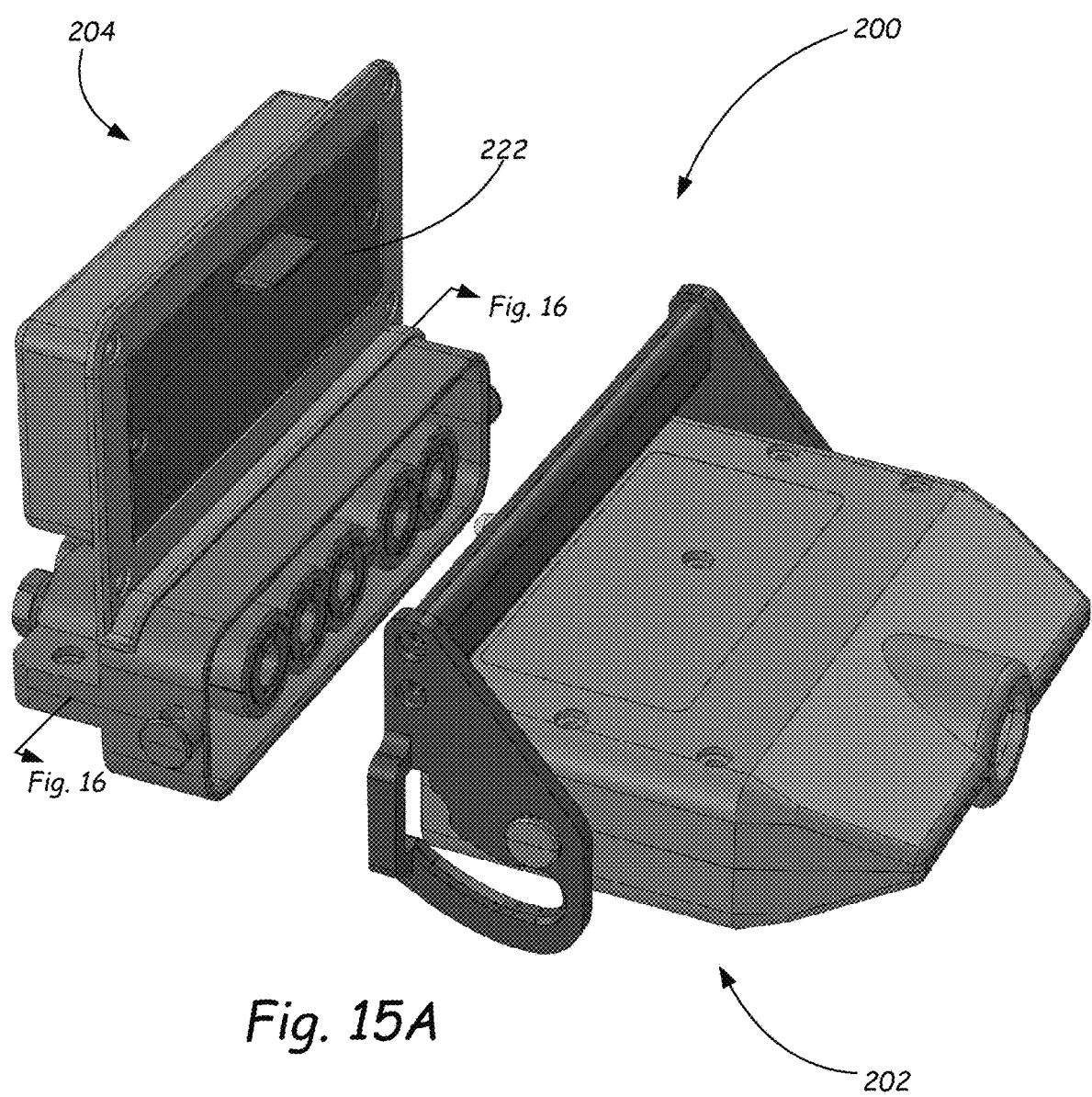
FIG. 15A illustrates a third perspective view of the high voltage connector of FIG. 4 with the fuse door of FIG. 14 inserted into place according to an embodiment.
Figure 15B:
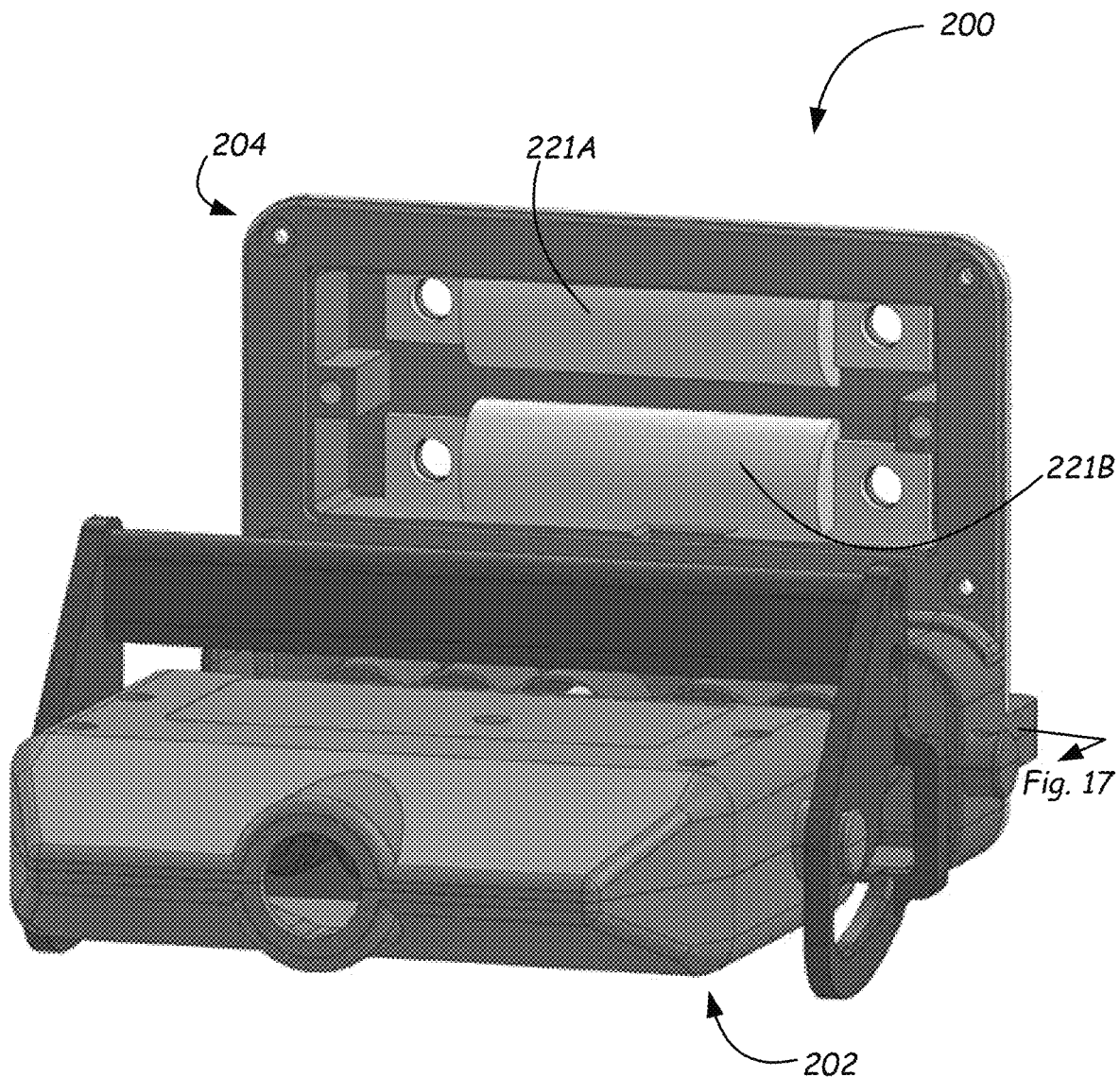
FIG. 15B illustrates a fourth perspective view of the high voltage connector of FIG. 4 with the fuse door of FIG. 14 removed according to an embodiment

FIG. 10 illustrates a first perspective view, FIG. 11 illustrates a second perspective view, FIG. 12 illustrates an internal end view and FIG. 13 illustrates an external end view of second connector side 204. Besides second connector side 204 including second type or second sex of connector poles 203 housed in carrier housing 209, second connector side 204 includes a fuse box 220 including at least one fuse 221 (of which two fuses 221A and 221B are illustrated in FIG. 15B) and a removable fuse door 222 having an interlock. Second connector side 204 further includes a mechanical component configured into a first position and a second position. The mechanical component (not shown in FIGS. 10-13) is configured to block or lock out keying post 216 in a first position to thereby block keying post 216 from mating the first connector side 202 with the second connector side 204, and is configured to allow keying post 216 to mate with second connector side 204 in a second position.

Figure 14:
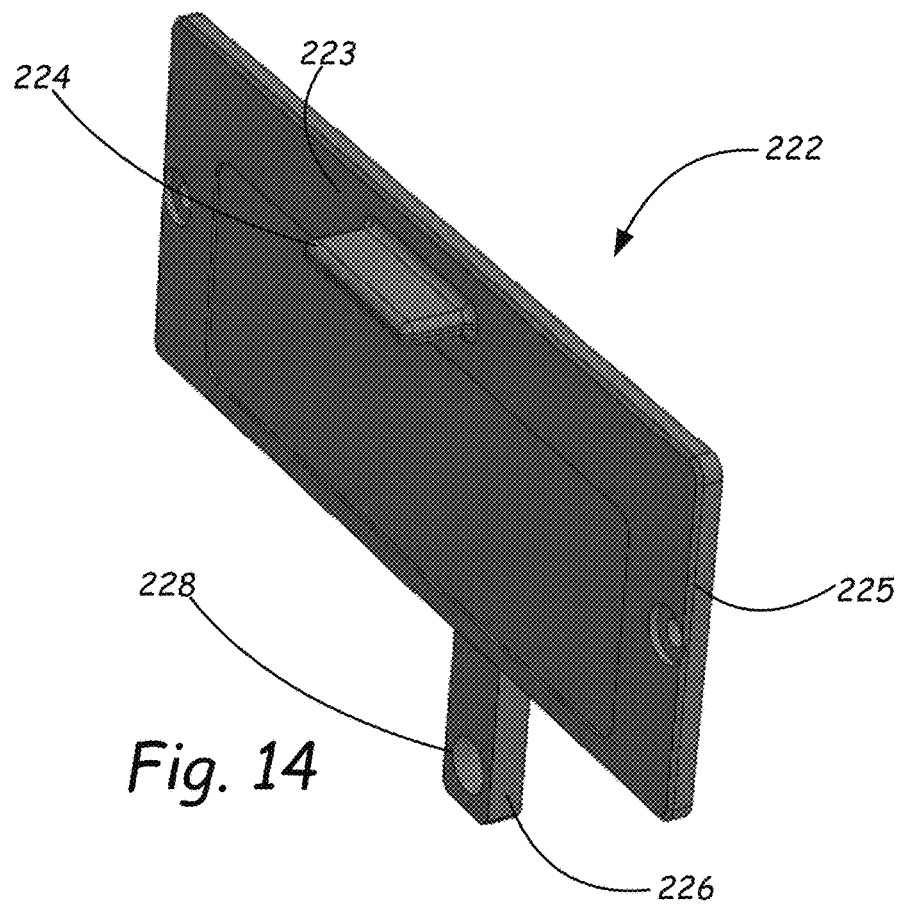
FIG. 14 illustrates a perspective view of a removable fuse door of second connector side according to an embodiment.

FIG. 14 illustrates a perspective view of a removable fuse door 222. Fuse door 222 includes a handle 224 on a front side 223 of a main panel 225 of fuse door 222 and a tab 226 that protrudes downwardly from main panel 225 to provide fuse door 222 with an interlock. Tab 226 includes an aperture 228 that extends through a thickness of tab 226. FIG. 15A illustrates a perspective view of fuse door 222 inserted into place in second connector side 204 and with first connector side 202 decoupled from second connector side 204. FIG. 15B illustrates a perspective view of fuse door 222 removed from second connector side 204 and with first connector side 202 decoupled from second connector side 204.

Figure 16:
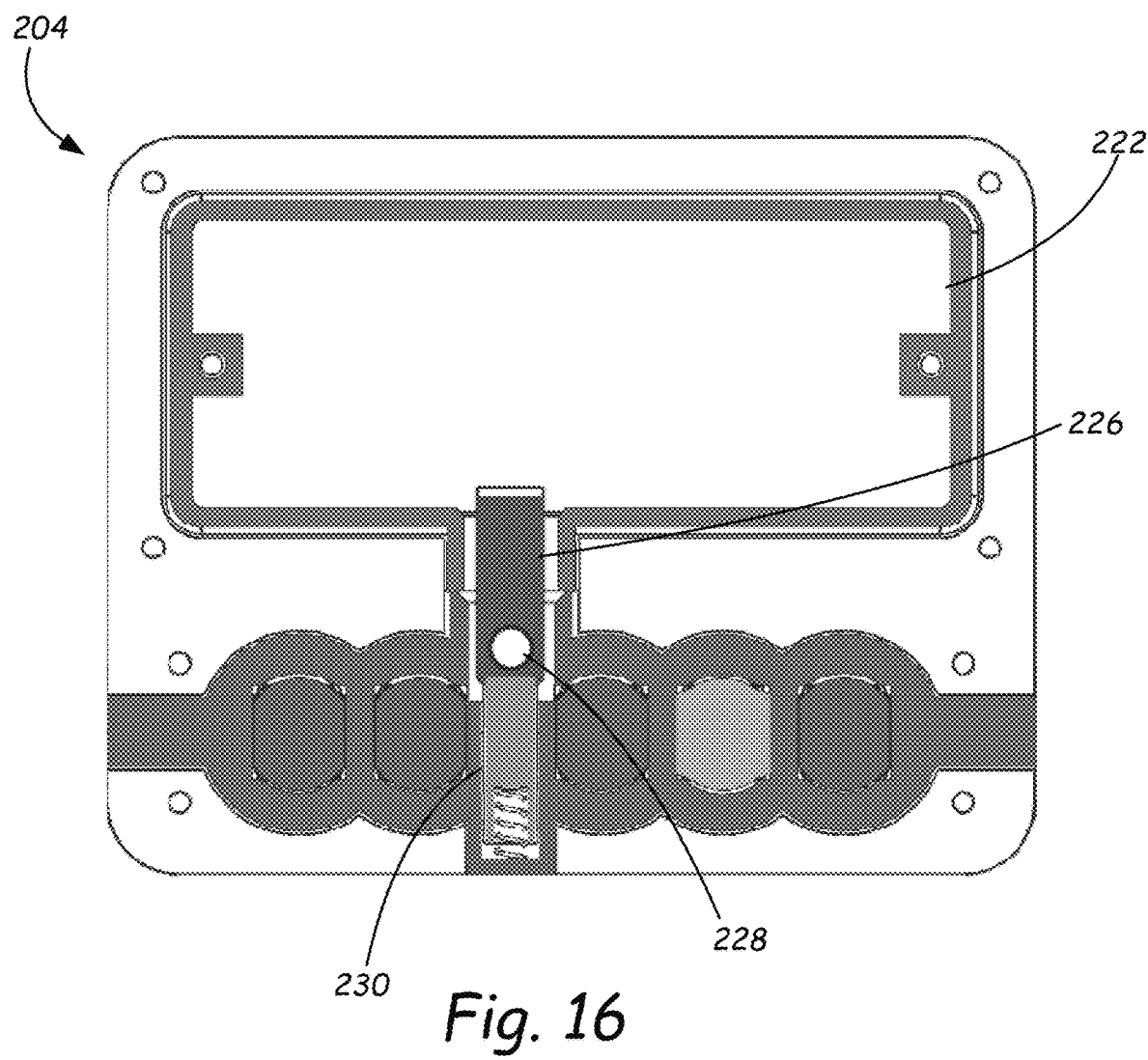
FIG. 16 illustrates a section view of the second connector side taken through the section line illustrated in FIG. 15A and with the fuse door inserted into place according to an embodiment.
Figure 17:
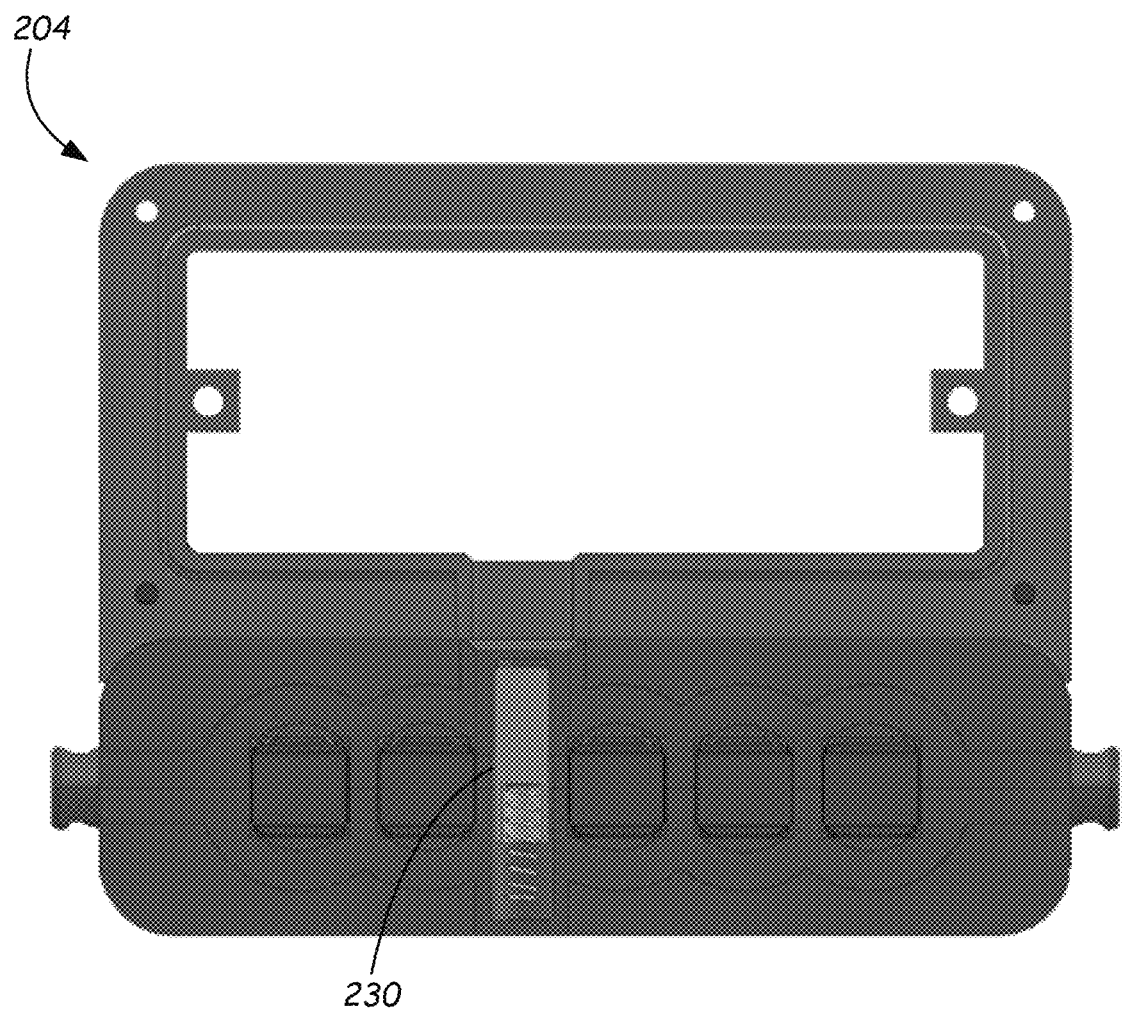
FIG. 17 illustrates a section view of the second connector side taken through the section line illustrated in FIG. 15B and with the fuse door removed according to an embodiment.

FIG. 16 illustrates a section view of second connector side 204 taken through the section line illustrated in FIG. 15A, and FIG. 17 illustrates a section view of second connector side 204 taken through the section line illustrated in FIG. 15B. Under one embodiment, mechanical component 230 is a spring-loaded plunger. In FIGS. 15A and 16, when fuse door 222 is in place in second connector side 204 and covering fuse box 220, tab 226 pushes down on spring-loaded plunger 230 into the second position and aperture 228 is configured to receive keying post 216 of first connector side 202. In FIGS. 15B and 17, when fuse door 222 is removed from second connector side 204 or not in place, spring-loaded plunger 230 is not depressed and rises into a first position, blocking keying post 216 from being able to enter or be inserted into second connector side 204. Without fuse door 222 in place, first connector side 202 and second connector side 204 remain decoupled.

Figure 18:
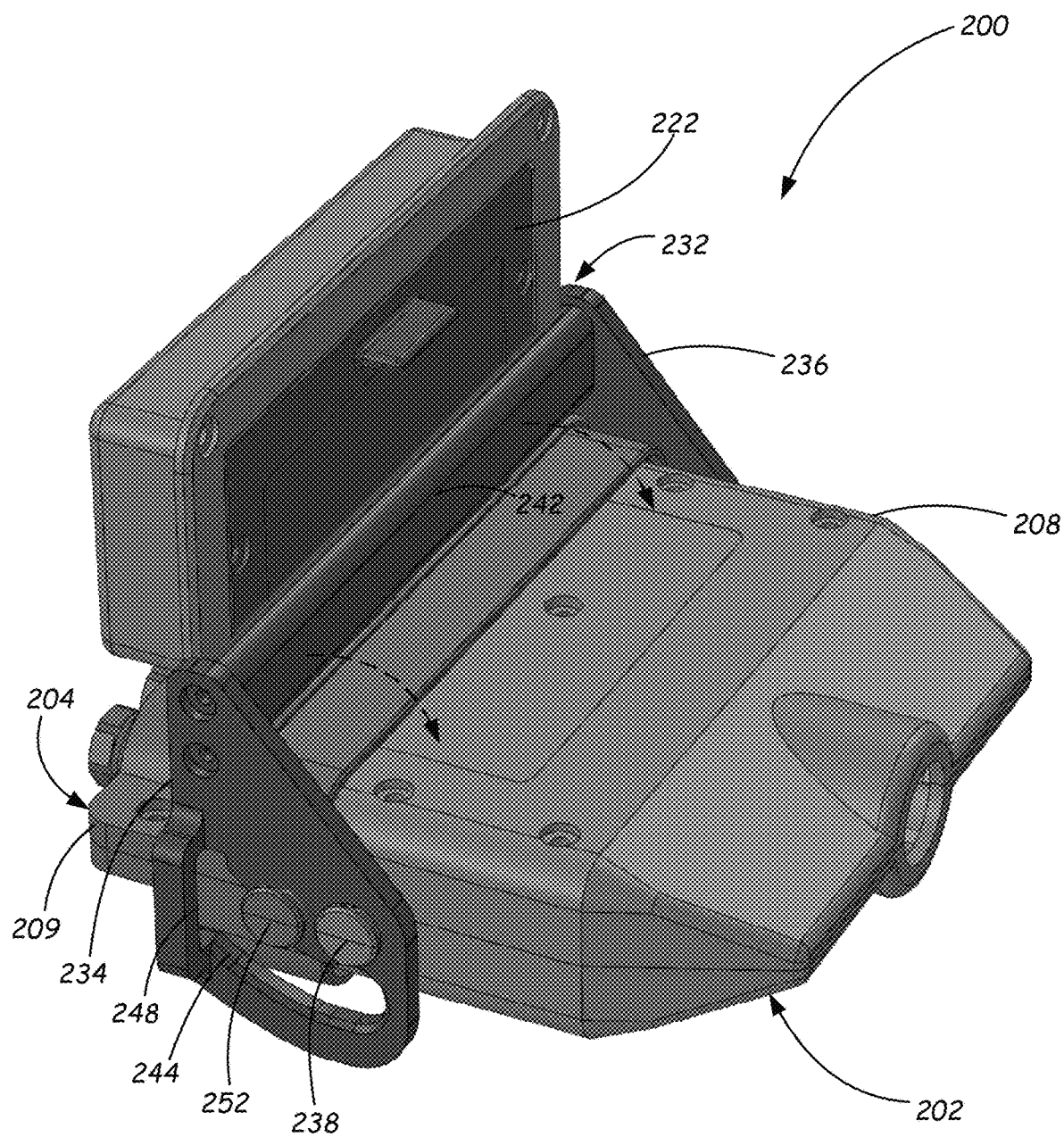
FIG. 18 illustrates a perspective view of the first connector side engaged with or mating with the second connector side 204 and with a latch in an unlocked position according to an embodiment.

FIG. 18 illustrates a perspective view of first connector side 202 engaged with or mating with second connector side 204. In FIG. 18, when mating first connector side 202 to second connector side 204, fuse door 222 is in place so that tab 226 depresses plunger 230 and keying post 216 is inserted through aperture 228 in tab 226. With keying post 216 inserted through aperture 228, fuse door 222 may not be removed, as it is locked in by keying post 216.

Figure 19:
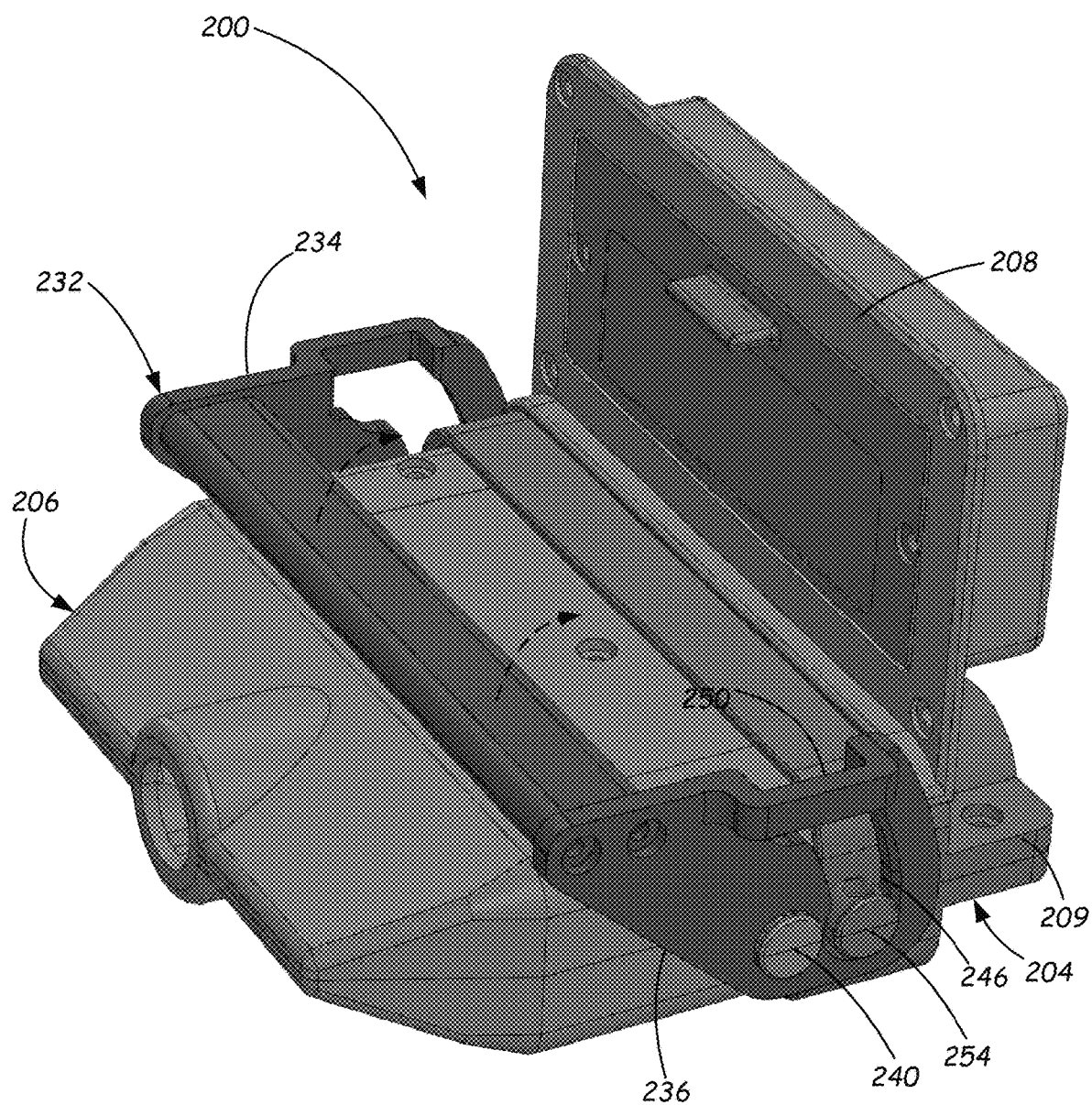
FIG. 19 illustrates a first perspective view of the first connector side engaged with or mating with the second connector side and with the latch in a locked position according to an embodiment.
Figure 20:
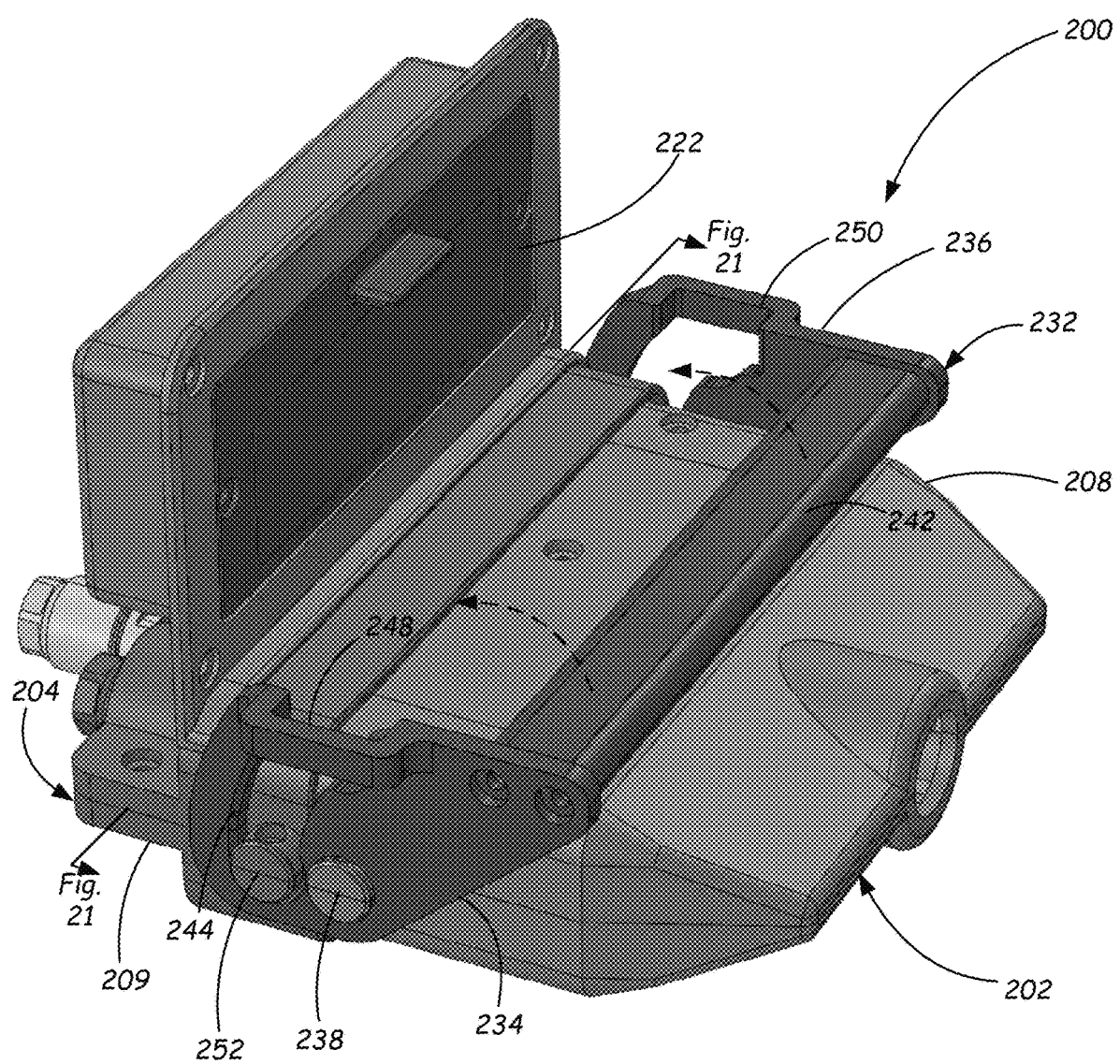
FIG. 20 illustrates a second perspective view of FIG. 19.

To further secure the engaging of or mating of second connector side 204 with first connector side 202, a latch 232 is actuated from a first or unlocked position illustrated in FIG. 18 to a second or locked position illustrated in FIGS. 19 and 20. In the embodiment illustrated in FIGS. 4-13 and 18-20, latch 232 includes a pair of plates 234 and 236 each rotatably coupled to one of first pins 238 and 240 that protrude outwardly from opposing sides of carrier housing 208 of first connector side 202. The pair of plates 234 and 236 are attached to each other by an elongated cross bar 242 and each include a slot 244 and 246 having slot openings 248 and 250.

In the unlocked position as illustrated in FIGS. 15 and 18, latch 232 is rotated about first pins 238 and 240 so that slot opening 248 is configured to receive a second pin 252 that protrudes outwardly from a side of carrier housing 209 of second connector side 204 and slot opening 250 is configured to receive a second pin 254 that protrudes outwardly from an opposing side of carrier housing 209 of second connector side 204. It should be understood that slot opening 248 and slot opening 250 are only capable of receiving second pin 252 and second pin 254, respectively, if fuse door 222 is in place and covering fuse box 220. Otherwise, plunger 230 blocks keying post 216 and first connector side 202 and second connector side 204 are incapable of engaging or mating together and therefore slot opening 248 and slot opening 250 are incapable of receiving second pin 252 and second pin 254.

To lock latch 232, cross bar 242 is manually operated to rotate plates 234 and 236 in a first direction (indicated by the broken line arrows in FIG. 18) about first pins 238 and 240 and slots 244 and 246 are configured to receive and slide along second pins 252 and 254 to facilitate the mating of and latching of first side 202 and second connector side 204 into the locking position illustrated in FIGS. 19 and 20. Likewise, to unlock latch 232, cross bar 242 is manually operated to rotate plates 234 and 236 in an opposing second direction (indicated by the broken line arrows in FIG. 19) about first pins 238 and 240 and release second pins 252 and 254 from slots 244 and 246.

Figure 21:
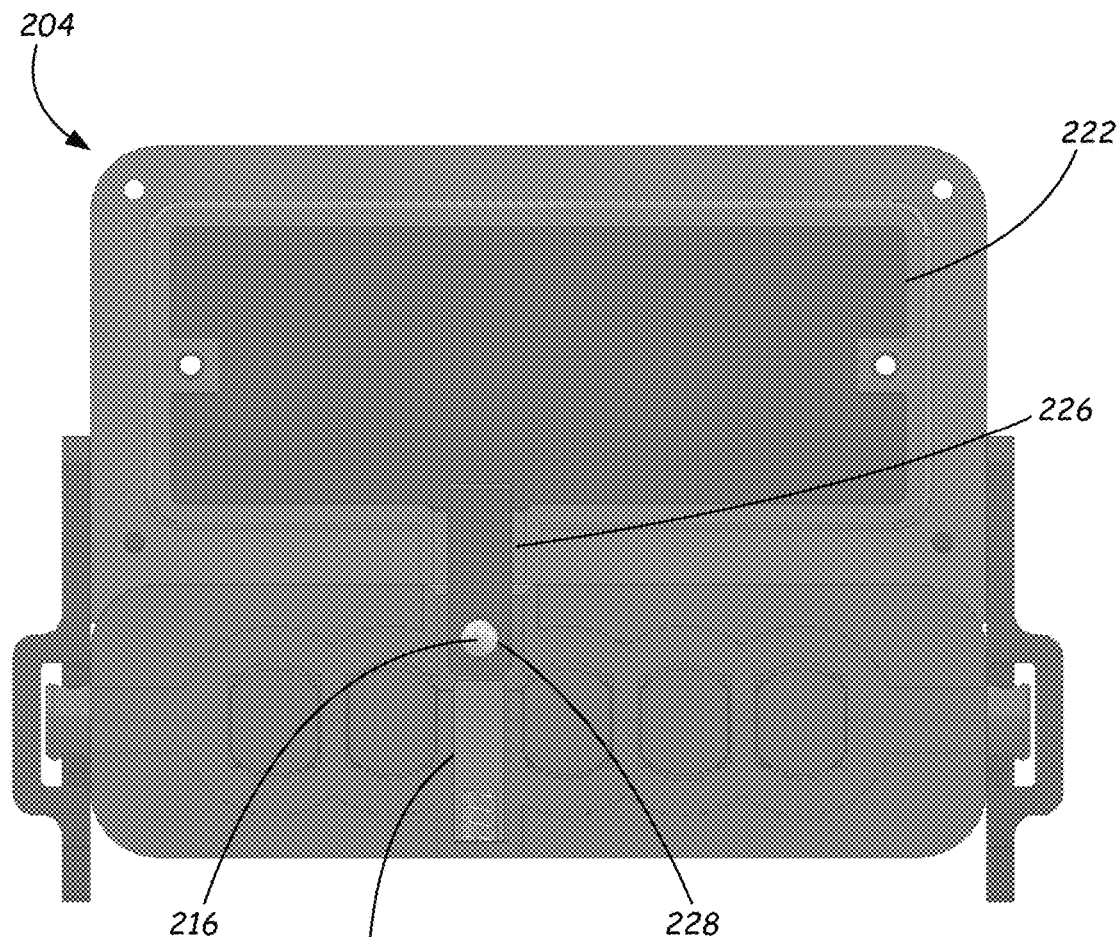
FIG. 21 illustrates a section view of the second connector side taken through the section line illustrated in FIG. 20 according to an embodiment.
Figure 22:
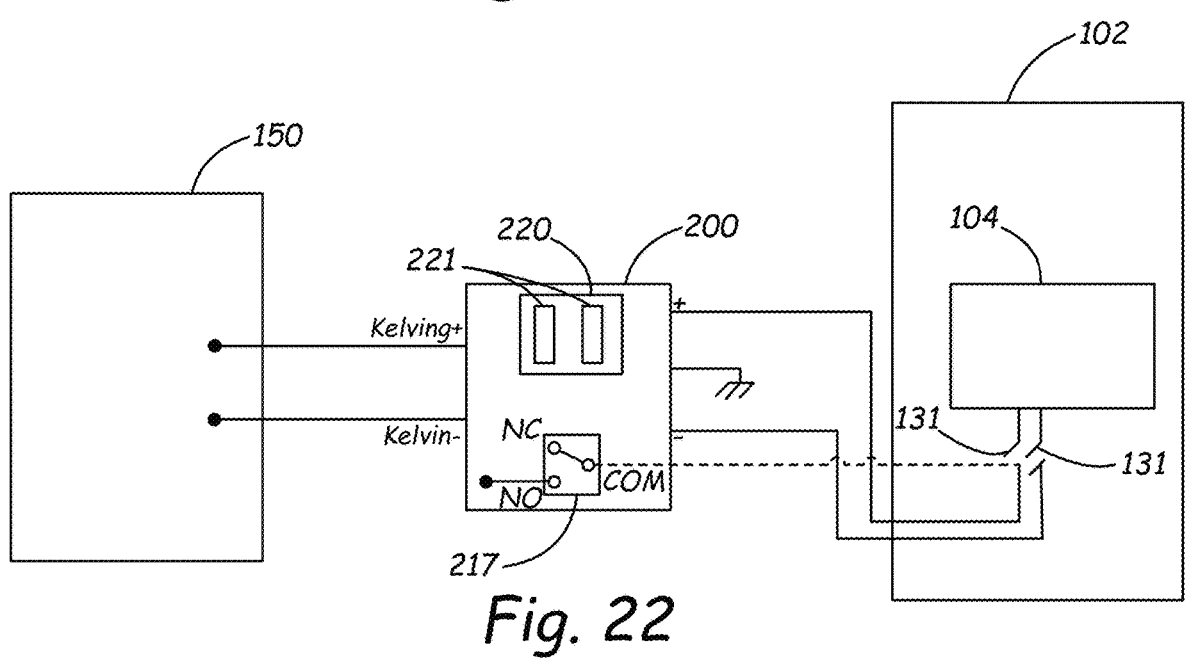
FIG. 22 illustrates a simplified schematic diagram of a high voltage connector according to an embodiment.

FIG. 21 illustrates a section view of connector 200 taken through the section line illustrated in FIG. 20. In the locked position of FIG. 21, tab 226 of fuse door 222 depresses plunger 230 and keying post 216 is correctly received by aperture 228 in tab 226. In this position, keying post 216 is configured to activate an electrical switch 217 (FIG. 22), such as a micro switch, to connect voltages to fuse block 220. FIG. 22 illustrates a simplified diagram of electrical couplings of high voltage connector 200. When keying post 216 is blocked by plunger 216, voltages are disconnected from fuse block 220 by switch 217 as is illustrated in FIG. 22. In this way, voltages are only connected upon fuse door 222 being in place and are disconnected upon fuse door 222 being removed, thus forming an integral fuse safety. In particular, high voltage contactors 131 are switches in the battery pack 104 or vehicle 102 that are actuated to cause battery pack 104 to be connected to high voltage output connections that electrically couple to high voltage connector 200. Under one embodiment, the connection between high voltage connector 200 and battery pack 104 is preferably a kelvin connection. Micro switch 217 controls the pilot voltage (coils) of high voltage contactors 131.

Figure 23:
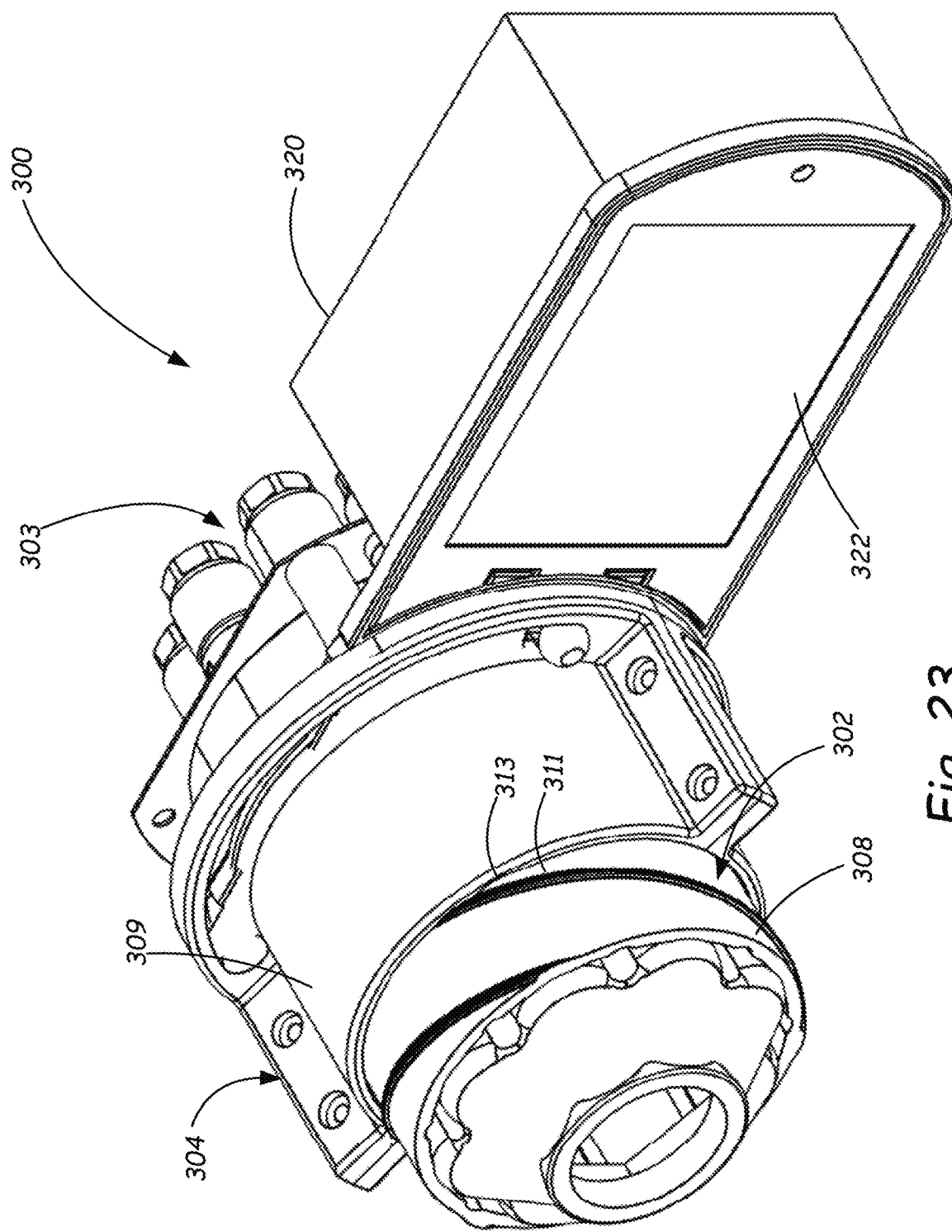
FIG. 23 illustrates a first perspective view of a high voltage connector with components removed for purposes of clarity according to another embodiment.
Figure 24:
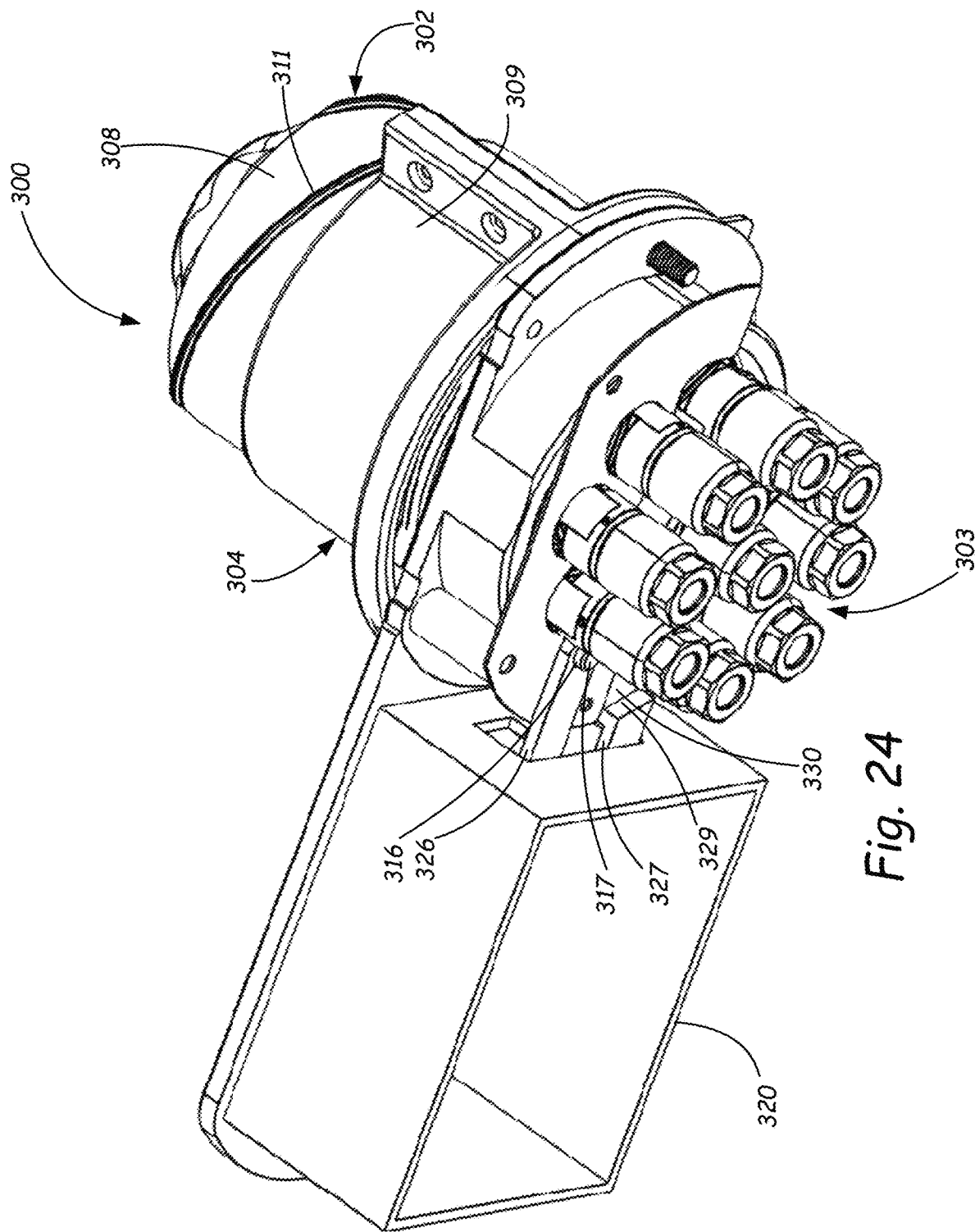
FIG. 24 illustrates a second perspective view of the high voltage connector of FIG. 23.
Figure 25A:
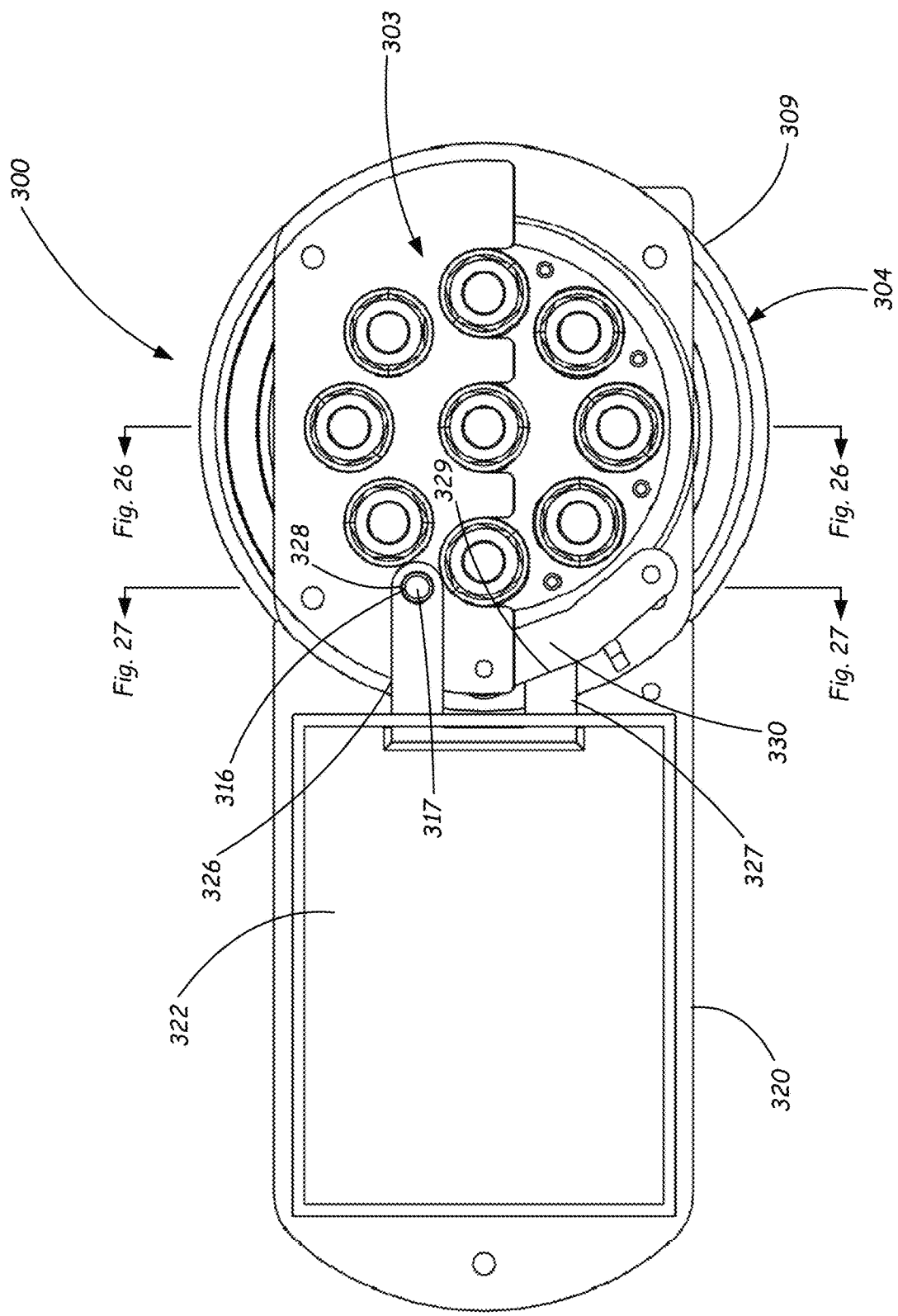
FIG. 25A illustrates an end view of second connector side of the high voltage connector of FIGS. 23 and 24.
Figure 25B:
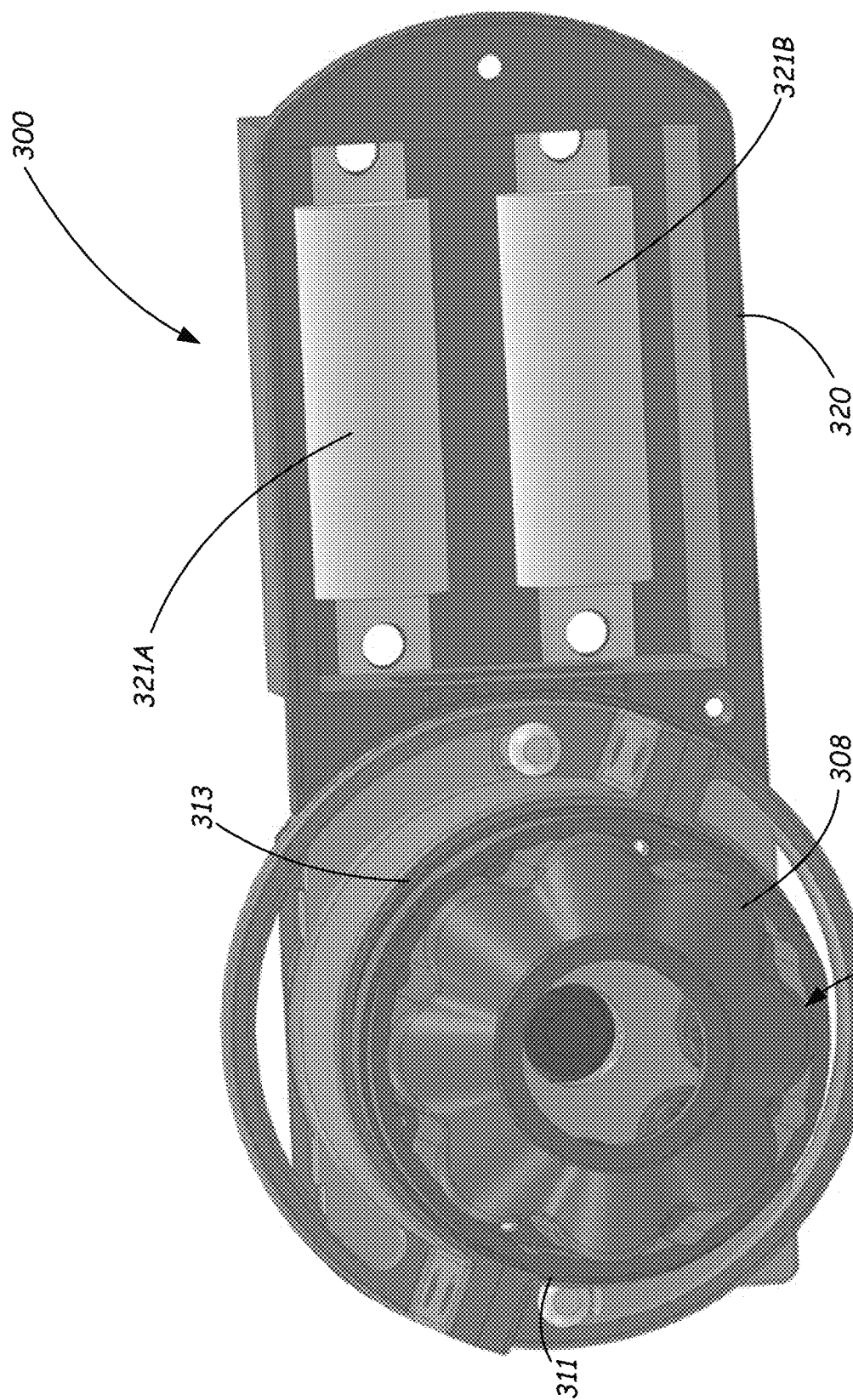
FIG. 25B illustrates an end view of first connector side of the high voltage connector of FIGS. 23 and 24.
Figure 27:
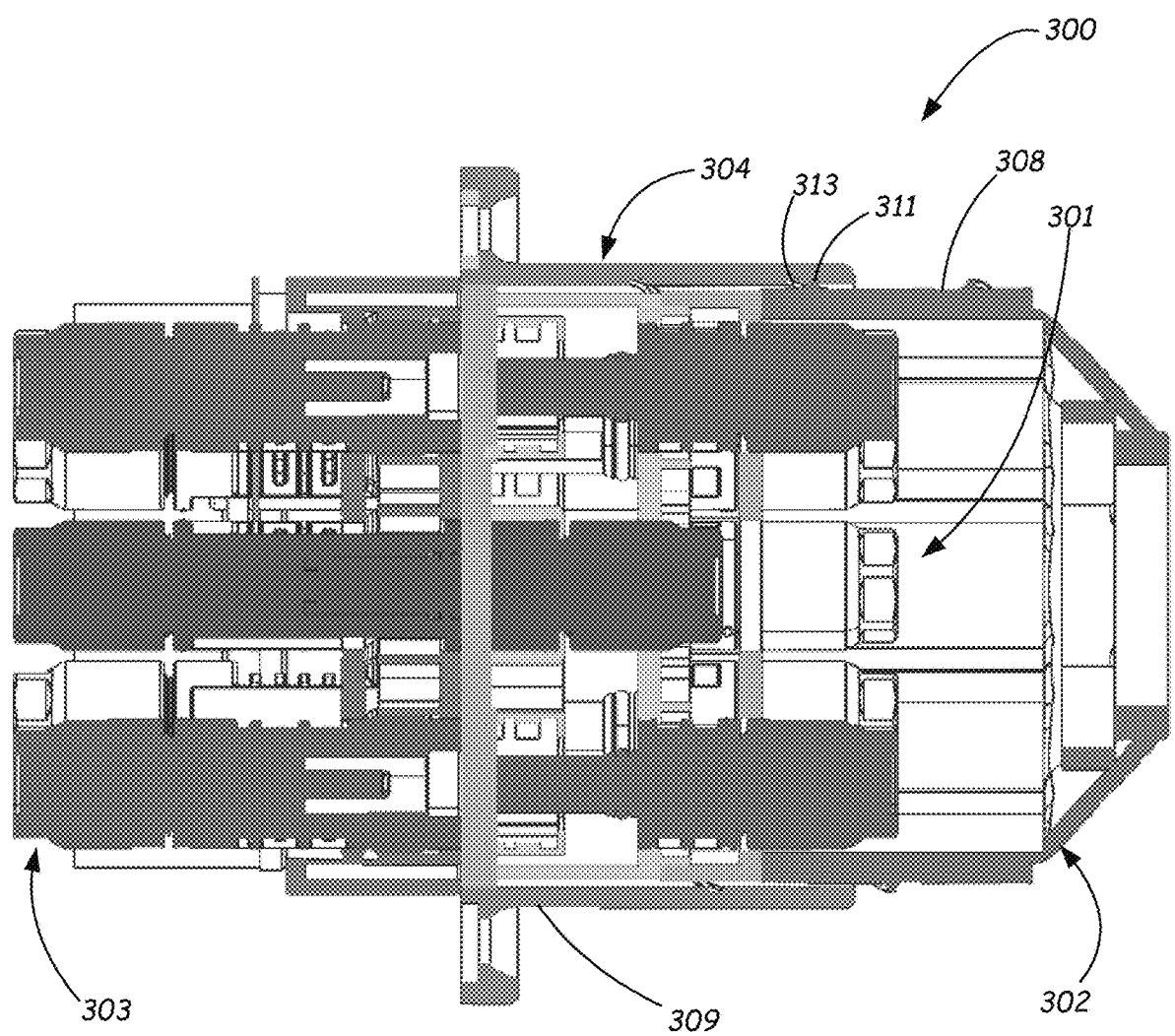
FIG. 27 illustrates a section view of the high voltage connector taken through the section line illustrated in FIG. 25A.
Figure 28:
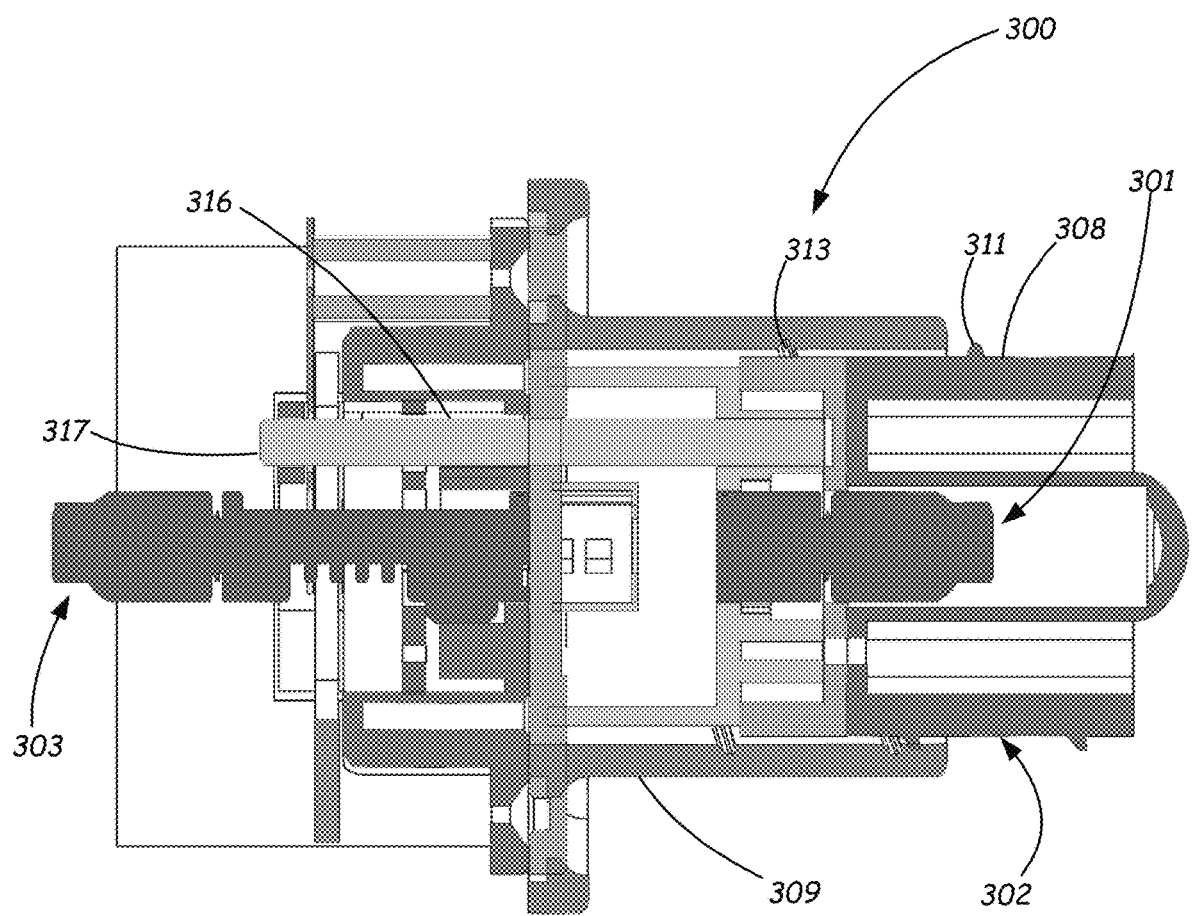
FIG. 28 illustrates a section view of the high voltage connector taken through the section line illustrated in FIG. 25A.
Figure 29:
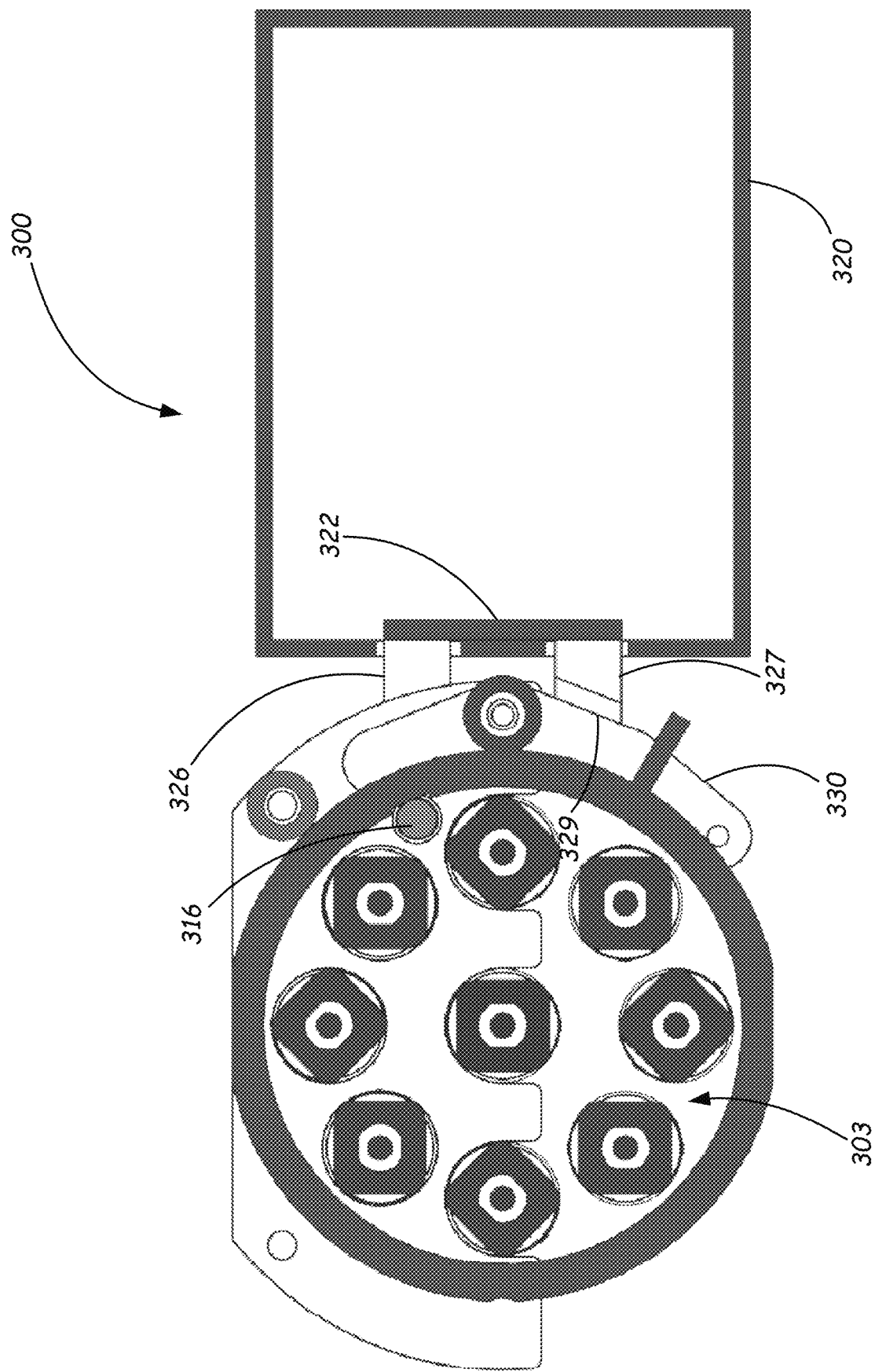
FIG. 29 illustrates a section view taken along the section line illustrated in FIG. 26.

FIG. 23 illustrates a first perspective view and FIG. 24 illustrates a second perspective view of at least a portion of a high voltage connector 300 according to another embodiment and configured for use as a high voltage junction box, such as high voltage junction box 154. FIG. 25B illustrates an end view of second connector side 304, FIG. 25B illustrates an end view of first connector side 302 and FIG. 26 illustrates a side view of FIGS. 23 and 24. FIGS. 27 and 28 illustrate section views taken along the section line illustrated in FIG. 25A and FIG. 29 illustrates a section view taken along the section line illustrated in FIG. 26. It should be realized that FIGS. 23, 24 and 25A illustrate a back wall of a fuse box 320 missing, but FIG. 25B illustrates the back wall of fuse box 320 in place but with fuse door 322 removed. High voltage connector 300 addresses the two potential sources of high voltage that can be present when using connectors and fusing that accommodates voltages that exceed 400-600 VDC. In FIGS. 23-29, first connector side 302 and second connector side 304 are coupled together and a cable terminal loaded into carrier housing 308 of first connector side 302 is not shown.

High voltage connector 300 includes first connector side or cable side 302 and second connector side or equipment or bulkhead side 304. Connector 300 houses a plurality of connector poles that accommodate voltages that exceed 400-600 VDC with a first type or first sex of connector poles 301 located in and housed in a carrier housing 308 of first connector side 302 and a second type or second sex of connector poles 303 located in and housed in a carrier housing 309 of second connector side 304. For example, the plurality of connector poles may be off-the-shelf solar connectors, such as MC4s.

In one configuration and as illustrated, connector 300 includes nine (9) connector poles. In the illustrated embodiment and for example, first type or first sex of connector poles 301 are female type connector poles and second type or second sex of connector poles 303 are male type connector poles. In one configuration and as illustrated, connector 300 includes nine (9) first type of connector poles and nine (9) second type of connectors poles. Each first type of connector pole is electrically coupleable to one of the second type of connector poles to provide nine complete connectors.

Each of the nine connectors are spaced apart from each other. Eight connectors have their centers located along a circumference of a circle and the center of a ninth connector is located at a midpoint of the circle. Under one embodiment, a first connector couples to a positive side of a battery pack, such as battery pack 104, a second connector couples to a negative side of a battery pack, such as battery pack 104, a third connector couples to a positive side of high voltage control circuitry with a Kelvin connection, such as high voltage control circuitry 170 of battery pack maintenance device 100, a fourth connector couples to a negative side of high voltage control circuitry with a Kelvin connection, such as high voltage control circuitry 170 of battery pack maintenance device 100, and a fifth connector is coupled to ground. The extra 4 poles are optional and are configured for multiple channel high voltage connectors, for example, for use in digital communication and etc.

Besides first connector side 302 including first type or sex of connector poles 301 housed in carrier housing 308, first connector side 302 further includes a keying post 316 configured to provide an interlocking function. Keying post 316 protrudes from first connector side 302 and terminates at a distal end 317. In particular, keying post 316 protrudes outwardly from the first type or first sex connector poles 301 and terminates at distal end 317. Besides second connector side 304 including second type or second sex of connector poles 303 housed in carrier housing 309, second connector side 304 includes a fuse box 320 including at least one fuse 321 (of which two fuses 321A and 321B are illustrated in FIG. 25B) and a removable fuse door 322 having an interlock. Second connector side 304 further includes a mechanical component 330 configured into a first position and a second position. Mechanical component 330 (FIGS. 24-26 and 29) is configured to block or lock out keying post 316 in a first position to thereby block keying post 316 from mating first connector side 302 with second connector side 304, and is configured to allow keying post 316 to mate with second connector side 304 in a second position.

Removable fuse door 322 includes a first tab 326 and a second tab 327 that protrudes from a portion of fuse door 322 and provides fuse door 322 with an interlock. First tab 326 includes an aperture 328 (FIG. 25A) that extends through a thickness of first tab 326. Second tab 327 includes a surface 329 that is configured to engage with mechanical component 330. In FIGS. 23-29, fuse door 322 is inserted into place in second connector side 304.

Under one embodiment, mechanical component 330 is an arm rotatable about a spring-loaded pin and has a first portion that extends in a first direction from the pin and has a second portion that extends in a second direction from the pin. When fuse door 322 is in place in second connector side 304 and covering fuse box 320, rotatable arm 330 is in a second position where surface 329 of second tab 327 engages with and pushes against the first portion of rotatable arm 330 so that the second portion of rotatable arm 330 moves out of the path of keying post 316 and allows aperture 328 in first tab 326 to receive keying post 316. With fuse door 322 in place, first connector side 302 and second connector side 304 are coupled. When fuse door 222 is removed from second connector side 304 or is not in place (not shown), rotatable arm 330 is in a first position that blocks keying post 316 from being able to enter or be inserted into second connector side 304. Without fuse door 322 in place, first connector side 302 and second connector side 304 remain decoupled.

In the second position, arm 330, as rotated by surface 329 of second tab 327, allows keying post 316 to be correctly received by aperture 328 in first tab 326. In this position, keying post 316 is configured to activate an electrical switch (not shown), such as a micro switch, to connect voltages to fuse block 320. When keying post 316 is blocked by rotatable arm 330 is in the first position, all voltages are disconnected from fuse block 320. In this way, voltages are only connected upon fuse door 322 being in place and disconnected upon fuse door 322 being removed thus forming an integral fuse safety. Such an arrangement is illustrated in FIG. 22 and described above.

To further secure the engaging of or mating of second connector side 304 with first connector side 302, an outside surface of carrier housing 308 of first connector side 302 includes male threads 311 and an inside surface of carrier housing 309 of second connector side 304 includes female threads 313. Therefore, male threads 311 on the outside surface of carrier housing 308 rotatably mate with female threads 313 of carrier housing 309 to either draw first connector side 302 into second connector side 304, or to help push first connector side 302 out of the panel mount to disconnect.

Although the present invention has been described with reference to preferred embodiments, workers skilled in the art will recognize that changes may be made in form and detail without departing from the spirit and scope of the invention. As discussed herein, a maintenance device 100 is configured to perform maintenance on a battery pack 104 of the automotive vehicle, which can be an electric or hybrid vehicle where the battery pack 104 power motor(s) 106 of the vehicle 102. The maintenance device 100 includes communication circuitry such as I/O circuitry 190 configured to communicate with controller 120 and/or sensors 122 of battery pack 104. Element 170 provides measurement circuitry configured to perform measurements on the battery pack 104 including measurements of individual batteries/cells of the battery pack 104. These measurements can be in accordance with any appropriate technique including load tests, voltage measurements, current measurements, static parameter measurements and/or dynamic parameter measurements. Dynamic parameter measurements can be obtained using any appropriate technique and include, for example, inductance, conductance, resistance, impedance, etc. in which a forcing function is applied to the battery/cell and a resulting parameter is measured. A forcing function is an input or output applied to the battery having a time varying component including a transient. Microprocessor 160 operates as a controller configured to verify operation of the sensors 122 by comparing the information retrieved by I/O circuitry 190 with measurement information obtained using measurement circuitry 170 responsibly provides a comparison output to, for example, I/O circuitry 182, 184 or 186. The I/O circuitry 182, 184 or 186 provides an output indicative of a failing sensor 122 in the battery pack 104 based upon the comparison output from the microprocessor 160.

Other example battery maintenance devices, circuitry and techniques are shown and described in U.S. Pat. No. 3,873,911, issued Mar. 25, 1975, to Champlin; U.S. Pat. No. 3,909,708, issued Sep. 30, 1975, to Champlin; U.S. Pat. No. 4,816,768, issued Mar. 28, 1989, to Champlin; U.S. Pat. No. 4,825,170, issued Apr. 25, 1989, to Champlin; U.S. Pat. No. 4,881,038, issued Nov. 14, 1989, to Champlin; U.S. Pat. No. 4,912,416, issued Mar. 27, 1990, to Champlin; U.S. Pat. No. 5,140,269, issued Aug. 18, 1992, to Champlin; U.S. Pat. No. 5,343,380, issued Aug. 30, 1994; U.S. Pat. No. 5,572,136, issued Nov. 5, 1996; U.S. Pat. No. 5,574,355, issued Nov. 12, 1996; U.S. Pat. No. 5,583,416, issued Dec. 10, 1996; U.S. Pat. No. 5,585,728, issued Dec. 17, 1996; U.S. Pat. No. 5,589,757, issued Dec. 31, 1996; U.S. Pat. No. 5,592,093, issued Jan. 7, 1997; U.S. Pat. No. 5,598,098, issued Jan. 28, 1997; U.S. Pat. No. 5,656,920, issued Aug. 12, 1997; U.S. Pat. No. 5,757,192, issued May 26, 1998; U.S. Pat. No. 5,821,756, issued Oct. 13, 1998; U.S. Pat. No. 5,831,435, issued Nov. 3, 1998; U.S. Pat. No. 5,871,858, issued Feb. 16, 1999; U.S. Pat. No. 5,914,605, issued Jun. 22, 1999; U.S. Pat. No. 5,945,829, issued Aug. 31, 1999; U.S. Pat. No. 6,002,238, issued Dec. 14, 1999; U.S. Pat. No. 6,037,751, issued Mar. 14, 2000; U.S. Pat. No. 6,037,777, issued Mar. 14, 2000; U.S. Pat. No. 6,051,976, issued Apr. 18, 2000; U.S. Pat. No. 6,081,098, issued Jun. 27, 2000; U.S. Pat. No. 6,091,245, issued Jul. 18, 2000; U.S. Pat. No. 6,104,167, issued Aug. 15, 2000; U.S. Pat. No. 6,137,269, issued Oct. 24, 2000; U.S. Pat. No. 6,163,156, issued Dec. 19, 2000; U.S. Pat. No. 6,172,483, issued Jan. 9, 2001; U.S. Pat. No. 6,172,505, issued Jan. 9, 2001; U.S. Pat. No. 6,222,369, issued Apr. 24, 2001; U.S. Pat. No. 6,225,808, issued May 1, 2001; U.S. Pat. No. 6,249,124, issued Jun. 19, 2001; U.S. Pat. No. 6,259,254, issued Jul. 10, 2001; U.S. Pat. No. 6,262,563, issued Jul. 17, 2001; U.S. Pat. No. 6,294,896, issued Sep. 25, 2001; U.S. Pat. No. 6,294,897, issued Sep. 25, 2001; U.S. Pat. No. 6,304,087, issued Oct. 16, 2001; U.S. Pat. No. 6,310,481, issued Oct. 30, 2001; U.S. Pat. No. 6,313,607, issued Nov. 6, 2001; U.S. Pat. No. 6,313,608, issued Nov. 6, 2001; U.S. Pat. No. 6,316,914, issued Nov. 13, 2001; U.S. Pat. No. 6,323,650, issued Nov. 27, 2001; U.S. Pat. No. 6,329,793, issued Dec. 11, 2001; U.S. Pat. No. 6,331,762, issued Dec. 18, 2001; U.S. Pat. No. 6,332,113, issued Dec. 18, 2001; U.S. Pat. No. 6,351,102, issued Feb. 26, 2002; U.S. Pat. No. 6,359,441, issued Mar. 19, 2002; U.S. Pat. No. 6,363,303, issued Mar. 26, 2002; U.S. Pat. No. 6,377,031, issued Apr. 23, 2002; U.S. Pat. No. 6,392,414, issued May 21, 2002; U.S. Pat. No. 6,417,669, issued Jul. 9, 2002; U.S. Pat. No. 6,424,158, issued Jul. 23, 2002; U.S. Pat. No. 6,441,585, issued Aug. 17, 2002; U.S. Pat. No. 6,437,957, issued Aug. 20, 2002; U.S. Pat. No. 6,445,158, issued Sep. 3, 2002; U.S. Pat. Nos. 6,456,045; 6,466,025, issued Oct. 15, 2002; U.S. Pat. No. 6,465,908, issued Oct. 15, 2002; U.S. Pat. No. 6,466,026, issued Oct. 15, 2002; U.S. Pat. No. 6,469,511, issued Nov. 22, 2002; U.S. Pat. No. 6,495,990, issued Dec. 17, 2002; U.S. Pat. No. 6,497,209, issued Dec. 24, 2002; U.S. Pat. No. 6,507,196, issued Jan. 14, 2003; U.S. Pat. No. 6,534,993; issued Mar. 18, 2003; U.S. Pat. No. 6,544,078, issued Apr. 8, 2003; U.S. Pat. No. 6,556,019, issued Apr. 29, 2003; U.S. Pat. No. 6,566,883, issued May 20, 2003; U.S. Pat. No. 6,586,941, issued Jul. 1, 2003; U.S. Pat. No. 6,597,150, issued Jul. 22, 2003; U.S. Pat. No. 6,621,272, issued Sep. 16, 2003; U.S. Pat. No. 6,623,314, issued Sep. 23, 2003; U.S. Pat. No. 6,633,165, issued Oct. 14, 2003; U.S. Pat. No. 6,635,974, issued Oct. 21, 2003; U.S. Pat. No. 6,696,819, issued Feb. 24, 20144; U.S. Pat. No. 6,707,303, issued Mar. 16, 2004; U.S. Pat. No. 6,737,831, issued May 18, 2004; U.S. Pat. No. 6,744,149, issued Jun. 1, 2004; U.S. Pat. No. 6,759,849, issued Jul. 6, 2004; U.S. Pat. No. 6,781,382, issued Aug. 24, 2004; U.S. Pat. No. 6,788,025, filed Sep. 7, 2004; U.S. Pat. No. 6,795,782, issued Sep. 21, 2004; U.S. Pat. No. 6,805,090, filed Oct. 19, 2004; U.S. Pat. No. 6,806,716, filed Oct. 19, 2004; U.S. Pat. No. 6,850,037, filed Feb. 1, 2005; U.S. Pat. No. 6,850,037, issued Feb. 1, 2005; U.S. Pat. No. 6,871,151, issued Mar. 22, 2005; U.S. Pat. No. 6,885,195, issued Apr. 26, 2005; U.S. Pat. No. 6,888,468, issued May 3, 2005; U.S. Pat. No. 6,891,378, issued May 10, 2005; U.S. Pat. No. 6,906,522, issued Jun. 14, 2005; U.S. Pat. No. 6,906,523, issued Jun. 14, 2005; U.S. Pat. No. 6,909,287, issued Jun. 21, 2005; U.S. Pat. No. 6,914,413, issued Jul. 5, 2005; U.S. Pat. No. 6,913,483, issued Jul. 5, 2005; U.S. Pat. No. 6,930,485, issued Aug. 16, 2005; U.S. Pat. No. 6,933,727, issued Aug. 23, 200; U.S. Pat. No. 6,941,234, filed Sep. 6, 2005; U.S. Pat. No. 6,967,484, issued Nov. 22, 2005; U.S. Pat. No. 6,998,847, issued Feb. 14, 2006; U.S. Pat. No. 7,003,410, issued Feb. 21, 2006; U.S. Pat. No. 7,003,411, issued Feb. 21, 2006; U.S. Pat. No. 7,012,433, issued Mar. 14, 2006; U.S. Pat. No. 7,015,674, issued Mar. 21, 2006; U.S. Pat. No. 7,034,541, issued Apr. 25, 2006; U.S. Pat. No. 7,039,533, issued May 2, 2006; U.S. Pat. No. 7,058,525, issued Jun. 6, 2006; U.S. Pat. No. 7,081,755, issued Jul. 25, 2006; U.S. Pat. No. 7,106,070, issued Sep. 12, 2006; U.S. Pat. No. 7,116,109, issued Oct. 3, 2006; U.S. Pat. No. 7,119,686, issued Oct. 10, 2006; and U.S. Pat. No. 7,126,341, issued Oct. 24, 2006; U.S. Pat. No. 7,154,276, issued Dec. 26, 2006; U.S. Pat. No. 7,198,510, issued Apr. 3, 2007; U.S. Pat. No. 7,363,175, issued Apr. 22, 2008; U.S. Pat. No. 7,208,914, issued Apr. 24, 2007; U.S. Pat. No. 7,246,015, issued Jul. 17, 2007; U.S. Pat. No. 7,295,936, issued Nov. 13, 2007; U.S. Pat. No. 7,319,304, issued Jan. 15, 2008; U.S. Pat. No. 7,363,175, issued Apr. 22, 2008; U.S. Pat. No. 7,398,176, issued Jul. 8, 2008; U.S. Pat. No. 7,408,358, issued Aug. 5, 2008; U.S. Pat. No. 7,425,833, issued Sep. 16, 2008; U.S. Pat. No. 7,446,536, issued Nov. 4, 2008; U.S. Pat. No. 7,479,763, issued Jan. 20, 2009; U.S. Pat. No. 7,498,767, issued Mar. 3, 2009; U.S. Pat. No. 7,501,795, issued Mar. 10, 2009; U.S. Pat. No. 7,505,856, issued Mar. 17, 2009; U.S. Pat. No. 7,545,146, issued Jun. 9, 2009; U.S. Pat. No. 7,557,586, issued Jul. 7, 2009; U.S. Pat. No. 7,595,643, issued Sep. 29, 2009; U.S. Pat. No. 7,598,699, issued Oct. 6, 2009; U.S. Pat. No. 7,598,744, issued Oct. 6, 2009; U.S. Pat. No. 7,598,743, issued Oct. 6, 2009; U.S. Pat. No. 7,619,417, issued Nov. 17, 2009; U.S. Pat. No. 7,642,786, issued Jan. 5, 2010; U.S. Pat. No. 7,642,787, issued Jan. 5, 2010; U.S. Pat. No. 7,656,162, issued Feb. 2, 2010; U.S. Pat. No. 7,688,074, issued Mar. 30, 2010; U.S. Pat. No. 7,705,602, issued Apr. 27, 2010; U.S. Pat. No. 7,706,992, issued Apr. 27, 2010; U.S. Pat. No. 7,710,119, issued May 4, 2010; U.S. Pat. No. 7,723,993, issued May 25, 2010; U.S. Pat. No. 7,728,597, issued Jun. 1, 2010; U.S. Pat. No. 7,772,850, issued Aug. 10, 2010; U.S. Pat. No. 7,774,151, issued Aug. 10, 2010; U.S. Pat. No. 7,777,612, issued Aug. 17, 2010; U.S. Pat. No. 7,791,348, issued Sep. 7, 2010; U.S. Pat. No. 7,808,375, issued Oct. 5, 2010; U.S. Pat. No. 7,924,015, issued Apr. 12, 2011; U.S. Pat. No. 7,940,053, issued May 10, 2011; U.S. Pat. No. 7,940,052, issued May 10, 2011; U.S. Pat. No. 7,959,476, issued Jun. 14, 2011; U.S. Pat. No. 7,977,914, issued Jul. 12, 2011; U.S. Pat. No. 7,999,505, issued Aug. 16, 2011; U.S. Patent No. D643,759, issued Aug. 23, 2011; U.S. Pat. No. 8,164,343, issued Apr. 24, 2012; U.S. Pat. No. 8,198,900, issued Jun. 12, 2012; U.S. Pat. No. 8,203,345, issued Jun. 19, 2012; U.S. Pat. No. 8,237,448, issued Aug. 7, 2012; U.S. Pat. No. 8,306,690, issued Nov. 6, 2012; U.S. Pat. No. 8,344,685, issued Jan. 1, 2013; U.S. Pat. No. 8,436,619, issued May 7, 2013; U.S. Pat. No. 8,442,877, issued May 14, 2013; U.S. Pat. No. 8,493,022, issued Jul. 23, 2013; U.S. Patent No. D687,727, issued Aug. 13, 2013; U.S. Pat. No. 8,513,949, issued Aug. 20, 2013; U.S. Pat. No. 8,674,654, issued Mar. 18, 2014; U.S. Pat. No. 8,674,711, issued Mar. 18, 2014; U.S. Pat. No. 8,704,483, issued Apr. 22, 2014; U.S. Pat. No. 8,738,309, issued May 27, 2014; U.S. Pat. No. 8,754,653, issued Jun. 17, 2014; U.S. Pat. No. 8,872,516, issued Oct. 28, 2014; U.S. Pat. No. 8,872,517, issued Oct. 28, 2014; U.S. Pat. No. 8,958,998, issued Feb. 17, 2015; U.S. Pat. No. 8,963,550, issued Feb. 24, 2015; U.S. Pat. No. 9,018,958, issued Apr. 28, 2015; U.S. Pat. No. 9,052,366, issued Jun. 9, 2015; U.S. Pat. No. 9,201,120, issued Dec. 1, 2015; U.S. Pat. No. 9,229,062, issued Jan. 5, 20126; U.S. Pat. No. 9,244,100, issued Jan. 26, 2016; U.S. Pat. No. 9,274,157, issued Mar. 1, 2016; U.S. Pat. No. 9,312,575, issued Apr. 12, 2016; U.S. Pat. No. 9,335,362, issued May 10, 2016; U.S. Pat. No. 9,425,487, issued Aug. 23, 2016; U.S. Pat. No. 9,419,311, issued Aug. 16, 2016; U.S. Pat. No. 9,496,720, issued Nov. 15, 2016; U.S. Pat. No. 9,588,185, issued Mar. 7, 2017; U.S. Pat. No. 9,923,289, issued Mar. 20, 2018; U.S. Pat. No. 9,966,676, issued May 8, 2018; U.S. Pat. No. 10,046,649, issued Aug. 14, 2018; U.S. Pat. No. 10,222,397, issued Mar. 5, 2019; U.S. Pat. No. 10,317,468, issued Jun. 11, 2019; U.S. Pat. No. 10,429,449, issued Oct. 1, 2019; U.S. Pat. No. 10,473,555, issued Nov. 12, 2019; U.S. Pat. No. 10,608,353, issued Mar. 31, 2020; U.S. Pat. No. 10,843,574, issued Nov. 24, 2020; U.S. Pat. No. 11,054,480, issued Jul. 6, 2021; U.S. Pat. No. 11,325,479, issued May 10, 2022; U.S. Ser. No. 09/780,146, filed Feb. 9, 2001, entitled STORAGE BATTERY WITH INTEGRAL BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/880,473, filed Jun. 13, 2001; entitled BATTERY TEST MODULE; U.S. Ser. No. 10/109,734, filed Mar. 28, 2002, entitled APPARATUS AND METHOD FOR COUNTERACTING SELF DISCHARGE IN A STORAGE BATTERY; U.S. Ser. No. 10/263,473, filed Oct. 2, 2002, entitled ELECTRONIC BATTERY TESTER WITH RELATIVE TEST OUTPUT; U.S. Ser. No. 09/653,963, filed Sep. 1, 2000, entitled SYSTEM AND METHOD FOR CONTROLLING POWER GENERATION AND STORAGE; U.S. Ser. No. 10/174,110, filed Jun. 18, 2002, entitled DAYTIME RUNNING LIGHT CONTROL USING AN INTELLIGENT POWER MANAGEMENT SYSTEM; U.S. Ser. No. 10/258,441, filed Apr. 9, 2003, entitled CURRENT MEASURING CIRCUIT SUITED FOR BATTERIES; U.S. Ser. No. 10/681,666, filed Oct. 8, 2003, entitled ELECTRONIC BATTERY TESTER WITH PROBE LIGHT; U.S. Ser. No. 11/207,419, filed Aug. 19, 2005, entitled SYSTEM FOR AUTOMATICALLY GATHERING BATTERY INFORMATION FOR USE DURING BATTERY TESTER/CHARGING, U.S. Ser. No. 11/356,443, filed Feb. 16, 2006, entitled ELECTRONIC BATTERY TESTER WITH NETWORK COMMUNICATION; U.S. Ser. No. 12/697,485, filed Feb. 1, 2010, entitled ELECTRONIC BATTERY TESTER; U.S. Ser. No. 12/769,911, filed Apr. 29, 2010, entitled STATIONARY BATTERY TESTER; U.S. Ser. No. 13/098,661, filed May 2, 2011, entitled METHOD AND APPARATUS FOR MEASURING A PARAMETER OF A VEHICLE ELECTRICAL SYSTEM; U.S. Ser. No. 13/152,711, filed Jun. 3, 2011, entitled BATTERY PACK MAINTENANCE FOR ELECTRIC VEHICLE; U.S. Ser. No. 14/039,746, filed Sep. 27, 2013, entitled BATTERY PACK MAINTENANCE FOR ELECTRIC VEHICLE; U.S. Ser. No. 14/565,689, filed Dec. 10, 2014, entitled BATTERY TESTER AND BATTERY REGISTRATION TOOL; U.S. Ser. No. 15/017,887, filed Feb. 8, 2016, entitled METHOD AND APPARATUS FOR MEASURING A PARAMETER OF A VEHICLE ELECTRICAL SYSTEM; U.S. Ser. No. 15/049,483, filed Feb. 22, 2016, entitled BATTERY TESTER FOR ELECTRIC VEHICLE; U.S. Ser. No. 15/077,975, filed Mar. 23, 2016, entitled BATTERY MAINTENANCE SYSTEM; U.S. Ser. No. 15/149,579, filed May 9, 2016, entitled BATTERY TESTER FOR ELECTRIC VEHICLE; U.S. Ser. No. 16/021,538, filed Jun. 28, 2018, entitled BATTERY PACK MAINTENANCE FOR ELECTRIC VEHICLE; U.S. Ser. No. 16/056,991, filed Aug. 7, 2018, entitled HYBRID AND ELECTRIC VEHICLE BATTERY PACK MAINTENANCE DEVICE, U.S. Ser. No. 16/253,526, filed Jan. 22, 2019, entitled HIGH CAPACITY BATTERY BALANCER; U.S. Ser. No. 16/297,975, filed Mar. 11, 2019, entitled HIGH USE BATTERY PACK MAINTENANCE; U.S. Ser. No. 16/695,705, filed Nov. 26, 2019, entitled BATTERY RATING VERSUS OEM SPECIFICATION; U.S. Ser. No. 16/943,120, filed Jul. 30, 2020 entitled TIRE TREAD GUAGE USING VISUAL INDICATOR; U.S. Ser. No. 17/086,629, filed Nov. 2, 2020, entitled HYBRID AND ELECTRIC VEHICLE BATTERY PACK MAINTENANCE DEVICE; U.S. Ser. No. 17/088,824, filed Nov. 4, 2020, entitled SYSTEM FOR CHARGING A SERIES OF CONNECTED BATTERIES; U.S. Ser. No. 17/090,129, filed Nov. 5, 2020 entitled BATTERY PACK MAINTENANCE SYSTEM; U.S. Ser. No. 17/136,600, filed Dec. 29, 2020, entitled INTELLIGENT MODULE INTERFACE FOR BATTERY MAINTENANCE DEVICE; U.S. Ser. No. 17/151,971, filed Jan. 19, 2021, entitled ELECTRONIC BATTERY TESTER WITH BATTERY CLAMP STORAGE HOLSTERS; U.S. Ser. No. 17/364,953, filed Jul. 1, 2021, entitled ELECTRICAL LOAD FOR ELECTRONIC BATTERY TESTER AND ELECTRONIC BATTERY TESTER INCLUDING SUCH ELECTRICAL LOAD; U.S. Ser. No. 17/504,897, filed Oct. 19, 2021, entitled HIGH CAPACITY BATTERY BALANCER; U.S. Ser. No. 17/739,393, filed May 9, 2022, entitled HYBRID AND ELECTRIC VEHICLE BATTERY PACK MAINTENANCE DEVICE; U.S. Ser. No. 17/750,719, filed May 23, 2022, entitled BATTERY MONITORING SYSTEM; U.S. Ser. No. 17/893,412, filed Aug. 23, 2022, entitled POWER ADAPTER FOR AUTOMOTIVE VEHICLE MAINTENANCE DEVICE; all of which are incorporated herein by reference in their entireties.

What is claimed is:

1. A battery maintenance system for use in performing battery maintenance on a battery of an electric vehicle comprising:
   a battery maintenance device; and
   a high voltage connector configured to connect the battery maintenance device to the battery of the electric vehicle, wherein the high voltage connector comprises:
      a first connector side coupleable to the battery of the electric vehicle and including a plurality of first type of connector poles and a keying post, wherein the keying post has a distal end that terminates a distance from ends of the first type of connectors;
      a second connector side coupleable to the battery maintenance device and including a plurality of second type of connector poles configured to electrically mate with the plurality of first type connector poles of the first connector side, a fuse block including at least one fuse and a removable fuse door having an interlock, a mechanical component configured into a first position and a second position and an electrical switch configured to disconnect and connect voltages from the fuse block;
   wherein when the fuse door is removed from the fuse block, the mechanical component is in a first position that blocks the keying post and prevents the first connector side from coupling with the second connector side; and
   wherein when the fuse door is in place and covering an interior of the fuse block, the interlock of the fuse door places the mechanical component into a second position to allow the keying post to mate with the second connector side and to activate the electric switch to connect voltages to the fuse block.

2. The battery maintenance system of claim 1, wherein the mechanical component of the high voltage connector comprises a spring-loaded plunger.

3. The battery maintenance system of claim 2, wherein in the first position, the spring-loaded plunger is not depressed and blocks the keying post from being inserted into the second connector side.

4. The battery maintenance system of claim 3, wherein the fuse door further comprises a tab having an aperture that protrudes from a main panel of the fuse door and is configured to depress the spring-loaded plunger into the second position to allow the aperture of the tab to receive the keying post and activate the electric switch.

5. The battery maintenance system of claim 1, wherein the mechanical component of the high voltage connector comprises an arm rotatably mounted to a spring-loaded pin.

6. The battery maintenance system of claim 5, wherein in the first position, the spring-loaded pin rotates the arm so that a first portion of the arm blocks the keying post from being inserted into the second connector side.

7. The battery maintenance system of claim 6, wherein the fuse door further comprises a first tab having an aperture and protruding from a main panel of the fuse door and a second tab having a surface and protruding from the main panel of the fuse door.

8. The battery maintenance system of claim 7, wherein the surface of the second tab is configured to push against a second portion of the arm so that the first portion is moved to allow the aperture of the first tab to receive the keying post and activate the electric switch.

9. The battery maintenance system of claim 1, wherein the electric switch is configured to be activated to allow voltage from the battery of the electric vehicle into the high voltage connector and is configured to be deactivated to prevent voltage from the battery of the electric vehicle into the high voltage connector.

10. The battery maintenance system of claim 1, further comprises a latch configured to further secure the first connector side to the second connector side of the high voltage connector.

11. The battery maintenance system of claim 10, wherein the latch comprises a pair of plates each rotatably coupled to a pair of first pins that protrude outwardly from opposing sides of a carrier housing of the first connector side and a crossbar that couples the pair of plates together, wherein each of the pair of plates includes a slot opening and a slot.

12. The battery maintenance system of claim 11, wherein the latch further comprises a pair of second pins that protrude outwardly from opposing sides of a carrier housing of the second connector side.

13. The battery maintenance system of claim 12, wherein to lock the latch from an unlocked position to a locked position comprises inserting the second pins through the slot openings and engaging the slots with the second pins by rotating the crossbar and the pair of plates in a first direction.

14. The battery maintenance system of claim 1, wherein the first connector side comprises a housing including an outside surface having male threads and wherein the second connector side comprises a housing including an inside surface having female threads, wherein the male threads of the first connector side mate with the female threads of the first connector side to further secure the first connector side to the second connector side of the high voltage connector.

15. The battery maintenance system of claim 1, wherein the plurality of first type of connector poles coupled to the plurality of second type connector poles are arranged along a single plane.

16. The battery maintenance system of claim 1, wherein at least some of the plurality of first type of connector poles coupled to at least some of the plurality of second type connector poles are arranged about a circumference of a circle.

17. A battery maintenance system for use in performing battery maintenance on a battery of an electric vehicle comprising:
   a battery maintenance device; and
   a high voltage connector configured to connect the battery maintenance device to the battery of the electric vehicle;
   wherein when a fuse door is removed from a fuse block of the high voltage connector, a mechanical component in a first position blocks a keying post and prevents a first connector side from coupling with a second connector side of the connector;
   wherein when the fuse door is in place and covering an interior of the fuse block, the fuse door places the mechanical component into a second position to allow the keying post to mate with the second connector side and to activate an electric switch to connect voltages to the fuse block.

18. The battery maintenance system of claim 17, wherein the high voltage connector comprises:
   a first connector side coupleable to the battery of the electric vehicle and including a plurality of first type of connector poles and the keying post, wherein the keying post has a distal end that terminates a distance from ends of the first type of connectors; and
   a second connector side coupleable to the battery maintenance device and including a plurality of second type of connector poles configured to electrically mate with the plurality of first type connector poles of the first connector side.

19. The battery maintenance system of claim 17, wherein the mechanical component comprises a spring-loaded plunger.

20. The battery maintenance system of claim 17, wherein the mechanical component comprises an arm rotatably mounted to a spring-loaded pin.

* * * * *